(12) United States Patent
Naik et al.

(10) Patent No.: US 12,745,226 B2
(45) Date of Patent: Sep. 22, 2026

(54) SIGNALING FOR DYNAMIC SUBCHANNEL OPERATION (DSO)

(71) Applicant: QUALCOMM Incorporated, San Diego, CA (US)

(72) Inventors: Gaurang Naik, San Diego, CA (US); George Cherian, San Diego, CA (US); Alfred Asterjadhi, San Diego, CA (US); Abhishek Pramod Patil, San Diego, CA (US); Sai Yiu Duncan Ho, San Diego, CA (US); Ahmed Ragab Elsherif, San Jose, CA (US); Youhan Kim, Saratoga, CA (US); Naveen Kumar Kakani, Flower Mound, TX (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 18/419,394

(22) Filed: Jan. 22, 2024

(65) Prior Publication Data

US 2025/0113339 A1 Apr. 3, 2025

Related U.S. Application Data

(60) Provisional application No. 63/591,076, filed on Oct. 17, 2023, provisional application No. 63/587,713, filed on Oct. 3, 2023.

(51) Int. Cl.

*H04W 72/0453* (2023.01)
*H04L 5/00* (2006.01)

(Continued)

(52) U.S. Cl.

CPC ....... *H04W 72/0453* (2013.01); *H04L 5/0053* (2013.01); *H04W 28/0278* (2013.01); *H04W 72/232* (2023.01)

(58) Field of Classification Search

CPC ............ H04L 5/0053; H04W 28/0278; H04W 72/0453; H04W 72/232; H04W 72/51; H04W 74/0808

See application file for complete search history.

(56) References Cited

U.S. PATENT DOCUMENTS 9,900,865 B2 * 2/2018 Seok ..................... H04W 72/02
10,594,450 B2 * 3/2020 Li ....................... H04L 27/2666

(Continued)

FOREIGN PATENT DOCUMENTS

CN 115918174 A * 4/2023 ........ H04W 52/0216
CN 117202399 A * 12/2023 ............ H04W 74/08

(Continued)

OTHER PUBLICATIONS

Verma et al., Dynamic Subband Operation, Jan. 2023, IEEE 802.11 Mentor Documents, doc.: IEEE 802.11-22/2204r0, https://mentor.ieee.org/802.11/documents (accessed on Jan. 9, 2026) (Year: 2023).*

(Continued)

*Primary Examiner* — Eric Nowlin
(74) *Attorney, Agent, or Firm* — Holland & Hart LLP

(57) ABSTRACT

This disclosure provides methods, components, devices, and systems for signaling for dynamic subchannel operation (DSO). Some aspects more specifically relate to indicating a set of subchannels supported for DSO. In some implementations, a wireless station (STA) may transmit a frame indicating subchannels supported for DSO (for example, for a specific link). An access point (AP) may receive the frame and may assign, using a control frame, one or more frequency resources of a subchannel of the set of subchannels to the STA for DSO. The STA may dynamically switch to the subchannel and may communicate via the subchannel while operating in a DSO mode. In some implementations, the STA may transmit capabilities information indicating that the STA supports the DSO mode. Additionally, or alterna- (Continued)

tively, the STA may dynamically enable or disable the DSO mode using action frames or aggregated-control (A-Control) subfields. The AP may support similar signaling.

28 Claims, 19 Drawing Sheets

(51) Int. Cl.
*H04W 28/02* (2009.01)
*H04W 72/232* (2023.01)

(56) References Cited

U.S. PATENT DOCUMENTS 11,160,084 B2* 10/2021 Asterjadhi ............ H04W 28/20
11,234,282 B2* 1/2022 Patil .................. H04W 52/0219
11,363,657 B1* 6/2022 Chu .................... H04W 28/082
11,743,960 B1* 8/2023 Chu ...................... H04W 76/15 370/338
11,758,562 B2* 9/2023 Asterjadhi ............ H04W 28/20 370/330
11,849,452 B2* 12/2023 Lim ...................... H04W 72/20
11,991,765 B2* 5/2024 Patil .................. H04W 72/0453
12,120,738 B2* 10/2024 Kneckt ............. H04W 74/0816
12,167,487 B1* 12/2024 Chu .................... H04W 28/082
12,199,896 B2* 1/2025 Lim .................... H04L 27/2603
12,335,985 B2* 6/2025 Asterjadhi ............ H04W 28/20
12,418,371 B2* 9/2025 Lim ...................... H04L 1/0075
12,513,572 B2* 12/2025 Sundaravaradhan ........................ H04W 28/20
2013/0077554 A1 3/2013 Gauvreau et al.
2017/0237532 A1* 8/2017 Li ....................... H04L 27/2666 370/338
2019/0215884 A1* 7/2019 Patil .................... H04W 74/004
2020/0015219 A1* 1/2020 Asterjadhi ............ H04W 72/51
2021/0410131 A1* 12/2021 Lim ...................... H04L 5/0053
2022/0039086 A1* 2/2022 Asterjadhi ............ H04W 72/51
2022/0086910 A1* 3/2022 Kneckt ............. H04W 74/0816
2023/0147175 A1* 5/2023 Lim .................... H04L 27/2603 370/329
2023/0239743 A1* 7/2023 Sundaravaradhan ........................ H04W 28/20 370/468
2023/0254078 A1* 8/2023 Lim .......................... H04L 1/08 370/329
2023/0362993 A1* 11/2023 Park .................. H04W 72/0453
2024/0032079 A1* 1/2024 Asterjadhi ............ H04W 72/23
2024/0163919 A1* 5/2024 Verma ............... H04W 72/0453
2024/0333465 A1* 10/2024 Lou ....................... H04L 5/0055
2025/0126637 A1* 4/2025 Ratnam ................. H04W 74/04
2025/0227756 A1* 7/2025 Luo ................... H04W 74/0808
2025/0287363 A1* 9/2025 Lu ..................... H04W 72/0453
2025/0301490 A1* 9/2025 Asterjadhi ............ H04W 72/23
2025/0310987 A1* 10/2025 Iwai ...................... H04W 84/12
2025/0343663 A1* 11/2025 Baek ....................... H04L 27/26
2025/0344195 A1* 11/2025 Lai .................... H04W 72/0457
2025/0344242 A1* 11/2025 Ratnam ................. H04W 28/06
2025/0365770 A1* 11/2025 Zhou ................... H04W 74/002
2025/0379711 A1* 12/2025 Lu ......................... H04L 5/0094
2025/0392419 A1* 12/2025 Lim ...................... H04L 5/0044
2026/0059555 A1* 2/2026 Park .................. H04W 72/0453

FOREIGN PATENT DOCUMENTS

CN 117296413 A * 12/2023 ........ H04W 72/0453
CN 117337615 A * 1/2024 .......... H04W 74/006
CN 118383068 A * 7/2024 ............ H04W 72/23
CN 117202399 B * 2/2025 ............ H04W 74/08
CN 119817069 A * 4/2025 ........ H04W 74/0808
CN 115918174 B * 7/2025 ........ H04W 74/0866
CN 120642431 A * 9/2025 .......... H04W 74/002
CN 120826885 A * 10/2025 ............ H04W 84/12
CN 120897239 A * 11/2025 ........ H04W 72/0457
CN 120898494 A * 11/2025 ............ H04W 84/12
EP 4203577 A1 * 6/2023 ........ H04W 52/0216
EP 4625903 A1 * 10/2025 .......... H04W 74/006
EP 4626102 A1 * 10/2025 ............ H04W 72/23
EP 4645985 A1 * 11/2025 ........ H04W 72/0457
EP 4648476 A1 * 11/2025 .......... H04W 74/002
EP 4664797 A1 * 12/2025 ............ H04W 84/12
JP 2024528443 A * 7/2024 ........... H04L 5/0055
KR 20250160924 A * 11/2025 ............ H04W 84/12
KR 20250164282 A * 11/2025 ............ H04W 84/12
WO WO-2022040888 A1 * 3/2022 ........ H04W 52/0216
WO WO-2024108448 A1 * 5/2024 ........ H04W 74/0808
WO WO-2024108451 A1 * 5/2024 ............ H04W 72/23
WO WO-2024182927 A1 * 9/2024 .......... H04W 74/002
WO WO-2024192737 A1 * 9/2024 ............ H04W 84/12
WO WO-2024192738 A1 * 9/2024 ............ H04W 84/12

OTHER PUBLICATIONS

Lu, Considerations on Dynamic Subchannel Operation, Jul. 2023, IEEE 802.11 Mentor Documents, doc.: IEEE Jul. 2023 802.11-23/0843r0, https://mentor.ieee.org/802.11/documents (accessed on Jan. 9, 2026) (Year: 2023).*

Jang et al., Thoughts on Secondary Channel Access, Jul. 2023, IEEE 802.11 Mentor Documents, doc.: IEEE 802.11-23/1112r0, https://mentor.ieee.org/802.11/documents (accessed on Jan. 9, 2026) (Year: 2023).*

Kim et al., Discussions on Non-Primary Channel Access, Sep. 2023, IEEE 802.11 Mentor Documents, doc.: IEEE IEEE 802.11-23/1365r0, https://mentor.ieee.org/802.11/documents (accessed on Jan. 9, 2026) (Year: 2023).*

Seok et al., DMLSR Dynamic Subband Operation, Sep. 2023, IEEE 802.11 Mentor Documents, doc.: IEEE 802.11-23/1496r0, https://mentor.ieee.org/802.11/documents (accessed on Jan. 9, 2026) (Year: 2023).*

International Search Report and Written Opinion—PCT/US2024/046025—ISA/EPO—Dec. 9, 2024 (2400135WO).

Lu L (OPPO)., et al., "Considerations on Dynamic Subchannel Operation", IEEE Draft, IEEE 802.11-23/0843r1, 11-23-0843-01-0UHR—Considerations-on-dynamic-subchannel-operation, IEEE-SA Mentor, Piscataway, NJ USA, vol. 802.11 UHR, No. 1, Jul. 13, 2023, pp. 1-10, XP068204454, Slides 4,5,6,7,10, Jul. 8, 2023.

* cited by examiner

Granularity Indication 602-a
Location Indication 604-a
Control Value 614
Bitmap 606-a
1 0 1 0 0 0 0 0 0 0 0 0 0 0 0 0
608
610-a
610-b
610-c
610-d
Frequency 600-b
Granularity Indication 602-b
Location Indication 604-b
612
Bitmap 606-b
1 0 0 1 1 0 1 0 0 0 0 0 0 0 0 0
610-e 610-f 610-g 610-h 610-i 610-j 610-k 610-l
Frequency 600-c
Location Indication 604-c
Bitmap 606-c
1 1 1 1 0 0 0 0 0 0 1 1 0 0 0 0
610-m 610-n 610-o 610-p 610-q
Frequency

1400

1600

SIGNALING FOR DYNAMIC SUBCHANNEL OPERATION (DSO)

PRIORITY INFORMATION

The present Non-Provisional Patent Applications claims the benefit of U.S. Provisional Patent Application No. 63/591,076 by Naik et al., entitled "SIGNALING FOR DYNAMIC SUBCHANNEL OPERATION (DSO)" and filed Oct. 17, 2023, and U.S. Provisional Patent Application No. 63/587,713 by Naik et al., entitled "SIGNALING FOR DYNAMIC SUBCHANNEL OPERATION (DSO)" and filed Oct. 3, 2023, each of which is assigned to the assignee hereof and hereby expressly incorporated by reference herein.

TECHNICAL FIELD

This disclosure relates to wireless communication and, more specifically, to signaling for dynamic subchannel operation (DSO).

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, an AP supports a relatively wider bandwidth than one or more STAs communicating with the AP. If the AP communicates with STAs that fail to support wideband signaling (for example, signaling via the full bandwidth supported by the AP), a portion of the AP's operational bandwidth may be unused during the communications, resulting in relatively poor spectral efficiency for the WLAN.

SUMMARY

The systems, methods, and devices of this disclosure each have several innovative aspects, no single one of which is solely responsible for the desirable attributes disclosed herein.

One innovative aspect of the subject matter described in this disclosure can be implemented in a non-access point (AP) station (STA). The non-AP STA may include a processing system that includes processor circuitry and memory circuitry that stores code. The processing system may be configured to cause the non-AP STA to transmit a first frame indicating support for a set of secondary subchannels for dynamic subchannel operation (DSO), receive a control frame assigning, to the non-AP STA for the DSO, one or more frequency resources included in at least one secondary subchannel of the set of secondary subchannels, and communicate via the at least one secondary subchannel based on an enabled DSO mode at the non-AP STA.

Another innovative aspect of the subject matter described in this disclosure can be implemented in a method for wireless communications by a non-AP STA. The method may include transmitting a first frame indicating support for a set of secondary subchannels for DSO, receiving a control frame assigning, to the non-AP STA for the DSO, one or more frequency resources included in at least one secondary subchannel of the set of secondary subchannels, and communicating via the at least one secondary subchannel based on an enabled DSO mode at the non-AP STA.

Another innovative aspect of the subject matter described in this disclosure can be implemented in another non-AP STA for wireless communications. The non-AP STA may include means for transmitting a first frame indicating support for a set of secondary subchannels for DSO, means for receiving a control frame assigning, to the non-AP STA for the DSO, one or more frequency resources included in at least one secondary subchannel of the set of secondary subchannels, and means for communicating via the at least one secondary subchannel based on an enabled DSO mode at the non-AP STA.

Another innovative aspect of the subject matter described in this disclosure can be implemented in a non-transitory computer-readable medium storing code for wireless communications. The code may include instructions executable by a processor to transmit a first frame indicating support for a set of secondary subchannels for DSO, receive a control frame assigning, to the non-AP STA for the DSO, one or more frequency resources included in at least one secondary subchannel of the set of secondary subchannels, and communicating via the at least one secondary subchannel base at least in part on an enabled DSO mode at the non-AP STA.

Another innovative aspect of the subject matter described in this disclosure can be implemented in an AP STA. The AP STA may include a processing system that includes processor circuitry and memory circuitry that stores code. The processing system may be configured to cause the AP STA to receive a first frame indicating support for a set of secondary subchannels for DSO at a non-AP STA, transmit a control frame assigning, to the non-AP STA for the DSO, one or more frequency resources included in at least one secondary subchannel of the set of secondary subchannels, and communicate with the non-AP STA via the at least one secondary subchannel based on the control frame.

Another innovative aspect of the subject matter described in this disclosure can be implemented in a method for wireless communications by an AP STA. The method may include receiving a first frame indicating support for a set of secondary subchannels for DSO at a non-AP STA, transmitting a control frame assigning, to the non-AP STA for the DSO, one or more frequency resources included in at least one secondary subchannel of the set of secondary subchannels, and communicating with the non-AP STA via the at least one secondary subchannel based on the control frame.

Another innovative aspect of the subject matter described in this disclosure can be implemented in another AP STA for wireless communications. The AP STA may include means for receiving a first frame indicating support for a set of secondary subchannels for DSO at a non-AP STA, means for transmitting a control frame assigning, to the non-AP STA for the DSO, one or more frequency resources included in at least one secondary subchannel of the set of secondary subchannels, and means for communicating with the non-AP STA via the at least one secondary subchannel based on the control frame.

Another innovative aspect of the subject matter described in this disclosure can be implemented in a non-transitory computer-readable medium storing code for wireless communications. The code may include instructions executable by a processor to receive a first frame indicating support for a set of secondary subchannels for DSO at a non-AP STA, transmit a control frame assigning, to the non-AP STA for the DSO, one or more frequency resources included in at least one secondary subchannel of the set of secondary subchannels, and communicate with the non-AP STA via the at least one secondary subchannel based on the control frame.

Another innovative aspect of the subject matter described in this disclosure can be implemented in a non-AP STA. The non-AP STA may include a processing system that includes processor circuitry and memory circuitry that stores code. The processing system may be configured to cause the non-AP STA to receive a management frame indicating one or more anchor channels within an operating bandwidth of an AP STA for DSO, receive a control frame assigning, to the non-AP STA for the DSO, one or more frequency resources included in one or more secondary subchannels associated with an anchor channel of the one or more anchor channels, and communicate via the one or more secondary subchannels associated with the anchor channel based on an enabled DSO mode at the non-AP STA.

Another innovative aspect of the subject matter described in this disclosure can be implemented in a method for wireless communications by a non-AP STA. The method may include receiving a management frame indicating one or more anchor channels within an operating bandwidth of an AP STA for DSO, receiving a control frame assigning, to the non-AP STA for the DSO, one or more frequency resources included in one or more secondary subchannels associated with an anchor channel of the one or more anchor channels, and communicating via the one or more secondary subchannels associated with the anchor channel based on an enabled DSO mode at the non-AP STA.

Another innovative aspect of the subject matter described in this disclosure can be implemented in another non-AP STA for wireless communications. The non-AP STA may include means for receiving a management frame indicating one or more anchor channels within an operating bandwidth of an AP STA for DSO, means for receiving a control frame assigning, to the non-AP STA for the DSO, one or more frequency resources included in one or more secondary subchannels associated with an anchor channel of the one or more anchor channels, and means for communicating via the one or more secondary subchannels associated with the anchor channel based on an enabled DSO mode at the non-AP STA.

Another innovative aspect of the subject matter described in this disclosure can be implemented in a non-transitory computer-readable medium storing code for wireless communications. The code may include instructions executable by a processor to receive a management frame indicating one or more anchor channels within an operating bandwidth of an AP STA for DSO, receive a control frame assigning, to the non-AP STA for the DSO, one or more frequency resources included in one or more secondary subchannels associated with an anchor channel of the one or more anchor channels, and communicate via the one or more secondary subchannels associated with the anchor channel based on an enabled DSO mode at the non-AP STA.

Another innovative aspect of the subject matter described in this disclosure can be implemented in an AP STA. The AP STA may include a processing system that includes processor circuitry and memory circuitry that stores code. The processing system may be configured to cause the AP STA to transmit a management frame indicating one or more anchor channels within an operating bandwidth of the AP STA for DSO, transmit a control frame assigning, to a non-AP STA for the DSO, one or more frequency resources included in one or more secondary subchannels associated with an anchor channel of the one or more anchor channels, and communicate with the non-AP STA via the one or more secondary subchannels associated with the anchor channel based on the control frame.

Another innovative aspect of the subject matter described in this disclosure can be implemented in a method for wireless communications by an AP STA. The method may include transmitting a management frame indicating one or more anchor channels within an operating bandwidth of the AP STA for DSO, transmitting a control frame assigning, to a non-AP STA for the DSO, one or more frequency resources included in one or more secondary subchannels associated with an anchor channel of the one or more anchor channels, and communicating with the non-AP STA via the one or more secondary subchannels associated with the anchor channel based on the control frame.

Another innovative aspect of the subject matter described in this disclosure can be implemented in another AP STA for wireless communications. The AP STA may include means for transmitting a management frame indicating one or more anchor channels within an operating bandwidth of the AP STA for DSO, means for transmitting a control frame assigning, to a non-AP STA for the DSO, one or more frequency resources included in one or more secondary subchannels associated with an anchor channel of the one or more anchor channels, and means for communicating with the non-AP STA via the one or more secondary subchannels associated with the anchor channel based on the control frame.

Another innovative aspect of the subject matter described in this disclosure can be implemented in a non-transitory computer-readable medium storing code for wireless communications. The code may include instructions executable by a processor to transmit a management frame indicating one or more anchor channels within an operating bandwidth of the AP STA for DSO, transmit a control frame assigning, to a non-AP STA for the DSO, one or more frequency resources included in one or more secondary subchannels associated with an anchor channel of the one or more anchor channels, and communicate with the non-AP STA via the one or more secondary subchannels associated with the anchor channel based on the control frame.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
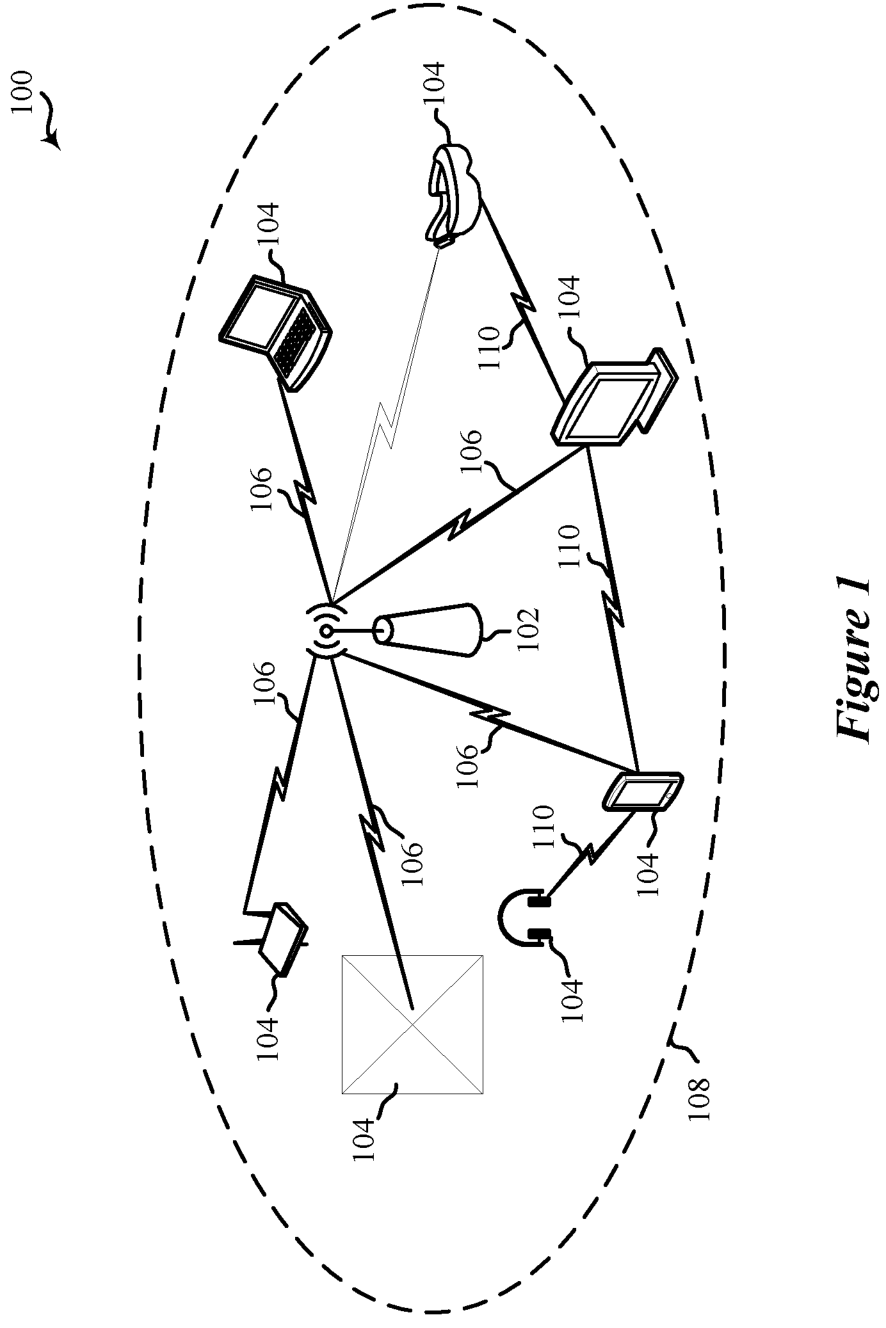
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described examples can be implemented in any device, system, or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO), and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to signaling for dynamic subchannel operation (DSO). Some aspects more specifically relate to an access point (AP), which may be referred to as an AP wireless station (STA), and a STA, which may be referred to as a non-AP STA, communicating supported subchannels for DSO. In some implementations, the STA may transmit a frame indicating support for a set of secondary subchannels for DSO, where the support for the set of secondary subchannels may be link-specific, STA-specific, or both. The frame may include a granularity value and one or more location values defining the set of secondary subchannels. The AP may receive the set of secondary subchannels supported for DSO by the STA and may assign, to the STA for DSO using a control frame, one or more frequency resources included in one or more subchannels of the set of secondary subchannels. In some implementations, the AP may assign the frequency resources for DSO using a DSO announcement frame, which may be an example of a trigger frame variant that refrains from triggering a response. Additionally, or alternatively, in some implementations, the STA may transmit capability information indicating that the STA supports operating in a DSO mode (for example, for a specific link). Additionally, or alternatively, in some implementations, the STA may enable or disable the DSO mode using action frames or aggregated-control (A-Control) subfields (for example, via a two-step or four-step exchange with an AP). In some implementations, the AP may communicate similar signaling, for example, to indicate subchannels supported by the AP for DSO, to indicate a capability of the AP to support the DSO mode for a link, to enable or disable the DSO mode at one or more STAs, or any combination thereof. In some implementations, the AP may transmit a management frame indicating one or more anchor channels (for example, temporary primary subchannels) that the AP supports for DSO. The AP may assign frequency resources to STAs for DSO such that each STA communicates via an anchor channel of the one or more anchor channels supported by the AP.

Particular aspects of the subject matter described in this disclosure can be implemented to realize one or more of the following potential advantages. In some implementations, by signaling the supported set of subchannels for DSO, the described techniques can be used to improve the spectral efficiency via a relatively wideband channel. For example, if the AP supports communications over a relatively wider operating bandwidth than one or more STAs communicating with the AP, the AP can use the indicated set of subchannels for DSO to dynamically assign STAs to different subchannels of the AP's operating bandwidth, efficiently utilizing the frequency resources of the AP's operating bandwidth for communications with different STAs. Additionally, or alternatively, in some implementations, by indicating link-specific support for DSO or link-specific subchannels supported for DSO, the AP, STAs, or both may use DSO for links with relatively wide operating bandwidths (for example, 160 megahertz (MHz), 320 MHz) where DSO may achieve significant improvements in resource utilization, while refraining from using or supporting DSO for other links with relatively narrower operating bandwidths (for example, 20 MHz, 80 MHz) where narrowband STAs may effectively utilize the resources without DSO. Additionally, or alternatively, in some implementations, by supporting enablement and disablement of a DSO mode using action frames or A-Control subfields, the AP, STAs, or both may dynamically switch to the DSO mode with relatively low latency to achieve improved spectral efficiency. In some implementations, by using a trigger frame variant for a DSO announcement frame, the AP may improve a processing overhead at the STAs receiving the DSO announcement frame. Additionally, or alternatively, by assigning frequency resources such that each STA operating in DSO communicates via an anchor channel, the AP may ensure that the STAs support frame exchange operations that use a primary subchannel, such as clear channel assessment (CCA) energy detection (ED) operations, transmit power calculations, or other functions using a primary subchannel by instead using the anchor channel (for example, as a temporary primary subchannel).

FIG. 1 shows a pictorial diagram of an example wireless communication network 100. According to some aspects, the wireless communication network 100 can be an example of a WLAN such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In yet some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless AP 102 and any number of wireless STAs 104. While only one AP 102 is shown in FIG. 1, the wireless communication network 100 can include multiple APs 102. An AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNode B (gNB), a transmission/reception point (TRP), or another type of device or equipment included in a RAN, including Open-RAN (O-RAN) network entities, such as a central unit (CU), a distributed unit (DU), or a radio unit.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors, or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), IoT devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 gigahertz (GHz), 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control (AGC), and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of Frequency Range (FR) 1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple sub-bands and frequency channels (also referred to as subchannels). For example, PPDUs conforming to the IEEE 802.11n, 802.11ac, 802.11ax, 802.11be, and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

In some implementations, the AP 102 or the STAs 104 of the wireless communication network 100 may implement Extremely High Throughput (EHT) or other features compliant with current and future generations of the IEEE 802.11 family of wireless communication protocol standards (such as the IEEE 802.11be and 802.11bn standard amendments) to provide additional capabilities over other previous systems (for example, High Efficiency (HE) systems or other legacy systems). For example, the IEEE 802.11be standard amendment introduced 320 MHz channels, which are twice as wide as those possible with the IEEE 802.11ax standard amendment. Accordingly, the AP 102 or the STAs 104 may use 320 MHz channels enabling double the throughput and network capacity, as well as providing rate versus range gains at high data rates due to linear bandwidth versus log signal-to-noise ratio (SNR) trade-off. EHT and newer wireless communication protocols (such as the protocols referred to as or associated with the IEEE 802.11bn standard amendment) may support flexible operating bandwidth enhancements, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz, and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some implementations in which a wireless communication device (such as the AP 102 or the STA 104) operates in a contiguous 320 MHz bandwidth mode or a 160+160 MHz bandwidth mode, signals for transmission may be generated by two different transmit chains of the wireless communication device each having or associated with a bandwidth of 160 MHz (and each coupled to a different power amplifier). In some other examples, two transmit chains can be used to support a 240 MHz/160+80 MHz bandwidth mode by puncturing 320 MHz/160+160 MHz bandwidth modes with one or more 80 MHz subchannels. For example, signals for transmission may be generated by two different transmit chains of the wireless communication device each having a bandwidth of 160 MHz with one of the transmit chains outputting a signal having an 80 MHz subchannel punctured therein. In some implementations in which the wireless communication device may operate in a contiguous 240 MHz bandwidth mode or a noncontiguous 160+80 MHz bandwidth mode, the signals for transmission may be generated by three different transmit chains of the wireless communication device, each having a bandwidth of 80 MHz. In some other examples, signals for transmission may be generated by four or more different transmit chains of the wireless communication device, each having a bandwidth of 80 MHz.

In noncontiguous examples, the operating bandwidth may span one or more disparate subchannel sets. For example, the 320 MHz bandwidth may be contiguous and located in the same 6 GHz band or noncontiguous and located in different bands or regions within a band (such as partly in the 5 GHz band and partly in the 6 GHz band).

In some implementations, the AP 102 or the STA 104 may benefit from operability enhancements associated with EHT and newer generations of the IEEE 802.11 family of wireless communication protocol standards. For example, the AP 102 or the STA 104 attempting to gain access to the wireless medium of the wireless communication network 100 may perform techniques (which may include modifications to existing rules, structure, or signaling implemented for legacy systems) such as CCA operation based on EHT enhancements such as increased bandwidth, puncturing, or refinements to carrier sensing and signal reporting mechanisms.

In some WLANs, Wi-Fi clients (for example, STAs 104) may not support a full bandwidth option for communication, as compared to the AP 102. For example, a STA 104 may support communications via a relatively narrower bandwidth than an AP 102. In some implementations, the AP 102 may support an operating bandwidth up to 320 MHz or some other relatively wide bandwidth, while the STA 104 may support an operating bandwidth up to 40 MHz, 80 MHz, 160 MHz, or some other relatively narrow bandwidth. If the AP 102 has traffic for multiple STAs 104, and if at least one STA 104 of the multiple STAs 104 is wideband (for example, supports communicating via the same operating bandwidth as the AP 102), the AP 102 may use multi-user OFDMA to schedule resource units (RUs) for communicating with the wideband STA 104 (for example, in a secondary 80 (S80) subchannel). However, if the multiple STAs 104 do not include at least one wideband STA 104, a portion of the operating bandwidth of the AP 102 may be underutilized (for example, unused by the multiple STAs 104), resulting in relatively poor spectral efficiency. To improve the spectral efficiency, the wireless communication network 100 may support relatively narrowband devices (for example, one or more STAs 104) using different portions of the operating bandwidth of the AP 102.

In some implementations, a WLAN may support communications via a non-primary (secondary) subchannel using a subchannel selective transmission (SST) feature. The SST feature may support utilizing different portions of the operating bandwidth for communications. A STA may use an individual target wake time (TWT) to negotiate semi-static service periods during which the STA (for example, a narrowband STA) may switch to a non-primary (secondary) channel for the SST feature. However, such semi-static switching may be relatively high latency and may support periodic signaling but not dynamic signaling.

In contrast, the wireless communication network 100 may support DSO to improve spectral efficiency within the wireless communication network 100. For example, one or more STAs 104 may use DSO to dynamically switch to non-primary (secondary) subchannels for communications with the AP 102 to efficiently utilize the operating bandwidth of the AP 102. The wireless communication network 100 may support signaling that configures, enables, or otherwise supports DSO.

Figure 2:
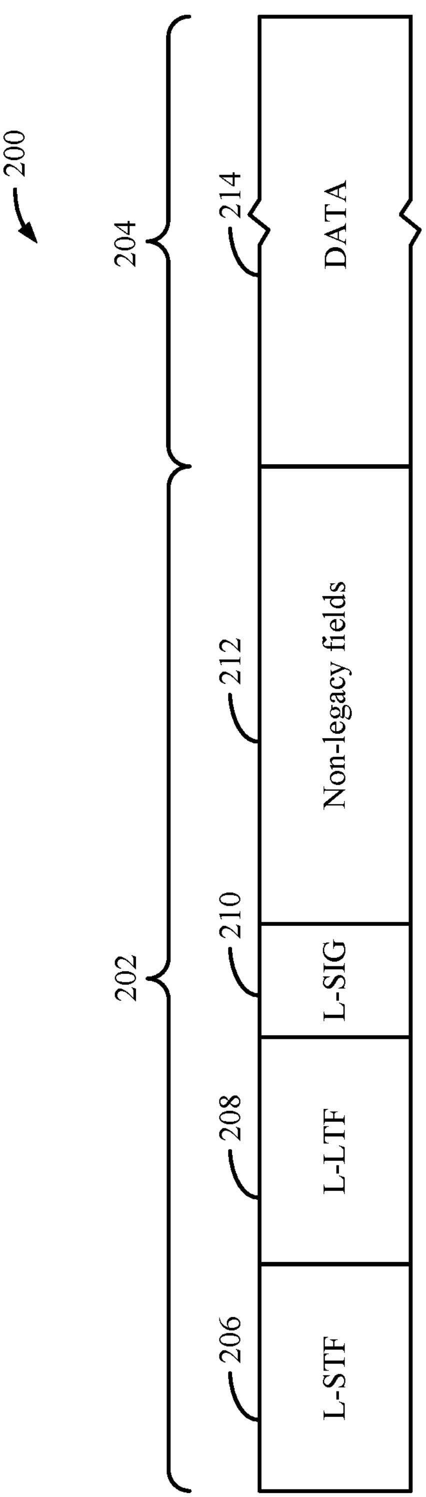
FIG. 2 shows an example protocol data unit (PDU) usable for communications between a wireless access point (AP) and one or more wireless stations (STAs).

FIG. 2 shows an example PDU 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and AGC. The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208, and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field 214 that, in turn, may carry higher layer data, for example, in the form of MAC protocol data units (MPDUs) or an aggregated MPDU (A-MPDU).

Figure 3:
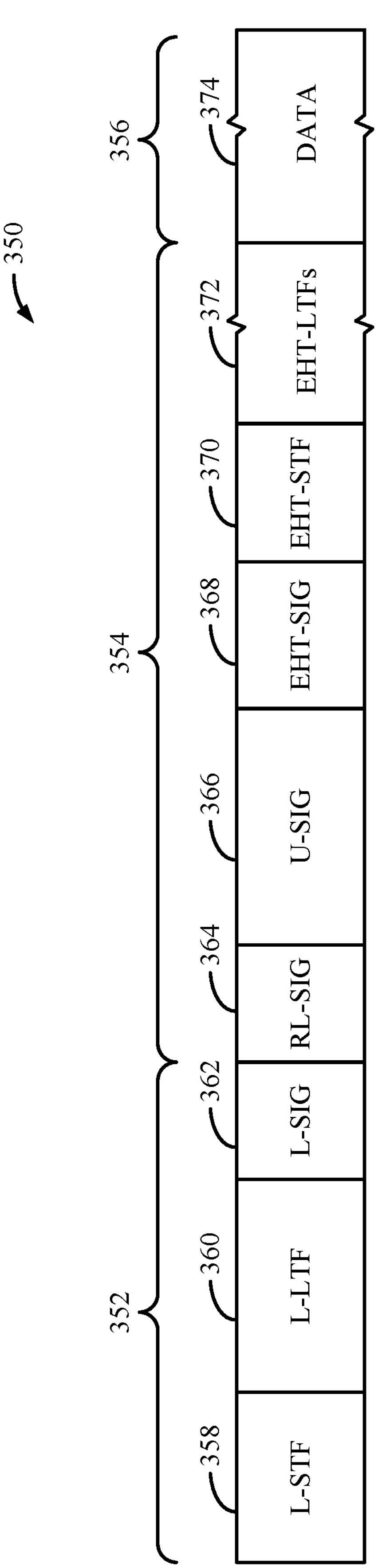
FIG. 3 shows an example physical layer (PHY) protocol data unit (PPDU) usable for communications between a wireless AP and one or more wireless STAs.

FIG. 3 shows an example PPDU 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as the AP 102 or the STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink or downlink resources for them. EHT-SIG 368 may be decoded by each compatible STA 104 served by the AP 102. EHT-SIG 368 may generally be used by the receiving device to interpret bits in the data field 374. For example, EHT-SIG 368 may include RU allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the quantity of users in allocations, among other examples. The user-specific fields are assigned to particular STAs 104 and carry STA-specific scheduling information such as user-specific modulation and coding scheme (MCS) values and user-specific RU allocation information. Such information enables a respective STA 104 to identify and decode corresponding RUs in the associated data field 374.

Figure 4:
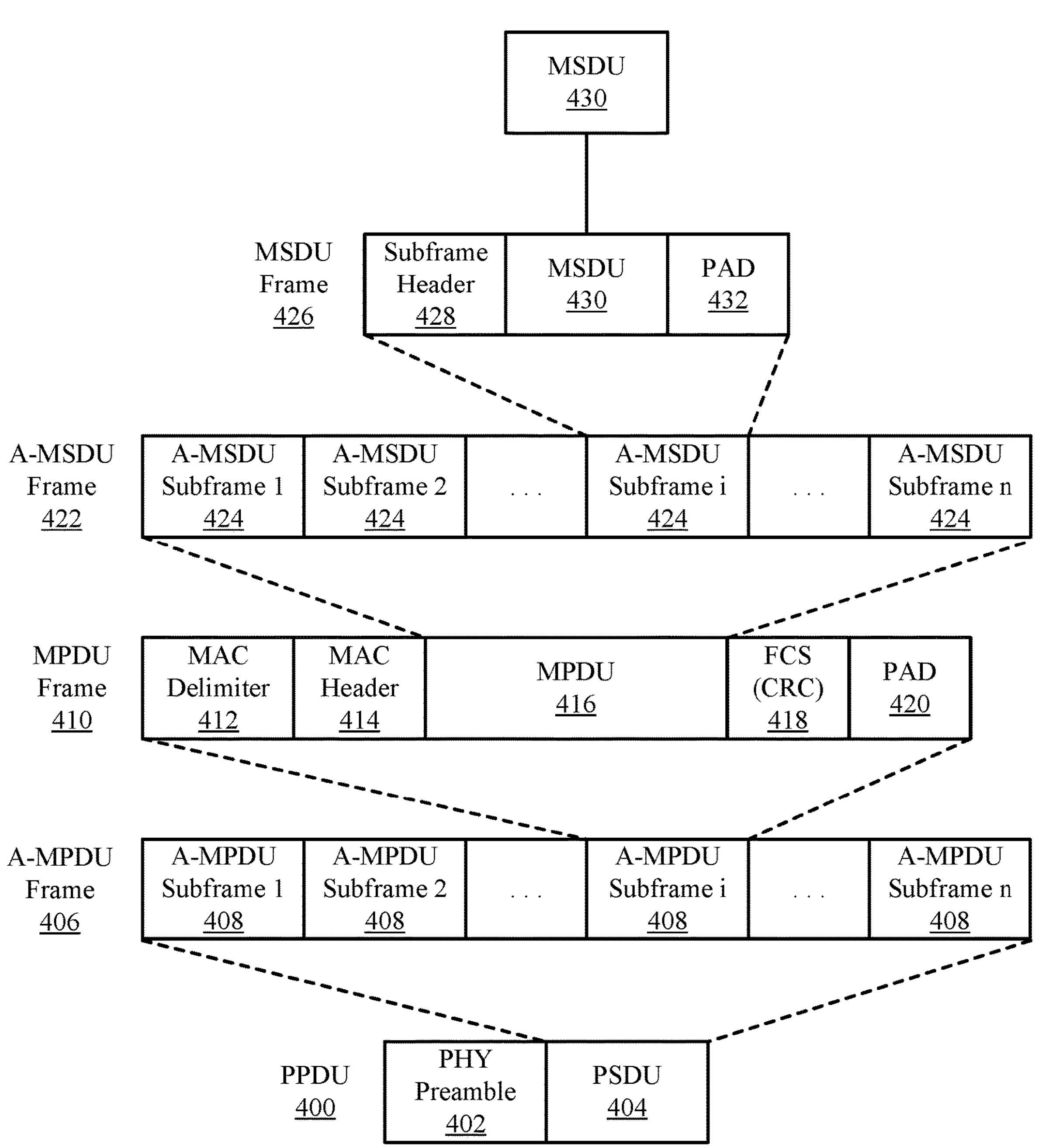
FIG. 4 shows a hierarchical format of an example PPDU usable for communications between a wireless AP and one or more wireless STAs.

FIG. 4 shows a hierarchical format of an example PPDU 400 usable for communications between a wireless AP and one or more wireless STAs. For example, the AP and STAs may be examples of the AP 102 and the STAs 104 described with reference to FIG. 1. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) frame 406 that includes an aggregation of multiple A-MPDU subframes 408. Each A-MPDU subframe 408 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs). For example, the MPDU 416 may carry an aggregated MSDU (A-MSDU) frame 422 including multiple A-MSDU subframes 424. Each A-MSDU subframe 424 may include a corresponding MSDU frame 426 with an MSDU 430 preceded by a subframe header 428 and in some implementations followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body. The MAC header 414 includes a duration field indicating a duration extending from the end of the PPDU until at least the end of an acknowledgment or block acknowledgment (BA) of the PPDU that is to be transmitted by the receiving wireless communication device. The use of the duration field serves to reserve the wireless medium for the indicated duration and enables the receiving device to establish its network allocation vector (NAV). The MAC header 414 also includes one or more fields indicating addresses for the data encapsulated within the frame body. For example, the MAC header 414 may include a combination of a source address, a transmitter address, a receiver address, or a destination address. The MAC header 414 may further include a frame control field containing control information. The frame control field may specify a frame type, for example, a data frame, a control frame, or a management frame.

In some implementations, the AP 102 and STAs 104 can support various multi-user communications; that is, concurrent transmissions from one device to each of multiple devices (for example, multiple simultaneous downlink communications from an AP 102 to corresponding STAs 104) or concurrent transmissions from multiple devices to a single device (for example, multiple simultaneous uplink transmissions from corresponding STAs 104 to an AP 102). As an example, in addition to MU-MIMO, the AP 102 and STAs 104 may support OFDMA. OFDMA is in some aspects a multi-user version of OFDM.

In OFDMA schemes, the available frequency spectrum of the wireless channel may be divided into multiple RUs each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals and, as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Other tone RUs also may be allocated, such as 52 tone, 106 tone, 242 tone, 484 tone, and 996 tone RUs. Adjacent RUs may be separated by a null subcarrier (such as a direct current (DC) subcarrier), for example, to reduce interference between adjacent RUs, to reduce receiver DC offset, and to avoid transmit center frequency leakage.

For uplink MU transmissions, an AP 102 can transmit a trigger frame to initiate and synchronize an uplink OFDMA or uplink MU-MIMO transmission from multiple STAs 104 to the AP 102. Such trigger frames may thus enable multiple STAs 104 to send uplink traffic to the AP 102 concurrently in time. A trigger frame may address one or more STAs 104 through respective AIDs and may assign each AID (and thus each STA 104) one or more RUs that can be used to send uplink traffic to the AP 102. The AP 102 also may designate one or more random access (RA) RUs that unscheduled STAs 104 may contend for.

Some wireless communication devices (including both APs and STAs such as, for example, an AP 102 and STAs 104 described with reference to FIG. 1) are capable of multi-link operation (MLO). In some implementations, MLO supports establishing multiple different communication links (such as a first link on the 2.4 GHz band, a second link on the 5 GHz band, and the third link on the 6 GHz band) between the STA 104 and the AP 102 and exchanging packets on one or more communication links concurrently and dynamically. Each communication link may support one or more sets of channels or logical entities. In some implementations, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). An MLD may include a single upper MAC layer and can include, for example, three independent lower MAC layers and three associated independent PHY layers for respective links in the 2.4 GHz, 5 GHz, and 6 GHz bands. This architecture may enable a single association process and security context. An AP MLD may include multiple APs each configured to communicate on a respective communication link with a respective one of multiple STAs 104 of a non-AP MLD (also referred to as a "STA MLD"). The STA MLD may communicate with the AP MLD over one or more of the multiple communication links at a given time. MLDs may independently contend for access on each of the communication links, which achieves latency reduction by enabling the MLD to transmit its packets on the first communication link that becomes available.

Another feature of MLO is traffic steering and quality of service (QoS) characterization, which achieves latency reduction and other QoS enhancements by mapping traffic flows having different latency or other requirements to different links. For example, traffic with relatively low latency requirements can be mapped to wireless links operating in the 6 GHz band and more latency-tolerant flows can be mapped to wireless links operating in the 2.4 GHz or 5 GHz bands.

One type of MLO is alternating multi-link, in which an MLD may listen to two different high performance channels at the same time. When an MLD has traffic to send, it may use the first channel with an access opportunity (such as a first transmission opportunity (TXOP)). While the MLD may use one channel to receive or transmit at a time, having access opportunities in two different channels may support low latency operations when networks are congested.

Another type of MLO is multi-link aggregation (MLA), where traffic associated with a single STA 104 is concurrently (for example, simultaneously) transmitted across multiple communication links in parallel to maximize the utilization of available resources to achieve higher throughput. This is akin to carrier aggregation in the cellular space. That is, during at least some duration of time, transmissions or portions of transmissions may occur over two or more links in parallel at the same time. In some implementations, the parallel wireless communication links may support synchronized transmissions. In some other implementations, or during some other durations of time, transmissions over the links may be parallel but not synchronized or concurrent. In some implementations or durations of time, two or more of the links may be used for communications between the wireless communication devices in the same direction (such as all uplink or all downlink). In some other implementations or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally, or alternatively, be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some implementations, the exchange of information may occur via a beacon signal, a probe request or probe response, an association request or an association response frame, a dedicated action frame, or an operating mode indicator (OMI), among other examples. In some implementations, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a wireless communication network 100. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

In some environments, locations, or conditions, a regulatory body may impose a power spectral density (PSD) limit for one or more communication channels or for an entire band (for example, the 6 GHz band). A PSD is a measure of transmit power as a function of a unit bandwidth (such as per 1 MHz). The total transmit power of a transmission is consequently the product of the PSD and the total bandwidth by which the transmission is sent. Unlike the 2.4 GHz and 5 GHz bands, the United States Federal Communications Commission (FCC) has established PSD limits for low power devices when operating in the 6 GHz band. The FCC has defined three power classes for operation in the 6 GHz band: standard power, low power indoor (LPI), and very low power. Some APs 102 and STAs 104 that operate in the 6 GHz band may conform to the LPI power class, which limits the transmit power of APs 102 and STAs 104 to 5 decibel-milliwatts per megahertz (dBm/MHz) and −1 dBm/MHz, respectively. In other words, transmit power in the 6 GHz band is PSD-limited on a per-MHz basis.

Such PSD limits can undesirably reduce transmission ranges, reduce packet detection capabilities, and reduce channel estimation capabilities of APs 102 and STAs 104. In some implementations in which transmissions are subject to a PSD limit, the AP 102 or the STAs 104 of the wireless communication network 100 may transmit over a greater transmission bandwidth to allow for an increase in the total transmit power, which may increase an SNR and extend coverage of the wireless communication devices. For example, to overcome or extend the PSD limit and improve SNR for low power devices operating in PSD-limited bands, 802.11be introduced a duplicate (DUP) mode for a transmission, by which data in a payload portion of a PPDU is modulated for transmission over a "base" frequency sub-band, such as a first RU of an OFDMA transmission, and copied over (for example, duplicated) to another frequency sub-band, such as a second RU of the OFDMA transmission. In DUP mode, two copies of the data are to be transmitted and, for each of the duplicate RUs, using dual carrier modulation (DCM), which also has the effect of copying the data such that two copies of the data are carried by each of the duplicate RUs so that, for example, four copies of the data are transmitted. While the data rate for transmission of each copy of the user data using the DUP mode may be the same as a data rate for a transmission using a "normal" mode, the transmit power for the transmission using the DUP mode may be essentially multiplied by the number of copies of the data being transmitted, at the expense of using an increased bandwidth. As such, using the DUP mode may extend range but reduce spectrum efficiency.

In some other examples in which transmissions are subject to a PSD limit, a distributed tone mapping operation may be used to increase the bandwidth via which a STA 104 transmits an uplink communication to the AP 102. As used herein, the term "distributed transmission" refers to a PPDU transmission via noncontiguous tones (or subcarriers) of a wireless channel. In contrast, the term "contiguous transmission" refers to a PPDU transmission via contiguous tones. As used herein, a logical RU represents a quantity of tones or subcarriers that are allocated to a given STA 104 for transmission of a PPDU. As used herein, the term "regular RU" (or rRU) refers to any RU or multi-RU (MRU) tone plan that is not distributed, such as a configuration supported by 802.11be or earlier versions of the IEEE 802.11 family of wireless communication protocol standards. As used herein, the term "distributed RU" (or dRU) refers to the tones distributed across a set of noncontiguous subcarrier indices to which a logical RU is mapped. The term "distributed tone plan" refers to the set of noncontiguous subcarrier indices associated with a dRU. The channel or portion of a channel within which the distributed tones are interspersed is referred to as a spreading bandwidth which may be, for example, 40 MHz, 80 MHz, or more. The use of dRUs may be limited to uplink communications because benefits to addressing PSD limits may only be present for uplink communications.

Figure 5:
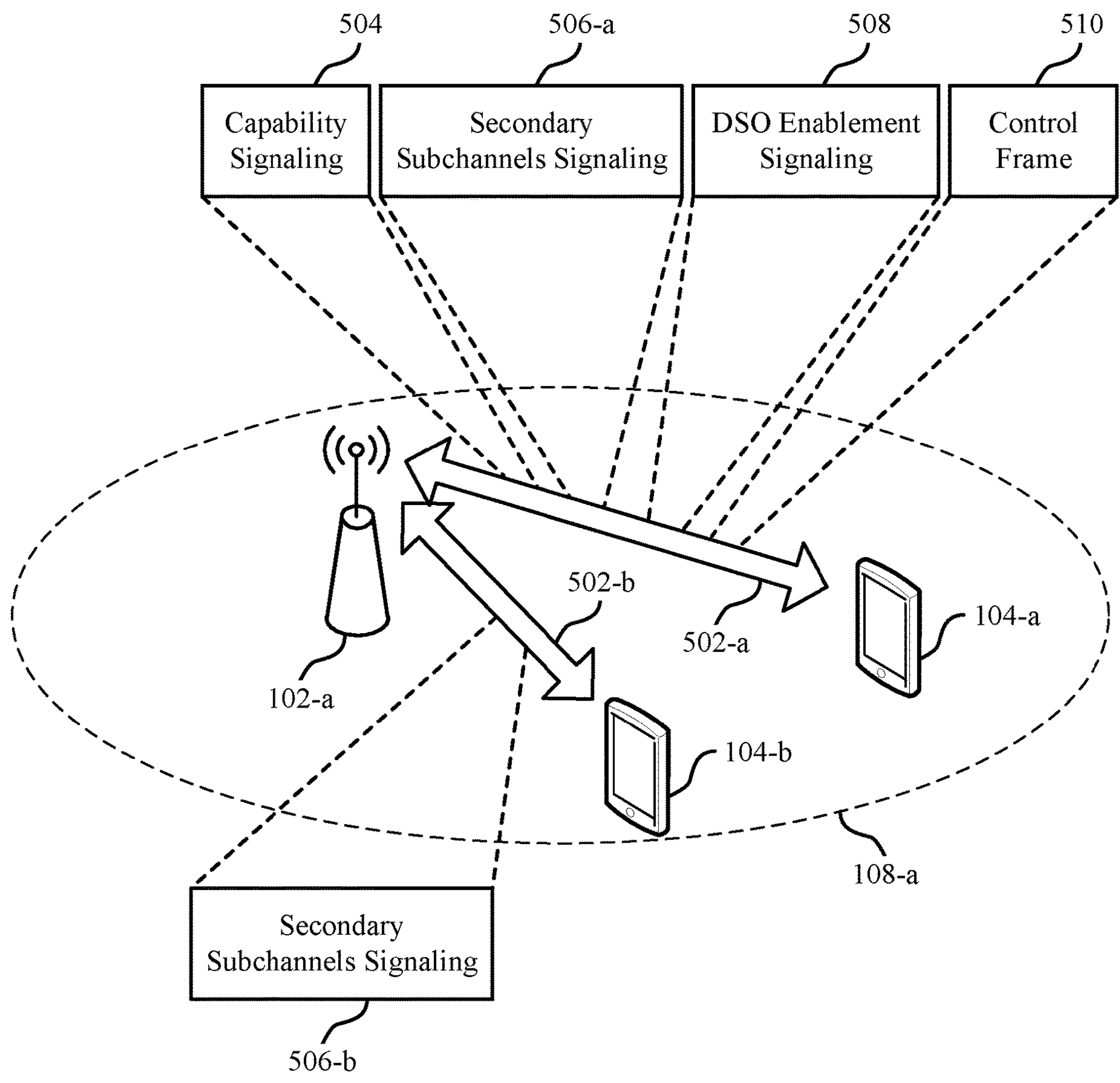
FIG. 5 shows an example of a wireless communications system that supports signaling for dynamic subchannel operation (DSO).

FIG. 5 shows an example of a wireless communications system 500 that supports signaling for DSO. The wireless communications system 500 may be an example of a wireless communication network 100 as described with reference to FIG. 1. The wireless communications system 500 may include an AP 102-*a*, which may be an example of an AP STA or an AP 102 as described herein with reference to FIG. 1. The wireless communications system 500 may additionally include a STA 104-*a* and a STA 104-*b*, which may be examples of non-AP STAs or STAs 104 as described herein with reference to FIG. 1. The AP 102-*a* may serve a coverage area 108-*a* and may communicate with the STA 104-*a*, the STA 104-*b*, or both using PDUs, such as PPDUs including one or more MPDUs, as described herein with reference to FIGS. 2-4. The wireless communications system 500 may support signaling for DSO. For example, the STA 104-*a* may communicate link-specific DSO information with the AP 102-*a* for a link 502-*a* (for example, a link 502-*a* between the STA 104-*a* and the AP 102-*a*). In some aspects, the wireless communications system 500 may support signaling of capability indications (for example, using capability signaling 504), signaling of location and bandwidth indications for one or more secondary subchannels supported for DSO (for example, using secondary subchannel signaling 506-*a*), signaling supporting enablement and disablement of a DSO mode (for example, using DSO enablement signaling 508), or any combination thereof.

In some implementations, to support DSO, the STA 104-*a* may support one or more capabilities. The STA 104-*a* may indicate, to the AP 102-*a*, the one or more capabilities using capability signaling 504 (for example, to signal static capabilities of the STA 104-*a*). The STA 104-*a* may be an example of a narrowband STA, such that the STA 104-*a* fails to support communications across the full operating bandwidth of the AP 102-*a*. That is, a first operating bandwidth of the narrowband STA 104-*a* may be relatively narrower than a second operating bandwidth of the AP 102-*a* (for example, for the specific link 502-*a*). To enable DSO, the STA 104-*a* may be capable of switching a radio of the STA 104-*a* dynamically from a primary channel (for example, a primary subchannel) to at least one non-primary channel (for example, a secondary subchannel). Additionally, or alternatively, to enable DSO, the STA 104-*a* may be capable of receiving frames sent in a single PPDU on one or more non-primary channels. For example, the AP 102-*a* may transmit a single PPDU that spans the primary channel (for example, primary subchannel) and one or more non-primary channels (for example, secondary subchannels). The STA 104-*a* may support multi-user OFDMA, frequency domain aggregate PPDUs (FD A-PPDUs), or both to receive the frames via a non-primary channel. In some implementations, the STA 104-*a* may park its radio on (for example, default to receiving via) the primary channel, and the STA 104-*a* may switch to communicating via a non-primary channel if the AP 102-*a* signals the STA 104-*a* to switch to the non-primary channel, for example, in a DSO mode.

DSO may be a link-specific feature. For example, the AP 102-*a* and the STA 104-*a* may be MLDs, where each MLD may support DSO on one or more links of a multi-link (ML) setup. In some implementations, an MLD (for example, the AP 102-*a*, the STA 104-*a*) may support DSO on a first subset of links and may refrain from supporting—or otherwise fail to support—DSO on a second subset of links. DSO support may be relatively more beneficial for links that support relatively high bandwidths (for example, to efficiently use the resources of a relatively high bandwidth). For example, the AP 102-*a*, which may be an example of an AP MLD, may support three links, including a 2.4 GHz frequency band link, a 5 GHz frequency band link, and a 6 GHz frequency band link, respectively corresponding to a 20 MHz bandwidth, an 80 MHz bandwidth, and a 160 MHz bandwidth. DSO support may provide relatively greater resource usage gains for the 6 GHz frequency band link than the 2.4 GHz frequency band link. Accordingly, in some implementations, the AP 102-*a* may support DSO for the 6 GHz frequency band link but not the 2.4 GHz frequency band link.

The STA 104-*a* may transmit the capability signaling 504 to indicate that the STA 104-*a* supports DSO (for example, on one or more links). In some implementations, the STA 104-*a* may transmit the capability signaling 504 via one link. In some other implementations, the STA 104-*a* may transmit the capability signaling 504 individually via each link on which the STA 104-*a* supports DSO. In some implementations, the STA 104-*a* may transmit the capability signaling 504 via one or more setup links. Additionally, or alternatively, the AP 102-*a* may transmit the capability signaling 504 to indicate that the AP 102-*a* supports DSO (for example, on one or more links). The capability signaling 504 may include one or more capability indications. For example, a subfield in an ultra-high reliability (UHR) capabilities element may indicate whether a STA (for example, an AP STA or a non-AP STA) transmitting the capability signaling 504 including the UHR capabilities element supports DSO. Additionally, or alternatively, the capability signaling 504 may include a DSO-specific element indicating whether the transmitting STA supports DSO. Additionally, or alternatively, the AP 102-*a* may transmit the capability signaling 504 in a beacon frame or in a follow-up beacon frame (for example, a frame sent after the beacon frame).

In some implementations, support for DSO may be based on the bandwidth of a link, the frequency band of the link, or both. As a first example, if the operating bandwidth for a link for the AP 102-*a* is 160 MHz or greater, the AP 102-*a* may support DSO for the link. If the operating bandwidth for the link for the AP 102-*a* is less than 160 MHz, the AP 102-*a* may not support DSO for the link. Accordingly, the AP 102-*a* may set a "DSO supported" subfield in the UHR capabilities element of the capability signaling 504 based on the bandwidth of the link. For example, the AP 102-*a* may set a bit value of the "DSO supported" subfield to 1 if the link bandwidth is greater than or equal to 160 MHz and may set the bit value to 0 if the link bandwidth is less than 160 MHz. As a second example, DSO may be disallowed if a link is in the 2.4 GHz band, optional if the link is in the 5 GHz band, and allowed if the link is in the 6 GHz band. Accordingly, the AP 102-*a* may set the "DSO supported" subfield to 0 if the link is in the 2.4 GHz band, 1 if the link is in the 6 GHz band, and either 0 or 1 (for example, based on one or more parameters of the AP 102-*a*) if the link is in the 5 GHz band. In some implementations, STAs (for example, AP STAs, non-AP STAs) may support other rules for determining DSO support based on link bandwidths, frequency bands, or other link parameters.

In some aspects, the capability signaling 504 may additionally, or alternatively, indicate a set of subchannels supported for DSO, a first padding or transition delay timing (for example, for the STA 104-*a* to process a control frame and switch a radio from a primary subchannel to an assigned secondary subchannel), a second padding or transition delay timing (for example, for the STA 104-*a* to switch the radio from the assigned secondary subchannel back to the primary subchannel), a threshold quantity of subchannels (for example, secondary subchannels) for which the STA 104-*a* supports concurrent communications, or any combination thereof. In some implementations, the set of subchannels supported for DSO, the padding or transition delay timing, or both also may be link-specific, STA-specific, or both.

In some aspects, a STA (for example, an AP STA or a non-AP STA) may update one or more capabilities. For example, the STA may use an ML reconfiguration framework to update one or more indicated capabilities. A non-AP STA and an AP STA may exchange a link reconfiguration request frame and a link reconfiguration response frame to indicate updated capabilities (for example, link-specific capabilities) for the STA, such as the STA 104-*a* or the AP 102-*a*.

Additionally, or alternatively, the AP 102-*a* may announce other capability information for the AP 102-*a* via announcement signaling (for example, the capability signaling 504). For example, the AP 102-*a* may transmit an indication of a threshold quantity of DSO subchannels that the AP 102-*a* supports (for example, concurrently). In some implementations, the AP 102-*a* may transmit a value indicating the threshold quantity of supported DSO subchannels, where a value of 0 or a value of 1 indicates that DSO is unsupported (for example, the AP 102-*a* supports a threshold quantity of 1 subchannel, the primary subchannel). A value greater than 1 may implicitly indicate support for DSO (for example, a value of 2 may indicate that the AP 102-*a* supports a threshold quantity of 2 subchannels currently for DSO). In some implementations, the AP 102-*a* may use this value to implicitly indicate whether the AP 102-*a* supports DSO for a link. If the AP 102-*a* announces support for a threshold quantity of DSO subchannels, m, the STA 104-*a* may not request DSO for more than m subchannels. For example, the STA 104-*a* may set up to m bit positions to 1 in a location bitmap indicating the supported set of subchannels for DSO, as described in more detail with reference to FIGS. 6A, 6B, and 6C. Additionally, or alternatively, the STA 104-*a* may indicate, via the capability signaling 504, a threshold quantity of subchannels for which the STA 104-*a* supports concurrent communications.

In some implementations, the STA 104-*a* may support switching to a finite set of subchannels for DSO. For example, if the STA 104-*a* supports DSO on three links, and each link supports four possible subchannel locations (for example, including the primary subchannel), the STA 104-*a* may support twelve possible subchannel locations across the ML setup. The STA 104-*a* may indicate the subchannels supported for DSO via secondary subchannels signaling 506-*a*. In some implementations, the STA 104-*a* may indicate link-specific sets of secondary subchannels (for example, one or more secondary subchannels) supported for DSO. For example, the secondary subchannels signaling 506-*a* may indicate location and bandwidth information for the subchannels to which the STA 104-*a* may switch for DSO, as described herein in more detailed with reference to FIGS. 6A, 6B, and 6C. The secondary subchannels signaling 506-*a* may be link-specific signaling, where the indication of the bandwidth, location, or both for a supported secondary subchannel may be link-specific, such that the STA 104-*a* indicates different granularities, different subchannel lists, or both for different links of the STA's ML setup. In some implementations, the AP 102-*a* may additionally, or alternatively, indicate supported sets of subchannels (for example, for different links).

The AP 102-*a* may receive the indication of the supported subchannels for DSO from the STA 104-*a* (for example, via the secondary subchannels signaling 506-*a*) and may allocate—or otherwise assign—one or more RUs (for example, frequency resources) to the STA 104-*a* for DSO.

The AP 102-*a* may transmit a control frame 510, such as a DSO initial control frame (ICF), assigning RUs to one or more STAs 104-*a*. The RUs (for example, frequency resources) assigned to a STA may be included in one or more of the indicated subchannels for DSO. For example, if the STA 104-*a* indicates support for DSO in a first set of subchannels, but not in a second set of subchannels, the AP 102-*a* may assign the STA 104-*a* one or more RUs within one or more subchannels of the first set of subchannels (and not within the second set of subchannels). Assigning the STA 104-*a* an RU in a first subchannel may be similarly referred to as assigning the STA 104-*a* the first subchannel.

In some implementations, the AP 102-*a* may transmit a control frame 510 that acts as a DSO Announcement frame, assigning RUs to one or more STAs 104. In some aspects, the DSO Announcement frame may be addressed to STAs 104 that support DSO. For example, if the STA 104-*b* indicates that the STA 104-*b* does not support DSO (for example, for a link 502-*b*), the DSO Announcement frame may not address (for example, may refrain from addressing) the STA 104-*b* (for example, the DSO Announcement frame may not include a User Info field with an AID field that carries the AID of the STA 104-*b*). The RUs (for example, frequency resources) in the DSO Announcement frame that are assigned to a STA that supports DSO (for example, the STA 104-*a*) may be included in one or more of the indicated subchannels for DSO for that STA. For example, if the STA 104-*a* indicates support for DSO in a first set of subchannels, but not in a second set of subchannels, the AP 102-*a* may assign the STA 104-*a* one or more RUs included within one or more subchannels of the first set of subchannels (and not within the second set of subchannels).

The DSO Announcement frame may be an example of a control frame 510 with fields defined in a UHR amendment. The DSO Announcement frame may not solicit an immediate (or otherwise low latency) response from the STAs it addresses (for example, the STA 104-*a*). The DSO Announcement frame may be followed, after a duration corresponding to a short interframe spacing (SIFS), by a DSO Confirmation frame, which may confirm that the STAs addressed by the DSO Announcement frame (for example, the STA 104-*a*) have switched to the assigned subchannels. The DSO Confirmation frame may be an HE variant or EHT variant of a trigger frame (for example, a buffer status report poll (BSRP) trigger frame) that solicits an immediate, or otherwise low latency, response (for example, a buffer status report (BSR) frame in a trigger-based (TB) PPDU format) from the STAs that are addressed by the trigger frame. The DSO Confirmation frame may be addressed to all STAs 104 that communicate with the AP 102-*a* (for example, the STA 104-*a* and the STA 104-*b*). In some aspects, the DSO Confirmation may be any variant of a trigger frame (for example, HE, EHT, or UHR) but may be different from an MU-request to send (RTS) trigger frame.

In some aspects, the AP 102-*a* may switch an assigned subchannel (for example, the assigned one or more RUs) for the STA 104-*a* within a same TxOP or in a different TxOP by transmitting another control frame 510 (for example, the DSO ICF or DSO Announcement frame) that includes an updated RU allocation field indicating one or more different RUs corresponding to one or more different subchannels supported by the STA 104-*a* for DSO. In some implementations, the control frame 510 may indicate one or more time occasions (for example, TWT Service Periods (SPs) or non-TWT Service Intervals) for the STA 104-*a* to switch to the assigned subchannel. For example, the control frame 510 (for example, the DSO ICF or DSO Announcement frame) may operate similar to an advertisement frame, allowing the AP 102-*a* and the STA 104-*a* to avoid negotiation through management frames. The STA 104-*a* may communicate via a non-primary subchannel based on switching operating bands according to the control frame 510 indicating the one or more time occasions for switching.

Different STAs may indicate different capabilities, different secondary subchannels supported for DSO, or both. For example, the AP 102-*a* may receive secondary subchannels signaling 506-*a* from the STA 104-*a* and may receive secondary subchannels signaling 506-*b* from the STA 104-*b*. Based on the different subchannels indicated by the different STAs, the AP 102-*a* may assign different RUs of the AP's operating bandwidth to the different STAs. For example, the AP 102-*a* may assign a first RU corresponding to a first secondary subchannel to the STA 104-*a* based on the secondary subchannels signaling 506-*a* and may assign a second RU corresponding to a second secondary subchannel to the STA 104-*b* based on the secondary subchannels signaling 506-*b*. The assignments for the different STAs may be indicated by a single control frame 510 or by duplicates of a same control frame 510 (for example, DUP frames).

In some implementations, the STA 104-*a*, the AP 102-*a*, or both may dynamically or semi-statically enable and disable the DSO mode using DSO enablement signaling 508. In some implementations, the DSO enablement signaling 508 may include action frames to trigger DSO mode enablement or disablement. In some other implementations, the DSO enablement signaling 508 may include A-Control fields in management frames, data frames, or both to trigger DSO mode enablement or disablement. The STA 104-*a* and the AP 102-*a* may perform a two-step or four-step procedure to enable the DSO mode, disable the DSO mode, or both, as described herein in more detail with reference to FIG. 7.

Figures 6A, 6B, 6C:
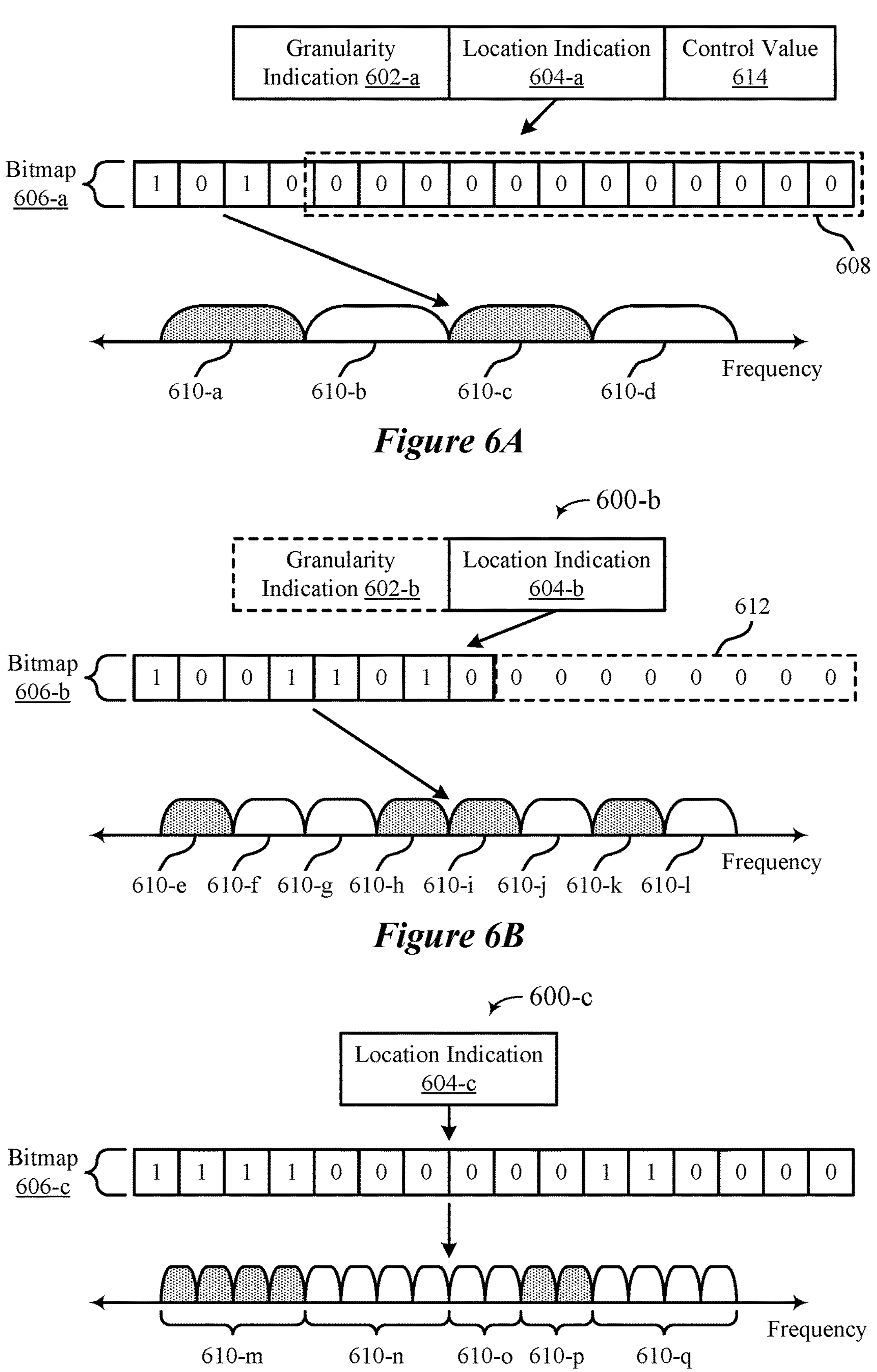
FIGS. 6A, 6B, and 6C show examples of frame contents indicating sets of subchannels supported for DSO.

FIGS. 6A, 6B, and 6C show examples of frame contents indicating sets of subchannels supported for DSO. FIG. 6A shows an example of frame contents 600-*a*. In some implementations, a STA, such as a STA 104 described herein with reference to FIGS. 1 and 5, may transmit the frame contents 600-*a* to indicate support for a set of secondary subchannels for DSO. For example, the frame contents 600-*a* may be an example or a component of the secondary subchannels signaling as described herein with reference to FIG. 5. The STA may transmit a first frame, such as an action frame, a request frame, an acknowledgment frame, or any other frame, that includes the frame contents 600-*a*. The frame contents 600-*a* may indicate a bandwidth for one or more supported subchannels, locations for one or more supported subchannels, or both. An AP, such as an AP 102 described herein with reference to FIGS. 1 and 5, may receive the frame contents 600-*a* and determine the set of secondary subchannels supported for DSO by the STA. In some implementations, the frame contents 600-*a* may be STA-specific, link-specific, or both. For example, the STA may include, with the frame contents 600-*a* indicating the set of secondary subchannels supported for DSO, a link identifier (ID) indicating the link corresponding to the supported set of subchannels.

The frame contents 600-*a* may indicate support for a set of secondary subchannels for DSO using a combination of indicating subchannel granularity (for example, a bandwidth for the subchannels) and indicating locations of subchannels. For example, the frame contents 600-*a* may include a granularity indication 602-*a* and a location indication 604-*a*. In some implementations, the granularity of the subchannels may be 20 MHz, 40 MHz, 80 MHz, or 160 MHz. The granularity indication 602-*a* may be an example of a subfield value indicating a granularity (for example, bandwidth) for the set of supported subchannels based on an encoding. Table 1 illustrates an example of bit values and associated granularities indicated by the granularity indication 602-*a*, where the granularity indication 602-*a* may be an example of an octet indicating a bit value between 0 and 255.

TABLE 1

Example Granularity Indications

| Subfield Value | Granularity |
|---|---|
| 0 | 20 MHz |
| 1 | 40 MHz |
| 2 | 80 MHz |
| 3 | 160 MHz |
| 4-255 | Reserved |

The location indication 604-*a* may be an example of a bitmap 606-*a*, such as a 16-bit bitmap. The bitmap 606-*a* may indicate the locations of the supported subchannels within an operating bandwidth of an AP 102. For example, each bit position, i, within the bitmap 606-*a* may indicate the STA's ability (or preference) to switch to the $i^{th}$ subchannel that is X MHz wide, starting from the lowest frequency of the AP's operating bandwidth, where X is the bandwidth indicated by the granularity indication 602-*a*. Extra bits in the bitmap 606-*a* may be reserved. For example, for the frame contents 600-*a*, the granularity indication 602-*a* may indicate a granularity of 80 MHz (for example, based on the STA 104 supporting an operating bandwidth of 80 MHz) and the AP 102 may support an operating bandwidth of 320 MHz. The STA 104 may use 4 bits of the bitmap 606-*a* to indicate whether the STA 104 supports DSO for the 4 subchannels with bandwidths of 80 MHz within the 320 MHz operating bandwidth of the AP 102. A first bit of the bitmap 606-*a* may indicate whether the STA supports a first subchannel 610-*a* of the AP's operating bandwidth for DSO, a second bit of the bitmap 606-*a* may indicate whether the STA supports a second subchannel 610-*b* of the AP's operating bandwidth for DSO, a third bit of the bitmap 606-*a* may indicate whether the STA supports a third subchannel 610-*c* of the AP's operating bandwidth for DSO, and a fourth bit of the bitmap 606-*a* may indicate whether the STA supports a fourth subchannel 610-*d* of the AP's operating bandwidth for DSO. The remaining bits (for example, 4 bits for a single octet or 12 bits for two octets) of the bitmap 606-*a* may be reserved bits 608. In some aspects, the reserved bits 608 may be set to a default value, such as 0, or used to transmit other information. In some implementations, the bitmap 606-*a* may indicate that the STA 104 supports DSO for the first subchannel 610-*a* and the third subchannel 610-*c* (for example, using 1 bits in the bitmap 606-*a* to indicate supported subchannels and 0 bits in the bitmap 606-*a* to indicate unsupported subchannels). The first subchannel 610-*a* may be the primary subchannel, while the third subchannel 610-*c* may be a secondary subchannel. The STA 104 may default to communicating via the primary subchannel but may switch to communicating via a supported secondary subchannel, such as the third subchannel 610-*c*, if the AP 102 assigns one or more frequency resources from the supported secondary subchannel to the STA 104 for DSO communications.

Supporting DSO for a subchannel may involve the STA 104 being capable of dynamically switching to the subchannel, preferring (or otherwise being willing) to switch to the subchannel, or some combination thereof. For example, in some implementations, a 1 bit value in the bitmap 606-*a* may indicate that the STA 104 is capable of switching to the corresponding subchannel. In some other implementations, a 1 bit value in the bitmap 606-*a* may indicate that the STA 104 prefers switching to the corresponding subchannel. In some aspects, the frame contents 600-*a* may further include a control field indicating a control value 614. The control value 614 may indicate an interpretation of the bit values in the bitmap 606-*a*. For example, if the control field is set to a first control value 614, the bitmap 606-*a* may indicate subchannel locations that the STA 104 can switch to. If the control field is set to a second control value 614, the bitmap 606-*a* may indicate subchannel locations that the STA 104 prefers switching to.

FIG. 6B shows an example of frame contents 600-*b*. A STA 104 may transmit a frame including the frame contents 600-*b* to an AP 102 to indicate a set of subchannels supported for DSO by the STA 104. The frame contents 600-*b* may include a granularity indication 602-*b* and a location indication 604-*b*, which may be an example of a bitmap 606-*b*, as described herein with reference to FIG. 6A.

In some implementations, the frame contents 600-*b* may not include the granularity indication 602-*b*. For example, instead of the STA 104 indicating the granularity for the supported subchannels in the frame contents 600-*b*, the AP 102 may determine the granularity or the granularity may be configured (for example, within the IEEE standards). For example, the granularity may be fixed to 20 MHz, 80 MHz, or some other value. Accordingly, the STA 104 may reduce the signaling overhead associated with the frame contents 600-*b* by refraining from including the granularity indication 602-*b*. In some other implementations, the granularity indication 602-*b* may be optional. For example, the STA 104 may be configured with a default granularity. However, the STA 104 may indicate a different granularity (for example, different from the default granularity) using the optional granularity indication 602-*b*. Including the granularity indication 602-*b* in the frame contents 600-*b* may improve flexibility and allow the STA 104 to support additional bandwidth options (for example, 640 MHz in a 60 GHz frequency band).

Additionally, or alternatively, the frame contents 600-*b* may support efficient encoding of the bitmap 606-*b*. For example, instead of using a fixed 16-bit encoding, the frame contents 600-*b* may support a variable size bitmap 606-*b*, where the bitmap size may be based on the granularity of the subchannels and the operating bandwidth of the AP 102. As an example, the granularity indication 602-*b* (or a default granularity) may indicate a 20 MHz granularity for the subchannels, and the AP 102 may support an operating bandwidth of 160 MHz. Accordingly, the bitmap 606-*b* may include a first bit indicating whether the STA 104 supports DSO for a first subchannel 610-*e*, a second bit indicating whether the STA 104 supports DSO for a second subchannel 610-*f*, a third bit indicating whether the STA 104 supports DSO for a third subchannel 610-*g*, a fourth bit indicating whether the STA 104 supports DSO for a fourth subchannel 610-*h*, a fifth bit indicating whether the STA 104 supports DSO for a fifth subchannel 610-*i*, a sixth bit indicating whether the STA 104 supports DSO for a sixth subchannel 610-*j*, a seventh bit indicating whether the STA 104 supports DSO for a seventh subchannel 610-*k*, and an eight bit indicating whether the STA 104 supports DSO for an eighth subchannel 610-*l*. Because the STA 104 can indicates support for the full set of subchannels within the AP's operating bandwidth using a single octet (for example, the eight bits), the STA 104 may reduce the size of the bitmap 606-*b* to one octet (for example, refraining from encoding a second octet 612). The STA 104 may use two octets if the AP's operating bandwidth is 320 MHz (or greater) and the subchannel granularity is 20 MHz (or less). Otherwise, the STA 104 may use one octet for the bitmap 606-*b* to reduce the signaling overhead associated with the frame contents 600-*b*.

In some implementations, the STA 104 may set one or more bits of the bitmap 606-*b* corresponding to one or more primary subchannels to 0. For example, because the STA 104 may park on one or more primary subchannels, the STA 104 may not switch to a primary subchannel for DSO. Alternatively, the STA 104 may set the one or more bits of the bitmap 606-*b* corresponding to the one or more primary subchannels to 1 (for example, indicating that the STA 104 supports communicating via the one or more primary subchannels). In some other implementations, the STA 104 may use the one or more bits of the bitmap 606-*b* corresponding to the one or more primary subchannels to indicate the STA's preference to communicate via a primary subchannel (for example, as compared to a secondary subchannel). For example, if the STA 104 sets a bit corresponding to a primary subchannel to 0, the bit value of 0 may indicate that the STA 104 prefers to communicate via a secondary subchannel with a corresponding bit set to 1 rather than via the primary subchannel.

As an example, the first subchannel 610-*e* and the second subchannel 610-*f* may correspond to a secondary subchannel, S40, the third subchannel 610-*g* and the fourth subchannel 610-*h* may correspond to a primary subchannel, P40, and the fifth subchannel 610-*i*, the sixth subchannel 610-*j*, the seventh subchannel 610-*k*, and the eighth subchannel 610-*l* may correspond to a secondary subchannel S80. The STA 104 may indicate, via the bitmap 606-*b*, support for DSO on the first subchannel 610-*e*, the fourth subchannel 610-*h*, the fifth subchannel 610-*i*, and the seventh subchannel 610-*k*. Including a 0 bit value corresponding to the third subchannel 610-*g* and a 1 bit value corresponding to the fourth subchannel 610-*h* may indicate that the STA 104 prefers the indicated secondary subchannels over the third subchannel 610-*g* (for example, a primary subchannel) but not over the fourth subchannel 610-*h* (for example, another primary subchannel).

FIG. 6C shows an example of frame contents 600-*c*. A STA 104 may transmit a frame including the frame contents 600-*c* to an AP 102 to indicate a set of subchannels supported for DSO by the STA 104. The frame contents 600-*c* may include a location indication 604-*c*, which may be an example of a bitmap 606-*c*, as described herein with reference to FIGS. 6A and 6B. However, the STA 104 may refrain from indicating granularity information in the frame contents 600-*c*, for example, based on the STA 104 using a default granularity, as described herein with reference to FIG. 6B. The default granularity may be 20 MHz (for example, to support narrowband STAs with operating bandwidths of 20 MHz). Alternatively, the default granularity may be 80 MHz (for example, to support relatively wideband communications).

The AP 102 may support an operating bandwidth of 320 MHz, and the STA 104 may support an operating bandwidth of 80 MHz. The bitmap 606-*c* may include bit values (for example, 1 values or other bit values) indicating subchannels supporting DSO. In some implementations, consecutive 1 values in the bitmap 606-*c* may potentially indicate aggregate subchannels supporting DSO. For example, the first four bit values in the bitmap 606-*c* may be 1s, indicating that the STA 104 supports DSO on the lowest 80 MHz of the AP's operating bandwidth (for example, the aggregate subchannel 610-*m* including the four 20 MHz spans corresponding to the first four bits of the bitmap 606-*c*).

In some aspects, the bitmap 606-*c* may indicate different bandwidth sizes for different subchannels. For example, the bitmap 606-*c* may use the first four bits to indicate support for DSO on a first subchannel 610-*m* with a bandwidth of 80 MHz, the next four bits to indicate no support for DSO on a second subchannel 610-*n* with a bandwidth of 80 MHz, the next two bits to indicate no support for DSO on a third subchannel 610-*o* with a bandwidth of 40 MHz, the next two bits to indicate support for DSO on a fourth subchannel 610-*p* with a bandwidth of 40 MHz, and the last four bits to indicate no support for DSO on a fifth subchannel 610-*q*. Because the STA 104 supports an operating bandwidth of 80 MHz, the STA 104 may communicate via a bandwidth up to 80 MHz. Accordingly, the STA 104 may support switching to a secondary subchannel 610-*p* with a bandwidth of 40 MHz, less than the full supported operating bandwidth of the STA 104.

Figure 7:
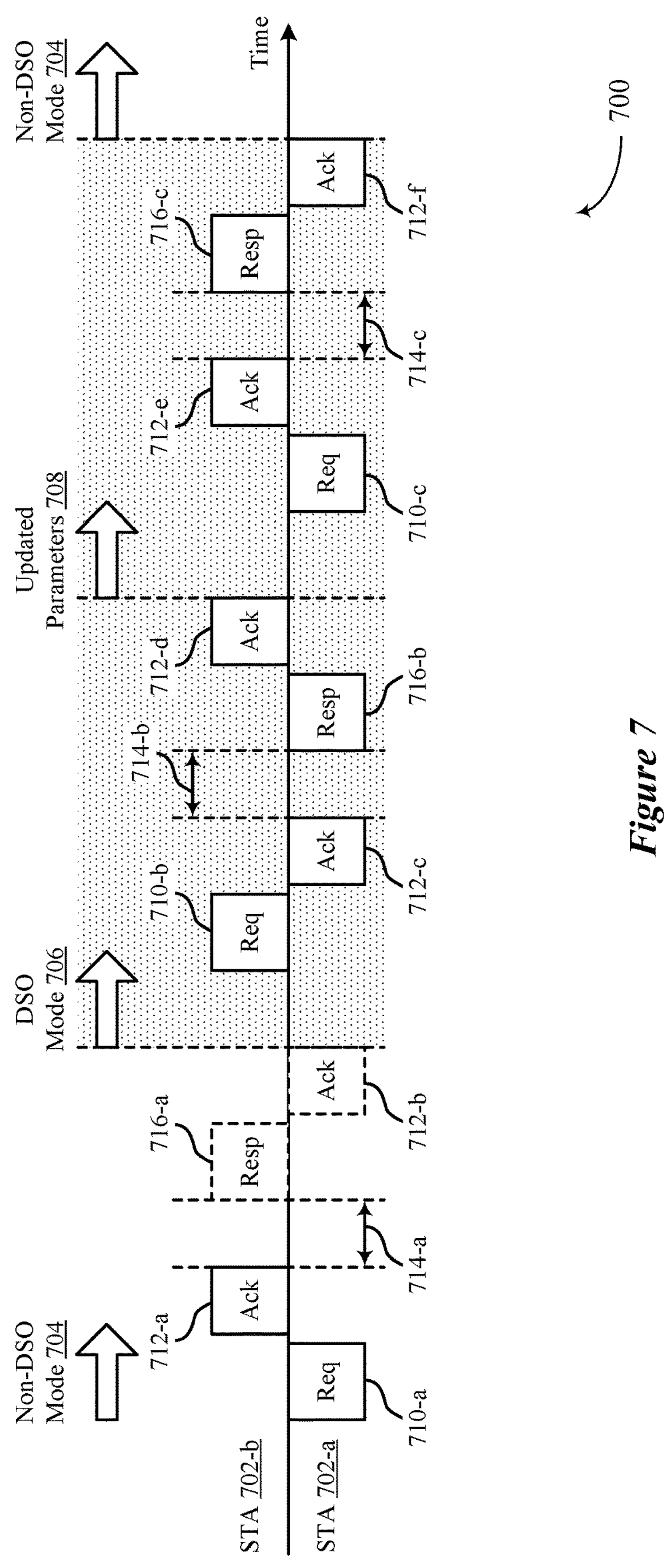
FIG. 7 shows an example of DSO enablement and disablement techniques.

FIG. 7 shows an example of DSO enablement and disablement techniques 700. A wireless communication network 100 or a wireless communications system 500, as described with reference to FIGS. 1 and 5, may support the DSO enablement and disablement techniques 700. For example, a first STA 702-*a* and a second STA 702-*b* may exchange signaling to enable a DSO mode, disable a DSO mode, or both. The first STA 702-*a* may be an example of a non-AP STA, such as a STA 104, or an AP STA, such as an AP 102. Similarly, the second STA 702-*b* may be an example of a non-AP STA, such as a STA 104, or an AP STA, such as an AP 102. A STA 104 or an AP 102 may initiate enabling a DSO mode 706, disabling a DSO mode, updating one or more parameters 708 for the DSO mode 706, or any combination thereof.

The first STA 702-*a* (for example, a non-AP STA, an AP STA) may dynamically or semi-statically enable the DSO mode 706 (for example, for a non-AP STA). For example, the first STA 702-*a*, the second STA 702-*b*, or both may initially operate in a non-DSO mode 704. The first STA 702-*a* may transmit a request 710-*a* to the second STA 702-*b* to enable the DSO mode 706. The request 710-*a* may indicate to enable the DSO mode 706, may indicate a padding or transition delay, may indicate a set of supported subchannels for DSO (for example, one or more bandwidths and locations for the supported subchannels), or any combination thereof.

Different non-AP STAs may send different information in requests (for example, in action frames). Additionally, or alternatively, a single non-AP STA (for example, the first STA 702-*a*) may send different information in different requests. The non-AP STA may operate with different subchannel granularities, different subchannel locations, or both on the same link at different times (for example, based on the information included in the request 710-*a*). In some implementations, an AP STA may respond to a request 710-*a* (for example, in a response 716-*a*) with a modified subchannel list for the non-AP STA. The modified list may indicate one or more subchannels for the non-AP STA to use for DSO. In some aspects, the AP STA may follow one or more rules or constraints for modifying the subchannel list. For example, the AP STA may refrain from modifying the indicated subchannel granularity. Additionally, or alternatively, the AP STA may support decreasing the quantity of supported subchannels but may not support increasing the quantity of supported subchannels. Additionally, or alternatively, the AP STA may refrain from changing the quantity of supported subchannels but may change the locations of the supported subchannels.

In some implementations, the request 710-*a* may be an example of an action frame. The second STA 702-*b* may transmit, in response to the action frame, an acknowledgment frame 712-*a*, such as a control acknowledgment frame. In some implementations, the second STA 702-*b* may process the request 710-*a* during a time 714-*a*. Based on processing the request 710-*a*, the second STA 702-*b* may transmit a response 716-*a* action frame. For example, if the second STA 702-*b* is an AP 102, the second STA 702-*b* may transmit the response 716-*a* when the AP 102 is ready to serve the first STA 702-*a* (for example, a STA 104) in the DSO mode 706. The first STA 702-*a* may transmit, in response to the response 716-*a* action frame, an acknowledgment frame 712-*b*, such as a control acknowledgment frame. The first STA 702-*a* and the second STA 702-*b* may operate in the DSO mode 706 based on the acknowledgment frame 712-*b*. For example, the first STA 702-*a*, the second STA 702-*b*, or both may trigger enabling the DSO mode 706 based on the acknowledgment frame 712-*b*. Accordingly, the STAs may support a four-step enablement procedure (for example, a four-way exchange of signaling) to enable the DSO mode 706, similar to a procedure for enabling an enhanced multi-link single radio (EMLSR) or enhanced multi-link multiple radio (EMLMR) mode. In some implementations, the first STA 702-*a* and the second STA 702-*b* may automatically transition to the DSO mode 706 after a length of time defined by a timeout value, even if the second STA 702-*b* does not respond with a response 716-*a* action frame. For example, the first STA 702-*a* and the second STA 702-*b* may automatically enable the DSO mode 706 based on the acknowledgment frame 712-*a* in response to the request 710-*a*. Accordingly, the STAs may support a two-step enablement procedure (for example, a two-way exchange of signaling) to enable the DSO mode 706.

In some other implementations, the request 710-*a* may be an example of a management frame or a data frame including an A-Control subfield indicating to enable the DSO mode 706. For example, the management frame or data frame may include the A-Control subfield in a header, and the request 710-*a* may indicate to enable the DSO mode 706 using a UHR operating mode indication (OMI). Using the A-Control subfield for enablement may involve a two-way exchange (for example, the request 710-*a* and corresponding acknowledgment frame 712-*a*) or a four-way exchange (for example, the request 710-*a*, corresponding acknowledgment frame 712-*a*, a response 716-*a*, which may be an example of another A-Control subfield, and corresponding acknowledgment frame 712-*b*). An AP 102 may use the four-way exchange to modify the set of subchannels indicated in the request 710-*a*. For example, the AP 102 may modify the indicated granularity, location information, or both for the subchannels supporting DSO. The STAs may enter the DSO mode 706 starting at a next TxOP initiated by the AP 102 or after a timeout specified by the AP 102 (for example, after x TxOPs, or y beacon intervals, or z time units (TUs), or 1.024 milliseconds, or some other time interval).

Each non-AP STA that supports DSO may independently negotiate (for example, indicate) the granularity of DSO subchannels, the locations of DSO subchannels, or both. Additionally, or alternatively, the non-AP STAs may independently enable the DSO mode 706. In some other implementations, the AP 102 may enable the DSO mode 706 for a set of non-AP STAs supporting DSO to efficiently utilize the AP's operating bandwidth. For example, the AP 102 may initiate a DSO mode switch (for example, enablement or disablement) with an associated STA 104 that has indicated support for DSO. The AP 102, similar to a STA 104, may initiate the DSO mode switch using action frames, A-Control subfields, or both. Additionally, or alternatively, the AP 102 may similarly negotiate the granularity of DSO subchannels, the locations of DSO subchannels, or both for the AP 102, one or more STAs 104, or some combination thereof. In some implementations, the AP 102 may recommend a DSO mode switch or a subchannel update (for example, a change to the granularity of DSO subchannels, the locations of DSO subchannels, or both) to a STA 104, and the STA 104 may determine whether to perform the DSO mode switch or the subchannel update. For example, the STA 104 may receive the recommendation from the AP 102 and may determine whether to trigger a corresponding update based on the recommendation.

In some implementations, STAs may support updating one or more parameters 708 while operating in the DSO mode 706. A STA, such as the second STA 702-*b* (or the first STA 702-*a*) may transmit a request 710-*b* indicating to enable the DSO mode (for example, indicating to maintain the currently active DSO mode 706), an updated padding or transition delay, an updated set of subchannels supporting DSO (for example, an updated subchannel bandwidth, one or more updated subchannel locations), or any combination thereof. The request 710-*b* indicating the updates may be an action frame or an A-Control subfield. The first STA 702-*a* may respond with an acknowledgment frame 712-*c*. In a two-way exchange, the STAs may update the one or more parameters 708 for the DSO mode 706 based on the acknowledgment frame 712-*c* (for example, after a time 714-*b* for processing the request 710-*b*). In a four-way exchange, the first STA 702-*a* may transmit a response 716-*b*, and the second STA 702-*b* may transmit a corresponding acknowledgment frame 712-*d* to trigger updating the one or more parameters 708 for the DSO mode 706. Accordingly, the STAs may update DSO parameters without exiting the DSO mode 706, improving a latency associated with updating the DSO parameters.

In some implementations, a STA may exit a DSO mode 706 into a non-DSO mode 704 based on a timeout value. In some other implementations, the STA may exit the DSO mode 706 using similar signaling techniques as used to enable the DSO mode 706. For example, the first STA 702-*a* (or the second STA 702-*b*) may transmit a request 710-*c* indicating to disable the DSO mode 706. The request 710-*c* to disable the DSO mode 706 may be an action frame or an A-Control subfield. The second STA 702-*b* may respond with an acknowledgment frame 712-*e*. In a two-way exchange, the STAs may disable the DSO mode 706 based on the acknowledgment frame 712-*e* (for example, after a time 714-*c* for processing the request 710-*c*). In a four-way exchange, the second STA 702-*b* may transmit a response

716-*c*, and the first STA 702-*a* may transmit a corresponding acknowledgment frame 712-*f* to trigger disabling the DSO mode 706 (or, alternatively, enabling the non-DSO mode 704).

In some implementations, a STA may use an acknowledgment frame to change a list of subchannels supporting DSO (for example, during a TxOP) or to change any other DSO parameter (for example, the padding delay, the transition delay). For example, the acknowledgment frame may be transmitted in response to one or more preceding frames. An AP may send another control frame via a subchannel from the updated set of supported subchannels indicated by the acknowledgment frame in the same TxOP.

In some implementations, the AP may not be capable of updating the DSO parameters sent in Acknowledgement frames or A-Control subfields within the same TxOP (for example, or until a specific amount of time has elapsed). In some such implementations, the AP may use the updated DSO parameters starting at the next TxOP or starting at a TxOP after the specific amount of time has elapsed. In some implementations, the AP may announce, or otherwise indicate, this specific amount of time during capability exchanges (such as in Beacon frames, Probe Response frames, Association Request frames, Reassociation Request frames, or any combination thereof).

Figure 8:
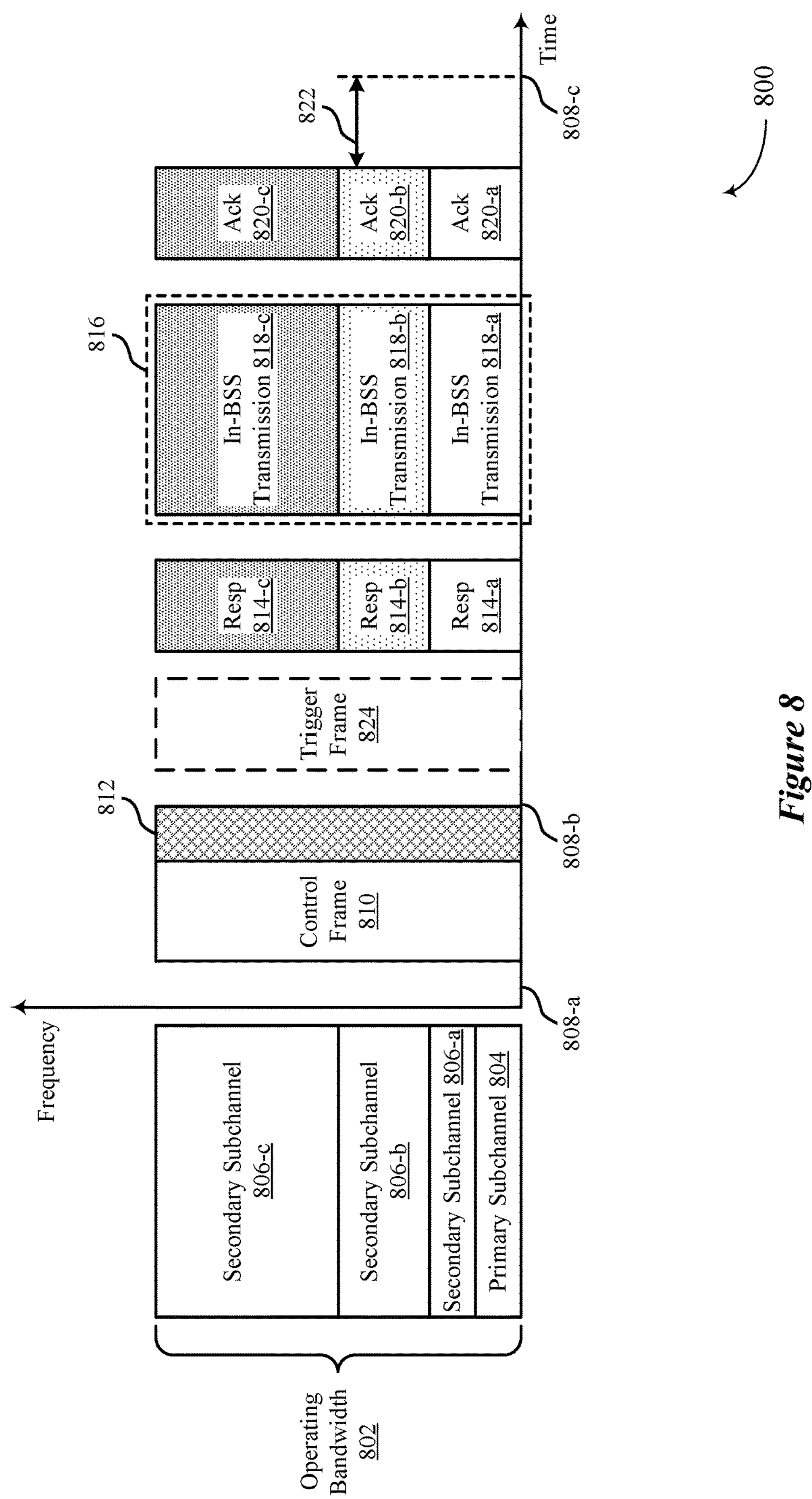
FIG. 8 shows an example of a channel access protocol that supports a DSO mode.

FIG. 8 shows an example of a channel access protocol 800 that supports a DSO mode. A wireless communication network 100 or a wireless communications system 500, as described with reference to FIGS. 1 and 5, may support the channel access protocol 800. For example, an AP 102 may communicate with multiple STAs 104 in accordance with the channel access protocol 800. For example, if the AP 102, one or more STAs 104, or both are operating in a DSO mode (as described with reference to FIG. 7), the AP 102 and the one or more STAs 104 may communicate according to the channel access protocol 800 to support dynamically switching subchannels to efficiently utilize the operating bandwidth 802 of the AP 102.

In some aspects, the operating bandwidth 802 of the AP 102 may include one or more subchannels, such as a primary subchannel 804 (for example, primary 20 (P20) spanning 20 MHz) and one or more secondary subchannels. In some implementations, the secondary subchannels may include a first secondary subchannel 806-*a* (for example, secondary 20 (S20) spanning 20 MHz), a second secondary subchannel 806-*b* (for example, secondary 40 (S40) spanning 40 MHz), and a third secondary subchannel 806-*c* (for example, secondary 80 (S80) spanning 80 MHz). One or more STAs 104 may indicate support for switching to one or more of the secondary subchannels for DSO. For example, a first STA 104 may not indicate support for DSO, a second STA 104 may indicate support for the second secondary subchannel 806-*b*, and a third STA 104 may indicate support for the second secondary subchannel 806-*b* and the third secondary subchannel 806-*c*.

At time 808-*a*, the STAs 104 may communicate via the primary subchannel 804. For example, the STAs 104 may initially park on the primary subchannel 804. Based on an operating bandwidth for the STAs 104, one or more of the STAs 104 may further communicate via one or more secondary subchannels. For example, if the first STA 104 operates with a narrowband operating bandwidth of 40 MHz, the first STA 104 may communicate via the primary subchannel 804 and the first secondary subchannel 806-*a*, collectively spanning 40 MHz.

The AP 102 may transmit a control frame 810 (for example, a DSO ICF or a DSO Announcement frame) to the STAs 104 assigning secondary subchannels (for example, one or more frequency resources within the secondary subchannels) to one or more of the STAs 104 for DSO. The control frame 810 may be based on the indicated secondary subchannels supported by the STAs 104. For example, the control frame 810 may assign the second secondary subchannel 806-*b* (for example, S40) to the second STA 104 and may assign the third secondary subchannel 806-*c* (for example, S80) to the third STA 104. In some implementations, the control frame 810 may assign one or more frequency resources to a STA 104 that includes a frequency portion or chunk that is relatively smaller than a full subchannel span. In some such implementations, the STA 104 may determine to switch to a subchannel including the assigned one or more frequency resources. Additionally, or alternatively, the control frame 810 may assign frequency resources spanning multiple subchannels of the indicated subchannels, and the STA 104 may determine to switch to operating via the multiple subchannels based on the control frame 810. The control frame 810 may be an example of a non-high-throughput (HT) DUP frame (for example, a trigger frame duplicated across multiple subchannels of the operating bandwidth 802), an MU-RTS frame, or a DSO ICF. The control frame 810 may trigger the one or more STAs 104 to switch to the assigned secondary subchannels for DSO communications.

The AP 102 may communicate random (or semi-random) signaling as padding 812 signaling or may refrain from communicating during some padding 812 time that provides enough time for the STAs 104 to process the control frame 810 and switch to the assigned secondary subchannels. For example, the AP 102 may transmit the padding 812 signaling to occupy the channel while the STAs 104 switch operating frequencies. In some implementations, the length of the padding 812 may be based on STA capabilities. For example, if the second STA 104 can process the control frame 810 and tune to the assigned frequency (for example, the second secondary subchannel 806-*b*) in 16 microseconds (μs) and the third STA 104 can process the control frame 810 and tune to the assigned frequency (for example, the third secondary subchannel 806-*c*) in 32 μs, the AP 102 may set the length of the padding 812 (for example, the padding 812 signaling) to span at least 32 μs. The STAs 104 may report delay times for processing the control frame 810, switching to the assigned subchannel, or both to the AP 102 in capability signaling, operational mode signaling, or both, where the delay times may be STA-specific (for example, client-specific), link-specific, or both.

At time 808-*b*, the STAs 104 may complete switching to the assigned subchannels. For example, the first STA 104 may remain on the primary subchannel 804 and the first secondary subchannel 806-*a*, the second STA 104 may switch to the second secondary subchannel 806-*b*, and the third STA 104 may switch to the third secondary subchannel 806-*c*. In some implementations, the AP 102 may transmit a trigger frame 824 to confirm that the STAs 104 completed switching to the designated (for example, assigned) subchannels. The trigger frame 824 may be an example of a DSO confirmation frame, a BSRP trigger frame, a control frame, or any other trigger frame.

Once the STAs 104 have switched to the assigned subchannels, the STAs 104 may perform a CCA-energy detection (ED) during a SIFS on the assigned subchannels (for example, the designated subchannels) to determine whether the assigned subchannels are available for communication. For example, the AP 102 may assign the second secondary subchannel 806-*b* to the second STA 104 based on the AP

102 failing to detect other communications occurring via the second secondary subchannel 806-*b*. However, the second STA 104 may switch to the second secondary subchannel 806-*b* and may perform the CCA-ED to detect if another device hidden from the AP 102 but detectable by the second STA 104 is transmitting via the second secondary subchannel 806-*b*. The STAs 104 may transmit response frames to the AP 102 via the assigned subchannels based on determining that the assigned subchannels are available for communications (for example, based on the CCA-ED results). For example, the first STA 104 may transmit a response frame 814-*a* (for example, a clear to send (CTS) signal) via the primary subchannel 804 and the first secondary subchannel 806-*a*, the second STA 104 may transmit a response frame 814-*b* via the second secondary subchannel 806-*b*, and the third STA 104 may transmit a response frame 814-*c* via the third secondary subchannel 806-*c*. The response frames may indicate to the AP 102 that the STAs 104 are ready to communicate frames via the assigned subchannels in the DSO mode.

Based on receiving the response frames, the AP 102 may exchange frames with the STAs 104 via the assigned subchannels (for example, in a single PPDU 816, such as an EHT MU PPDU). For example, the AP 102 may transmit a PPDU 816 include multiple MPDUs corresponding to the different assigned subchannels. The first STA 104 may receive an in-BSS transmission 818-*a* via the primary subchannel 804 and the first secondary subchannel 806-*a* (for example, spanning 40 MHz), the second STA 104 may receive an in-BSS transmission 818-*b* via the second secondary subchannel 806-*b* (for example, spanning 40 MHz), and the third STA 104 may receive an in-BSS transmission 818-*c* via the third secondary subchannel 806-*c* (for example, spanning 80 MHz). Additionally, or alternatively, the STAs 104 may transmit PPDUs 816, MPDUs, or a combination thereof to the AP 102 via the assigned subchannels. The AP 102 and the STAs 104 may exchange more than one SIFS-separated PPDUs 816 while operating via the assigned subchannels in the DSO mode.

Based on exchanging one or more frames via the assigned subchannels, the AP 102, the STAs 104, or both may transmit acknowledgment frames to indicate successful reception of the one or more frames. For example, the first STA 104 may transmit an acknowledgment frame 820-*a* via the primary subchannel 804 and the first secondary subchannel 806-*a*, the second STA 104 may transmit an acknowledgment frame 820-*b* via the second secondary subchannel 806-*b*, and the third STA 104 may transmit an acknowledgment frame 820-*c* via the third secondary subchannel 806-*c*. The STAs 104 (for example, the second STA 104 and the third STA 104) may continue monitoring the assigned subchannels after communicating the acknowledgment frames to listen for any additional frames. The STAs 104 may remain on the assigned subchannels for an additional timeout interval 822, such as a SIFS time, a slot time, a receive physical start delay time (for example, spanning 14 μs), or a combination thereof. If a STA 104 fails to receive a packet addressed to the STA 104 via the assigned subchannel by the end of the additional timeout interval 822, the STA 104 may switch back to the primary subchannel 804. For example, at time 808-*c*, the second STA 104 may initiate switching back from operating via the second secondary subchannel 806-*b* to operating via at least the primary subchannel 804, and the third STA 104 may initiate switching back from operating via the third secondary subchannel 806-*c* to operating via at least the primary subchannel 804. Additionally, or alternatively, the control frame 810 may indicate a time duration (for example, the additional timeout interval 822) for a STA 104 to remain operating via the assigned subchannel before switching back to the primary subchannel 804.

Figure 9:
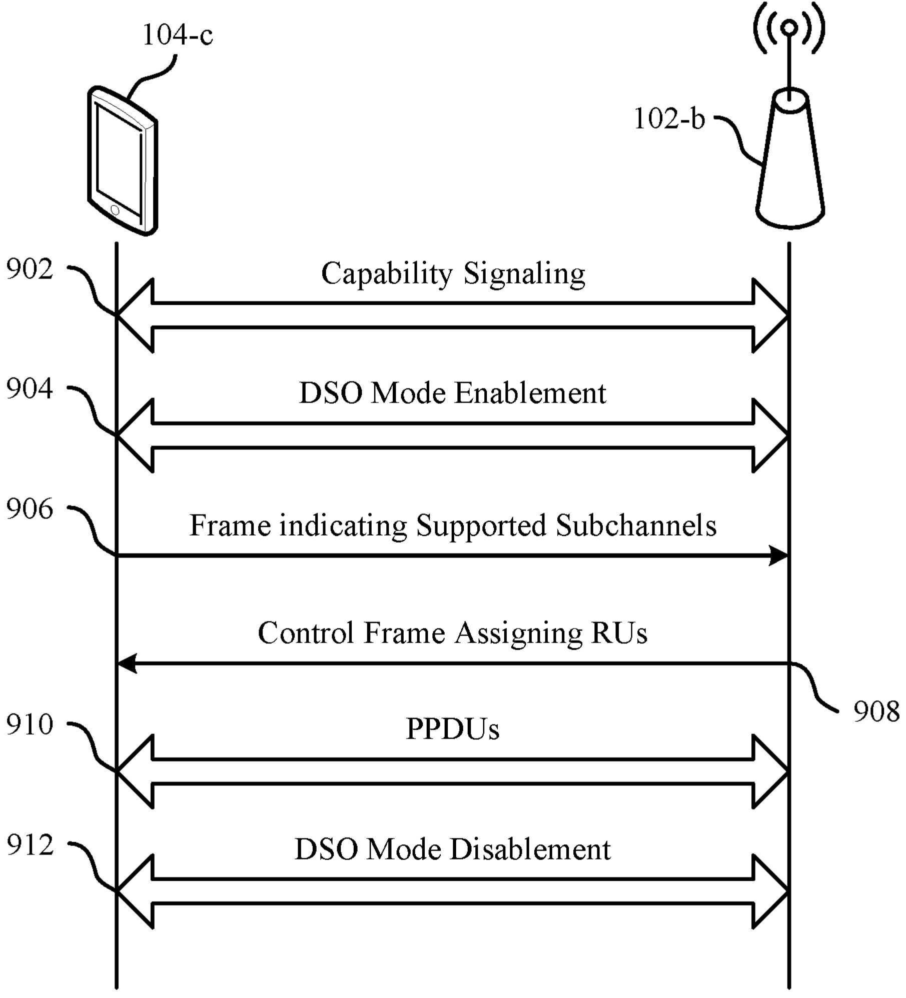
FIGS. 9 and 10 show examples of process flows that support signaling for DSO.

FIG. 9 shows an example of a process flow 900 that supports signaling for DSO. The process flow 900 may implement, or be implemented by, aspects of the wireless communication network 100, the wireless communications system 500, or a combination thereof. For example, the process flow 900 may include a STA 104-*c* (for example, a non-AP STA) and an AP 102-*b* (for example, an AP STA), which may be examples of corresponding devices described herein with reference to FIGS. 1-8. In the following description of the process flow 900, the operations may be performed in a different order than the order shown. Specific operations also may be left out of the process flow 900, or other operations may be added to the process flow 900. Further, although some operations or signaling may be shown to occur at different times for discussion purposes, these operations may occur at the same time.

At 902, the STA 104-*c* and the AP 102-*b* may exchange capability signaling. In some implementations, the STA 104-*c* may report DSO capability information of the STA 104-*c* to the AP 102-*b*. Additionally, or alternatively, the AP 102-*b* may transmit DSO capability information of the AP 102-*b* to the STA 104-*c*.

At 904, the STA 104-*c* and the AP 102-*b* may exchange DSO mode enablement signaling. For example, the STA 104-*c* and the AP 102-*b* may exchange action frames, A-Control subfields, request frames, acknowledgment frames, or any combination thereof to trigger the STA 104-*c* to enter a DSO mode. The STA 104-*c* or the AP 102-*b* may initiate the DSO mode enablement procedure.

At 906, the STA 104-*c* may transmit a first frame indicating support for a set of secondary subchannels for DSO. In some implementations, the STA 104-*c* may transmit the first frame as part of the DSO mode enablement signaling. The AP 102-*b* may receive the first frame and determine a frequency resource (for example, one or more frequency resources or RUs) from the indicated set of secondary subchannels to assign to the STA 104-*c* for DSO.

At 908, the AP 102-*b* may transmit a control frame assigning, to the STA 104-*c* for the DSO, a frequency resource included in at least one secondary subchannel of the set of secondary subchannels. In some implementations, the AP 102-*b* may transmit the control frame based on the STA 104-*c* operating in the enabled DSO mode. The STA 104-*c* may receive the control frame and initiate a switch from a primary subchannel to the at least one secondary subchannel including the assigned frequency resource.

At 910, the STA 104-*c* and the AP 102-*b* may exchange PPDUs via the assigned frequency resource of the at least one secondary subchannel. For example, the STA 104-*c* may receive an MPDU of a PPDU from the AP 102-*b*, the MPDU corresponding to the assigned frequency resource. Additionally, or alternatively, the AP 102-*b* may receive an MPDU of a PPDU from the STA 104-*c* via the assigned frequency resource.

At 912, the STA 104-*c* and the AP 102-*b* may exchange DSO mode disablement signaling. For example, the STA 104-*c* and the AP 102-*b* may exchange action frames, A-Control subfields, request frames, acknowledgment frames, or any combination thereof to trigger the STA 104-*c* to disable the DSO mode. The STA 104-*c* or the AP 102-*b* may initiate the DSO mode disablement procedure.

Figure 10:
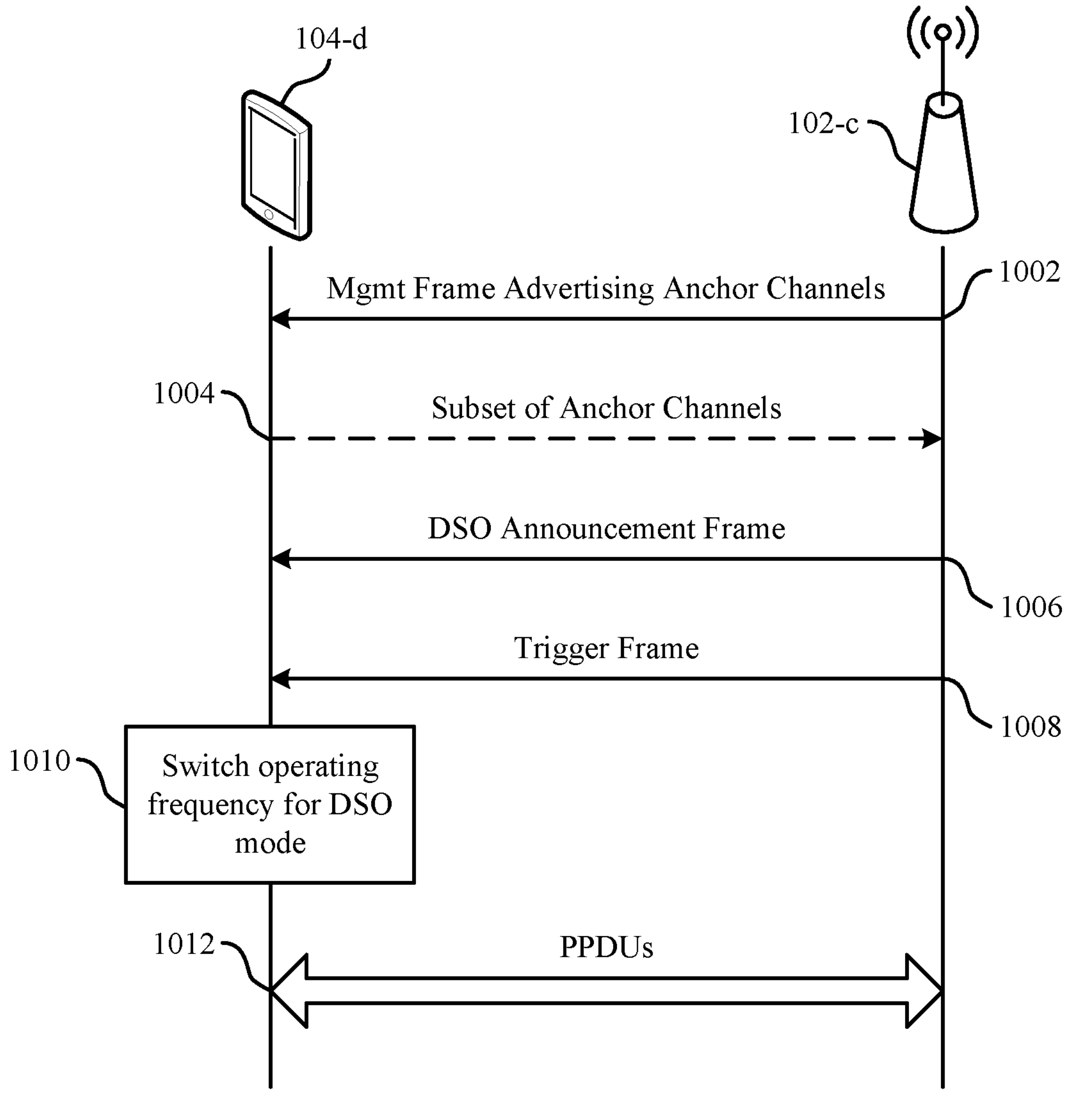

FIG. 10 shows an example of a process flow 1000 that supports signaling for DSO. The process flow 1000 may implement, or be implemented by, aspects of the wireless communication network 100, the wireless communications system 500, or a combination thereof. For example, the process flow 1000 may include a STA 104-*d* (for example, a non-AP STA) and an AP 102-*c* (for example, an AP STA), which may be examples of corresponding devices described herein with reference to FIGS. 1-9. In the following description of the process flow 1000, the operations may be performed in a different order than the order shown. Specific operations also may be left out of the process flow 1000, or other operations may be added to the process flow 1000. Further, although some operations or signaling may be shown to occur at different times for discussion purposes, these operations may occur at the same time.

The relatively large quantity of potential subchannels for DSO may introduce complexity into the wireless communications system (for example, at an AP 102, at a STA 104, or both). For example, to support DSO, the STA 104-*d* may receive a command to switch to a dynamically assigned subchannel within a relatively short transition delay (for example, a few microseconds). To support the switch, the STA 104-*d* may perform one or more operations upon completion of the switch to the assigned subchannel (for example, to assigned frequency resources included in one or more secondary subchannels). For example, the STA 104-*d* may switch to a subchannel and may perform CCA ED on the subchannel, perform sounding, communicate PPDUs (for example, including UHR PPDUs) via the subchannel, or any combination thereof. Supporting such operations on an arbitrary quantity of subchannels may introduce complexity. In some implementations, the STA 104-*d* or the AP 102-*c* may dynamically reduce the quantity of subchannels that can be switched to (for example, to reduce complexity).

Additionally, or alternatively, to support DSO, the AP 102-*c* may move (for example, assign) associated STAs 104 to one or more secondary subchannels and allocate RUs within these subchannels. Supporting a relatively large quantity of subchannel locations, bandwidths, and client combinations may introduce complexity at a scheduler of the AP 102-*c*. Furthermore, some operations (for example, frame exchange operations) associated with the IEEE 802.11 family of wireless communication protocol standards may be performed with respect to a primary channel (for example, a primary subchannel). For example, the AP 102-*c*, the STA 104-*d*, or both may determine transmit power for triggered transmissions, perform dynamic puncturing, perform CCA ED, or some combination thereof with respect to a primary channel. However, after a STA 104-*d* switches to an assigned subchannel for DSO, the STA 104-*d* may not operate via the primary channel. To support DSO functionality, the wireless communications system may support "anchor" channels, which operate as temporary primary channels for a STA 104-*d* in an enabled DSO mode. An anchor channel may alternatively be referred to as an anchor subchannel, a temporary primary channel, a temporary primary subchannel, an auxiliary channel, an auxiliary subchannel, or any similar terminology. In some implementations, the AP 102-*c* may specify the supported anchor channels (for example, AP-defined anchor channels), the STA 104-*d* may select a subset of anchor channels, or both for DSO communications.

The AP 102-*c* may select and advertise one or more DSO anchor channels within the operating bandwidth of the AP 102-*c*. In some aspects, the primary channel, P20, may be referred to as the default anchor channel. In some implementations, the AP 102-*c* may determine the anchor channels to support based on a configuration, one or more features of the channels, one or more capabilities of the AP 102-*c* or a STA 104-*d*, or any combination thereof.

Anchor channels may be 20 MHz channels (or any size channels, such as 80 MHz channels) within the AP's operating bandwidth. The AP 102-*c* may support a finite set of anchor channels (for example, a finite set of locations to schedule associated STAs 104, below a threshold quantity) to reduce the scheduler complexity at the AP 102-*c*. An AP 102-*c* that supports DSO may advertise the supported anchor channels using a frame (for example, a management frame).

At 1002, the AP 102-*c* may transmit the management frame advertising the one or more anchor channels supported for DSO. One or more STAs 104, including the STA 104-*d*, may receive the management frame and determine the anchor channels supported by the AP 102-*c*. In some aspects, the management frame may be an example of a beacon frame, a probe response frame, an association response frame, a reassociation response frame, or some other type of frame. In some implementations, the AP 102-*c* may specify a threshold quantity of anchor channels for STA selection in the management frame. For example, the AP 102-*c* may indicate a threshold quantity of two, which may indicate that a STA 104-*d* is to select at most two anchor channels, exactly two anchor channels, or at least two anchor channels. In some implementations, the indicated one or more anchor channels may be the same or a subset of opportunistic (O)-Primary channels supported for multi-primary channel access.

In some implementations, the STA 104-*d* may optionally select a subset of anchor channels to use. Selecting a finite quantity of anchor channels may further reduce complexity at the STA 104-*d*. For example, the management frame may indicate four anchor channels supported by the AP 102-*c* and a threshold quantity of two anchor channels for the STA 104-*d* to select. The STA 104-*d* may select up to two of the four anchor channels based on the threshold quantity. At 1004, the STA 104-*d* may transmit a frame indicating the selected subset of anchor channels to the AP 102-*c*. For example, the STA 104-*d* may select the subset of anchor channels and may indicate the subset of anchor channels to the AP 102-*c* during setup (for example, using capability signaling, an association request frame, a reassociation request frame, or any combination thereof) or during enablement (for example, using an action frame or A-Control field).

In some implementations, different STAs 104 may select different subsets of anchor channels to support for DSO. Additionally, or alternatively, the STA 104-*d* may update the selected subset of anchor channels (for example, while operating in the DSO mode). For example, the STA 104-*d* may use an action frame or A-Control field to update the selected subset of anchor channels without disabling and re-enabling the DSO mode at the STA 104-*d*.

In some implementations, the STA 104-*d* may select all of the anchor channels advertised by the AP 102-*c*. For example, the AP 102-*c* may refrain from including a threshold quantity of anchor channels for STA selection in the management frame, and the STA 104-*d* may by capable of supporting up to the advertised quantity of anchor channels. In some aspects, the STA 104-*d* may indicate support for all of the advertised anchor channels using capability or enablement signaling explicitly indicating each of the advertised anchor channels. In some other aspects, the STA 104-*d* may set a subfield value of the capability or enablement signaling to indicate that all of the advertised anchor channels are supported (for example, using a bit in a capability field or enablement signaling). In yet some other aspects, the STA

104-*d* may refrain from indicating any anchor channels in the capability or enablement signaling. Based on the STA 104-*d* supporting DSO and an absence of any indicated anchor channels in the capability or enablement signaling, the AP 102-*c* may implicitly determine that the STA 104-*d* supports all of the advertised anchor channels. In some implementations, the STA 104-*d* may refrain from indicating all of the advertised anchor channels or a subset of the advertised anchor channels at 1004.

The AP 102-*c* may use the STA-specific anchor channel subsets to assign frequency resources to the STAs 104 for DSO. For example, the AP 102-*c* may select an anchor channel for the STA 104-*d* from the subset of anchor channels indicated by the STA 104-*d*. Alternatively, if the STA 104-*d* did not indicate a subset of anchor channels but supports DSO, the AP 102-*c* may select an anchor channel for the STA 104-*d* from the one or more anchor channels advertised by the AP 102-*c* in the management frame. In some implementations, the STA 104-*d* may select the anchor channel by indicating a single anchor channel in the subset of anchor channels. The AP 102-*c* may allocate RUs (for example, frequency resources) within one or more subchannels associated with the selected anchor channel. Specifically, the AP 102-*c* may switch the STA 104-*d* to operate via subchannels that include the selected anchor channel. In some implementations, the AP 102-*c* may switch the STA 104-*d* to one of a defined set of secondary subchannels, each with an associated anchor channel (for example, S20, S40, S80, or some other set of subchannels). For example, the AP 102-*c*, the STA 104-*d*, or both may determine the subchannels associated with an anchor channel based on a set of rules (for example, for channel numbering and construction).

In some implementations, the STA 104-*d* may additionally indicate (for example, during enablement) that it is capable of receiving on more than one anchor channel concurrently (for example, simultaneously). Accordingly, the AP 102-*c* may allocate RUs (for example, frequency resources) to the STA 104-*d* in more than one subchannel associated with the more than one anchor channel. In some implementations, the multiple subchannels may be contiguous (such that the upper frequency limit of the lower frequency subchannel is the same as the lower frequency limit of the upper frequency subchannel). In some other implementations, at least some of the multiple subchannels may be non-contiguous (such that the upper frequency limit of the lower frequency subchannel is greater, or otherwise different, than the lower frequency limit of the upper frequency subchannel). If frequency resources are assigned in more than one subchannel, the AP 102-*c* may use MRUs to allocate frequency resources to the STA 104-*d*. The frequency resources assigned to different STAs 104 may be for the downlink direction, the uplink direction, peer-to-peer communications, or any combination thereof.

At 1006, the AP 102-*c* may transmit a DSO announcement frame—which may be an example of a trigger frame variant—assigning the allocated RUs to the STA 104-*d* for DSO. The DSO announcement frame may include RU allocations for one or more STAs 104 supporting DSO. The AP 102-*c* may indicate the RU allocation in the DSO announcement frame (or in a DSO ICF) with reference to the primary channel, P20 (for example, and not with reference to the selected anchor channel). By indicating the RUs using the same channel (for example, the primary channel) as the reference, the AP 102-*c* may reduce ambiguity and simplify signaling.

At 1008, the AP 102-*c* may transmit a trigger frame (for example, a BSRP trigger frame) to trigger the STA 104-*d* to switch to the allocated RUs. At 1010, the STA 104-*d* may switch its operating frequency for the DSO mode to the allocated RUs and corresponding subchannel assignment. The operating bandwidth of the STA 104-*d* may remain unchanged regardless of the anchor channel. For example, if the STA 104-*d* supports an operating bandwidth of 80 MHz on the primary channel, the STA 104-*d* may similarly support an operating bandwidth (for example, an operating bandwidth capability) of 80 MHz on the subchannel(s) associated with the anchor channel for DSO. In the DSO mode on the assigned subchannel(s), the STA 104-*d* may operate according to its full bandwidth capability or may operate according to a reduced bandwidth size (for example, to conserve power, to avoid interference with other signaling) by changing an operating mode of the STA 104-*d* (for example, using an operating mode number (OMN) or OMI).

Based on switching to communicating via one or more secondary subchannels for DSO, the STA 104-*d* may switch from using the primary channel, P20, as a primary channel to using the selected anchor channel as the primary channel (for example, as a temporary primary channel). For example, the STA 104-*d* may use the anchor channel as a "primary" channel for operations within a frame exchange that use a primary channel. During DSO, the STA 104-*d* may perform operations with respect to the anchor channel, rather than with respect to the primary channel. For example, upon switching to one or more secondary subchannels for DSO, the STA 104-*d* may perform CCA ED on the anchor channel. The STA 104-*d* may conserve energy by refraining from performing CCA ED on the other subchannels associated with the anchor channel. If the STA 104-*d* determines that the anchor channel is clear based on the CCA ED, the STA 104-*d* may communicate via the one or more secondary subchannels. For example, at 1012, the STA 104-*d* and the AP 102-*c* may exchange frames (for example, using one or more PPDUs) via the one or more secondary subchannels.

The AP 102-*c* may refrain from puncturing the anchor channel if the AP 102-*c* has allocated RUs associated with the anchor channel to a STA 104, such as the STA 104-*d*. For example, the STA 104-*d* may monitor the anchor channel for communications from the AP 102-*c*, and the AP 102-*c* may determine the STA 104-*d* is monitoring at least the anchor channel while the STA 104-*d* is operating in the DSO mode.

Additionally, or alternatively, the STA 104-*d* may use the anchor channel to determine a transmit power for transmissions. For example, for TB uplink transmissions, the STA 104-*d* may compute a transmit power based on a received signal strength indicator (RSSI) or another signal strength measurement performed for the anchor channel. For a triggered uplink transmission, the STA 104-*d* may compute the transmit power based on a combination of a target RSSI specified by the AP 102-*c* in a frame, the AP's transmit power (which may be indicated in a trigger frame triggering the TB uplink transmission), and an RSSI measurement performed on the anchor channel. For example, the STA 104-*d* may compute a pathloss value, PL, based on the AP's transmit power and the measured RSSI (for the primary channel or the anchor channel in DSO mode) according to Equation 1. The STA 104-*d* may use the computed pathloss value with the target RSSI specified by the AP 102-*c* to determine an uplink transmit power for the STA 104-*d* according to Equation 2.

$$PL = APTxPower - RSSI \quad (1)$$

$$STA\ TxPower = \text{Target}\ RSSI + PL \quad (2)$$

The STA 104-*d* may use the computed transmit power for transmitting an A-MPDU in a PPDU to the AP 102-*c* at 1012.

Figure 11:
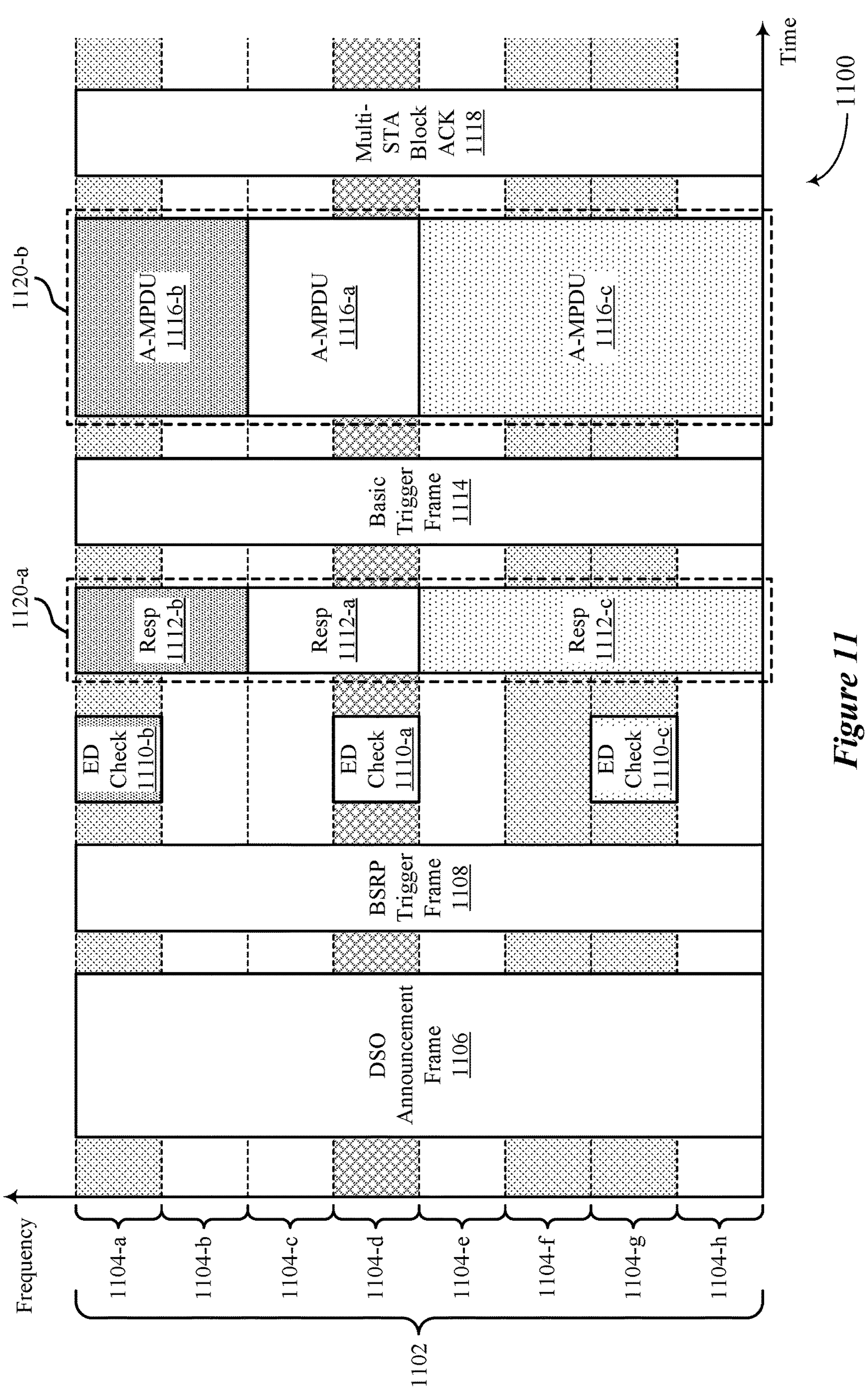
FIGS. 11 and 12 show examples of anchor channel usage for DSO.

FIG. 11 shows an example of anchor channel usage 1100 for DSO. A wireless communication network 100 or a wireless communications system 500, as described with reference to FIGS. 1 and 5, may support the anchor channel usage 1100. For example, an AP 102 may communicate with multiple STAs 104 in accordance with the anchor channel usage 1100. For example, if the AP 102, one or more STAs 104, or both are operating in a DSO mode (as described with reference to FIG. 7), the AP 102 and the one or more STAs 104 may communicate according to the anchor channel usage 1100 to support DSO functions via anchor channels in place of primary channels.

The AP 102 may support communications via an operating bandwidth 1102 (for example, a channel bandwidth). The AP's operating bandwidth 1102 may include one or more subchannels. For example, the AP's operating bandwidth 1102 may include a first subchannel 1104-*a*, a second subchannel 1104-*b*, a third subchannel 1104-*c*, a fourth subchannel 1104-*d*, a fifth subchannel 1104-*e*, a sixth subchannel 1104-*f*, a seventh subchannel 1104-*g*, and an eighth subchannel 1104-*h*, although the operating bandwidth 1102 may include any quantity of subchannels. In some implementations, each subchannel may span 20 MHz. The subchannels may include a primary subchannel (for example, the primary 20, P20). As an example, the fourth subchannel 1104-*d* may be the primary subchannel. The location of the primary subchannel in the frequency domain and the bandwidth may indicate the other subchannels (for example, the S20, the primary 40 (P40), the S40, the primary 80 (P80), the S80, or any other subchannels) based on one or more channel numbering rules defining channels and constituent subchannels.

STAs 104 may communicate with the AP 102 via the primary subchannel. In some implementations, the STAs 104 may default to communicating via the primary subchannel when not operating in DSO. The STAs 104, the AP 102, or both may perform some operations with respect to the primary subchannel. If a STA 104 switches to a secondary subchannel for DSO, the STA 104 may use a temporary primary subchannel (for example, an "anchor" channel) instead of the primary subchannel for some such operations.

The AP 102 may support one or more anchor channels. For example, the AP 102 may support the first subchannel 1104-*a* as an anchor channel, the sixth subchannel 1104-*f* as an anchor channel, and the seventh subchannel 1104-*g* as an anchor channel. The AP 102 may announce the supported anchor channels to one or more STAs 104 (for example, the STAs 104 supporting DSO). In some aspects, the AP 102 may transmit a management frame indicating the one or more anchor channels within the operating bandwidth 1102 of the AP 102 for DSO. In some implementations, one or more STAs 104 may respond to the AP 102 indicating subsets of the anchor channels. For example, a first STA 104 may not support DSO and may not respond to the management frame. A second STA 104 may support DSO and may transmit a frame (for example, using capability or enablement signaling) indicating a subset of the announced anchor channels. For example, the second STA 104 may indicate support for the first subchannel 1104-*a* and the sixth subchannel 1104-*f* as anchor channels. A third STA 104 may support DSO and may transmit a frame indicating support for the first subchannel 1104-*a* and the seventh subchannel 1104-*g* as anchor channels. In some implementations, the management frame indicating the anchor channels supported by the AP 102 may indicate a threshold quantity of anchor channels for the STAs 104 to indicate. For example, the management frame may request a threshold quantity of two anchor channels for the STAs 104 to indicate in their subsets of anchor channels, and the STAs 104 may indicate up to two anchor channels in the subsets. In some implementations, the first STA 104 may operate according to an operating bandwidth of 40 MHz, the second STA 104 may operate according to an operating bandwidth of 40 MHz, and the third STA 104 may operate according to an operating bandwidth of 80 MHz.

The AP 102 may transmit a DSO announcement frame 1106, for example, via the AP's operating bandwidth 1102. The DSO announcement frame 1106 may be an example of a trigger frame without an acknowledgment request. The DSO announcement frame 1106 may assign frequency resources (for example, RUs) to the second STA 104 and the third STA 104 supporting DSO. The AP 102 may assign the frequency resources based on the anchor channels, for example, such that each STA 104 operates via at least one anchor channel that the respective STA 104 has indicated to the AP 102. The AP 102 may additionally transmit a trigger frame (for example, another trigger frame, such as a BSRP trigger frame 1108) to trigger the STAs 104 to switch to the assigned frequency resources for DSO.

The first STA 104 may remain on the primary subchannel based on the first STA 104 not supporting DSO. For example, the first STA 104 may communicate via the third subchannel 1104-*c* and the fourth subchannel 1104-*d*. The AP 102 may assign, to the second STA 104, one or more frequency resources included in the first subchannel 1104-*a* and the second subchannel 1104-*b* associated with an anchor channel of the subset of anchor channels indicated by the second STA 104 (for example, where the first subchannel 1104-*a* is the anchor channel for the second STA 104). The AP 102 may assign, to the third STA 104, one or more frequency resources included in the fifth subchannel 1104-*e*, the sixth subchannel 1104-*f*, the seventh subchannel 1104-*g*, and the eighth subchannel 1104-*h* associated with an anchor channel of the subset of anchor channels indicated by the third STA 104 (for example, where the seventh subchannel 1104-*g* is the anchor channel for the third STA 104).

The STAs 104 may perform CCA ED checks on the primary subchannel or anchor channel (for example, temporary primary subchannel) to gain access to the channels. For example, the first STA 104 may perform an ED check 1110-*a* on the primary subchannel, the second STA 104 may perform an ED check 1110-*b* on the second STA's anchor channel (for example, the first subchannel 1104-*a*), and the third STA 104 may perform an ED check 1110-*c* on the third STA's anchor channel (for example, the seventh subchannel 1104-*g*). If the STAs 104 detect that the channels are clear, the STAs 104 may transmit response frames to the AP 102 indicating that the STAs 104 successfully switched to the assigned subchannels. For example, the first STA 104 may transmit a first BSR 1112-*a*, the second STA 104 may transmit a second BSR 1112-*b*, and the third STA 104 may transmit a third BSR 1112-*c* in a TB PPDU 1120-*a*.

In some aspects, the AP 102 may transmit a basic trigger frame 1114 to trigger one or more communications. In some implementations, the STAs 104 may perform the CCA ED checks on the primary subchannel or anchor channels again based on the basic trigger frame 1114. The STAs 104 may communicate with the AP 102 via the assigned resources for DSO. For example, the first STA 104 may transmit a first A-MPDU 1116-*a*, the second STA 104 may transmit a second A-MPDU 1116-*b*, and the third STA 104 may transmit a third A-MPDU 1116-*c* in a TB PPDU 1120-*b*. Additionally, or alternatively, the STAs 104 may receive signaling from the AP 102 via a PPDU. In some implementations, the AP 102 may transmit a multi-STA block acknowledgment 1118 to the STAs 104, for example, based on the TB PPDU 1120-*b*. The multi-STA block acknowledgment 1118 may correspond to a single user (SU) or MU PPDU format.

In some implementations, the AP 102 may transmit the BSRP trigger frame 1108, the basic trigger frame 1114, or both as non-HT DUP frames via the operating bandwidth 1102 (for example, duplicated across the subchannels of the operating bandwidth 1102), such that the first, second, and third STAs 104 may receive the non-HT DUP frames. In some other implementations, the AP 102 may transmit the BSRP trigger frame 1108, the basic trigger frame 1114, or both as UHR MU PPDU frames. For example, a UHR MU PPDU frame may include three MPDUs corresponding to three trigger frames, where each trigger frame is sent via the RUs allocated to the respective STA 104.

Figure 12:
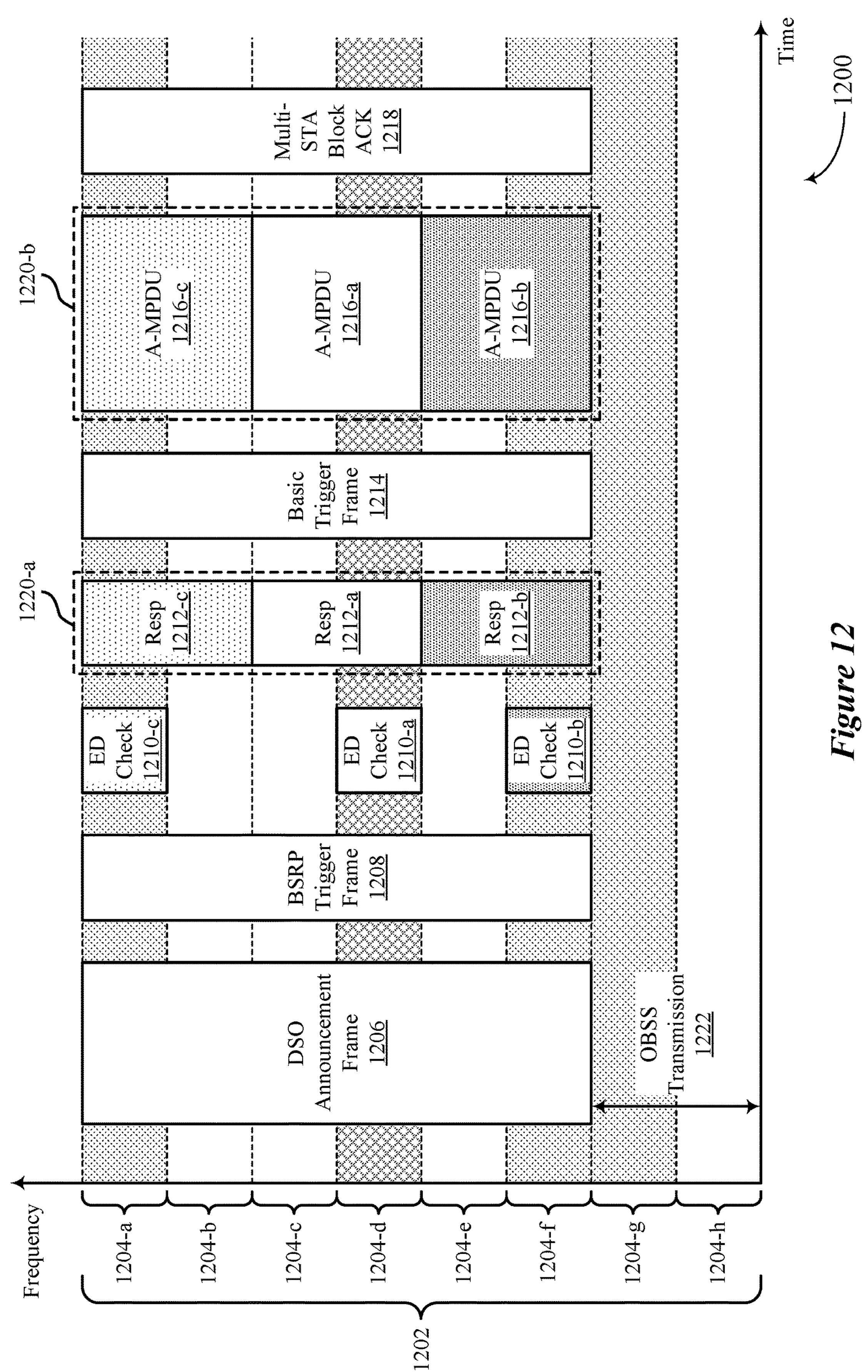

FIG. 12 shows an example of anchor channel usage 1200 for DSO. A wireless communication network 100 or a wireless communications system 500, as described with reference to FIGS. 1 and 5, may support the anchor channel usage 1200. For example, an AP 102 may communicate with multiple STAs 104 in accordance with the anchor channel usage 1200. For example, if the AP 102, one or more STAs 104, or both are operating in a DSO mode (as described with reference to FIG. 7), the AP 102 and the one or more STAs 104 may communicate according to the anchor channel usage 1200 to support DSO functions via anchor channels in place of primary channels. For example, the AP 102 may communicate with a first STA 104, a second STA 104, and a third STA 104, as discussed herein with reference to FIG. 11. However, the AP 102 may puncture one or more anchor channels based on one or more overlapping basic service set (OBSS) transmissions 1222. The AP 102 may assign subchannels to the STAs 104 based on the puncturing to avoid puncturing an anchor channel that a STA 104 is currently using.

As described herein with reference to FIG. 11, the AP 102 may support an operating bandwidth 1202 spanning a first subchannel 1204-*a*, a second subchannel 1204-*b*, a third subchannel 1204-*c*, a fourth subchannel 1204-*d*, a fifth subchannel 1204-*e*, a sixth subchannel 1204-*f*, a seventh subchannel 1204-*g*, and an eighth subchannel 1204-*h*. The fourth subchannel 1104-*d* may be the primary subchannel, and the AP 102 may support anchor channels via the first subchannel 1204-*a*, the sixth subchannel 1204-*f*, and the seventh subchannel 1204-*g*. A first STA 104 may not support DSO, while a second STA 104 may indicate support for DSO and a subset of anchor channels including the first subchannel 1204-*a* and the sixth subchannel 1204-*f*, and a third STA 104 may indicate support for DSO and a subset of anchor channels including the first subchannel 1204-*a* and the seventh subchannel 1204-*g*. Additionally, the first STA 104 may operate according to an operating bandwidth of 40 MHz, the second STA 104 may operate according to an operating bandwidth of 40 MHz, and the third STA 104 may operate according to an operating bandwidth of 80 MHz.

The AP 102 may detect one or more OBSS transmissions 1222 via the seventh subchannel 1204-*g* and the eighth subchannel 1204-*h* (for example, using an ED procedure to determine that these subchannels are currently busy). Based on the OBSS transmissions 1222, the AP 102 may puncture (for example, refrain from communicating) via the seventh subchannel 1204-*g* and the eighth subchannel 1204-*h*, including a supported anchor channel. The AP 102 may refrain from assigning a STA 104 frequency resources associated with this anchor channel (for example, the seventh subchannel 1204-*g*) to avoid puncturing a STA's anchor channel. For example, similar to a primary subchannel, the AP 102 may refrain from puncturing a subchannel that a STA 104 is currently using as an anchor channel.

The AP 102 may determine that S80 (for example, including the fifth subchannel 1204-*e*, the sixth subchannel 1204-*f*, the seventh subchannel 1204-*g*, and the eighth subchannel 1204-*h*) does not support the third STA 104 based on the third STA's anchor channel associated with S80 being the seventh subchannel 1204-*g* affected by the OBSS transmissions 1222. The AP 102 may instead assign the third STA 104 to S40 (for example, including the first subchannel 1204-*a* and the second subchannel 1204-*b*) and may assign the second STA 104 to the punctured S80 (for example, to the fifth subchannel 1204-*e* and the sixth subchannel 1204-*f*). Accordingly, the STAs 104 may operate using unpunctured anchor channels. However, the third STA 104 may operate using a reduced operating bandwidth (for example, 40 MHz) despite still supporting an operating bandwidth capability of 80 MHz.

The AP 102 may assign the frequency resources corresponding to the subchannels and anchor channels to the STAs 104 using a DSO announcement frame 1206. The AP 102 may transmit a BSRP trigger frame 1208, and the STAs 104 may perform CCA ED checks to gain access to the assigned frequency resources. For example, the first STA 104 may perform a first ED check 1210-*a* via the primary subchannel, the second STA 104 may perform a second ED check 1210-*b* via the anchor channel of the punctured S80 subband, and the third STA 104 may perform a third ED check 1210-*c* via the anchor channel of the S40 subband. The first STA 104 may transmit a first BSR 1212-*a*, the second STA 104 may transmit a second BSR 1212-*b*, and the third STA 104 may transmit a third BSR 1212-*c* in a TB PPDU 1220-*a*. The AP 102 may transmit a basic trigger frame 1214 to trigger communications via the assigned frequency resources in DSO. The first STA 104 may transmit a first A-MPDU 1216-*a*, the second STA 104 may transmit a second A-MPDU 1216-*b*, and the third STA 104 may transmit a third A-MPDU 1216-*c* in a TB PPDU 1220-*b*. Additionally, or alternatively, the STAs 104 may receive signaling from the AP 102 via a PPDU. In some implementations, the AP 102 may transmit a multi-STA block acknowledgment 1218 to the STAs 104, for example, based on the TB PPDU 1220-*b*.

The AP 102 may transmit the DSO announcement frame 1206, the BSRP trigger frame 1208, the basic trigger frame 1214, the multi-STA block acknowledgment 1218, or any combination thereof using a reduced bandwidth (for example, less than the AP's full operating bandwidth 1202) to avoid interference with the OBSS transmissions 1222. Additionally, or alternatively, the PPDUs may be communicated via a reduced bandwidth to avoid colliding with the OBSS transmissions 1222.

Figure 13:
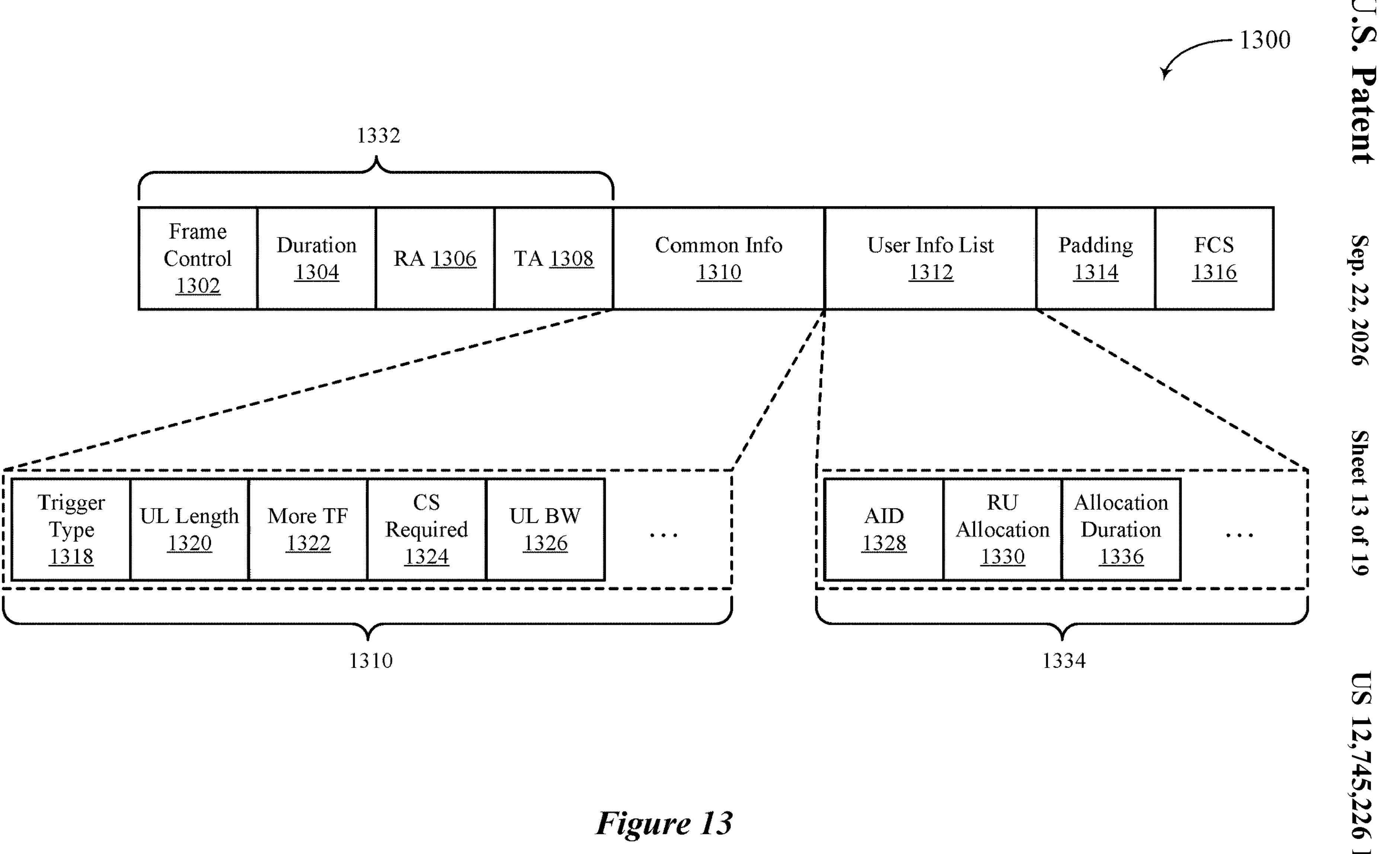
FIG. 13 shows an example of a trigger frame format that supports a DSO announcement frame.

FIG. 13 shows an example of a trigger frame format 1300 that supports a DSO announcement frame. In some implementations, an AP 102 (for example, an AP STA) may transmit a DSO announcement frame to assign frequency resources to one or more STAs 104 (for example, non-AP STAs) for DSO. The DSO announcement frame may be an example of a trigger frame in accordance with the trigger frame format 1300.

In some implementations, the DSO announcement frame may be an example of a control frame to improve processing at a STA 104 receiving the DSO announcement frame. In some aspects, the DSO announcement frame may be an example of an existing control frame type to leverage one or more existing procedures. The DSO announcement frame may refrain from triggering a response from the STA 104. For example, the DSO announcement frame may not solicit an acknowledgment from the STA 104, because the purpose of the DSO announcement frame may be to switch the STA 104 to one or more designated subchannels for DSO. The DSO announcement frame may support indicating subchannel assignments to multiple STAs 104, such that subsequent frames may be communicated with the STAs 104 via the assigned subchannels.

The DSO announcement frame may be an example of a trigger frame, such as an existing trigger frame variant (for example, in accordance with the trigger frame format 1300). The trigger frame may be an example of a broadcast frame transmitted by an AP 102. In some implementations, the AP 102 may use any trigger frame variant as a DSO announcement frame. In some other implementations, the AP 102 may use one or more specific trigger frame variants, such as the HE, EHT, or UHR variant of the multi-user request to send (MU-RTS) trigger frame, the HE, EHT, or UHR variant of the BSRP trigger frame, or some other trigger frame variant, as DSO announcement frames.

A trigger frame may carry one or more user information fields 1334, supporting indicating subchannel assignments to multiple STAs 104. For example, the trigger frame may include one user information field 1334 for each STA 104 that the trigger frame indicates to switch to a secondary subchannel for DSO. Additionally, or alternatively, the trigger frame may use a combination of an RU allocation subfield 1330 (for example, specific to a STA 104) and an uplink bandwidth subfield 1326, in some implementations along with other fields, to indicate a location of a secondary subchannel for the STA 104 to switch to for DSO. The trigger frame may be a DSO announcement frame if the secondary subchannel location is outside an operating bandwidth of the STA 104 (for example, a non-AP STA). If the secondary subchannel location is within the operating bandwidth of the STA 104, or if the trigger frame otherwise does not indicate frequency resources outside of the STA's operating bandwidth, the trigger frame may not be a DSO announcement frame (for example, the trigger frame may be a regular trigger frame).

The trigger frame format 1300 may include a MAC header 1332, which may include a frame control field 1302, a duration field 1304, a receiver address (RA) field 1306, a transmitter address (TA) field 1308, or any combination thereof. The trigger frame format 1300 may further include a common information field 1310 and a user information list 1312 for one or more users (for example, one or more STAs 104). The trigger frame format 1300 may further include padding 1314 and an FCS 1316.

Subfields within the common information field 1310, the user information list 1312, or both may identify the trigger frame as a DSO announcement frame. For example, the common information field 1310 may include a trigger type subfield 1318, an uplink length subfield 1320, a more trigger frame (TF) subfield 1322, a carrier sensing (CS) required subfield 1324, an uplink bandwidth subfield 1326, or any combination of these and additional subfields. To indicate a DSO announcement, the AP 102 may set the uplink length subfield 1320 to zero. For example, a trigger frame may solicit a response after SIFS. The uplink length subfield 1320 may control a duration of the response frame transmitted after SIFS in response to the trigger frame (with the exception of an MU-RTS trigger frame, where the uplink length subfield 1320 is reserved because the length of the response frame for MU-RTS, a CTS frame, is fixed). Setting the uplink length subfield 1320 to zero may indicate to a STA 104 receiving the trigger frame to not transmit a frame (for example, an acknowledgment frame, CTS, or other frame) in response to the trigger frame. That is, the value of zero may indicate a length of zero for a response frame, implicitly requesting no response to the trigger frame. Accordingly, an uplink length subfield 1320 set to zero may indicate one aspect of a DSO announcement frame based on the uplink length subfield 1320 requesting no response to the trigger frame. In some implementations, an MU-RTS trigger frame operating as a DSO announcement frame may use the uplink length subfield 1320 to indicate no response (for example, by setting the subfield to zero, rather than reserving the bits of the subfield).

In some implementations, the indication for the DSO Announcement frame may be carried inside the user information field 1334. In some such implementations, a subfield in the user information field 1334 of the trigger frame may indicate to the corresponding STA 104 that the trigger frame is serving as a DSO Announcement frame. For example, an allocation duration subfield 1336 of the user information field 1334 of an MU-RTS trigger frame may be set to zero to indicate to the STA 104 that the MU-RTS trigger frame is a DSO Announcement frame.

Additionally, or alternatively, to indicate the DSO announcement frame, the AP 102 may use the uplink bandwidth subfield 1326 to indicate a location of one or more assigned secondary subchannels for one or more STAs 104.

The user information list 1312 may include one or more user information fields 1334. For example, the AP 102 may include a user information field 1334 within the user information list 1312 for each STA 104 that the AP 102 is assigning frequency resources for DSO. A user information field 1334 may include an AID subfield 1328 (for example, an AID12 subfield indicating the 12 least significant bits of the AID for a STA 104), an RU allocation subfield 1330, or any combination of these and additional subfields. The AID subfield 1328 may indicate the AID for a target STA 104, and the RU allocation subfield 1330 may indicate one or more frequency resources assigned to the target STA 104 for DSO. For example, the indicated one or more frequency resources may be outside a current operating bandwidth of the STA 104, indicating that the frequency resources are for DSO.

In some implementations, if a first STA 104 operating via a primary subchannel does not support DSO (for example, the first STA 104 is an example of a legacy or non-UHR STA), the DSO announcement frame may not include a user information field 1334 for the first STA 104. If a second STA 104 operating via the primary subchannel supports DSO, the DSO announcement frame may include a user information field 1334 for the second STA 104.

In some implementations, the DSO announcement frame may assign frequency resources for DSO to a single STA 104. In some such implementations, the user information list 1312 may include one user information field 1334 for the one target STA 104, and the RA field 1306 in the MAC header 1332 may be set to the MAC address of the one target STA 104 (for example, the STA 104 with an AID matching the AID subfield 1328 in the one user information field 1334). In some other implementations, the DSO announcement frame may assign frequency resources for DSO to multiple STAs 104. In some such implementations, the user information list 1312 may include multiple user information fields 1334, and the RA field 1306 in the MAC header 1332 may be set to a broadcast address. The TA field 1308 in the MAC header 1332 may be set to an identifier of the AP 102 transmitting the trigger frame or set to a BSSID of the transmit BSSID (TxBSSID) if the AP 102 is a non-TxBSSID.

If a STA 104 receives a trigger frame, the STA 104 may determine if the trigger frame is a DSO announcement frame. For example, a trigger frame with the uplink length subfield 1320 set to zero, that assigns RUs outside an operating bandwidth of the STA 104, or both may be identified as a DSO announcement frame.

Figure 14:
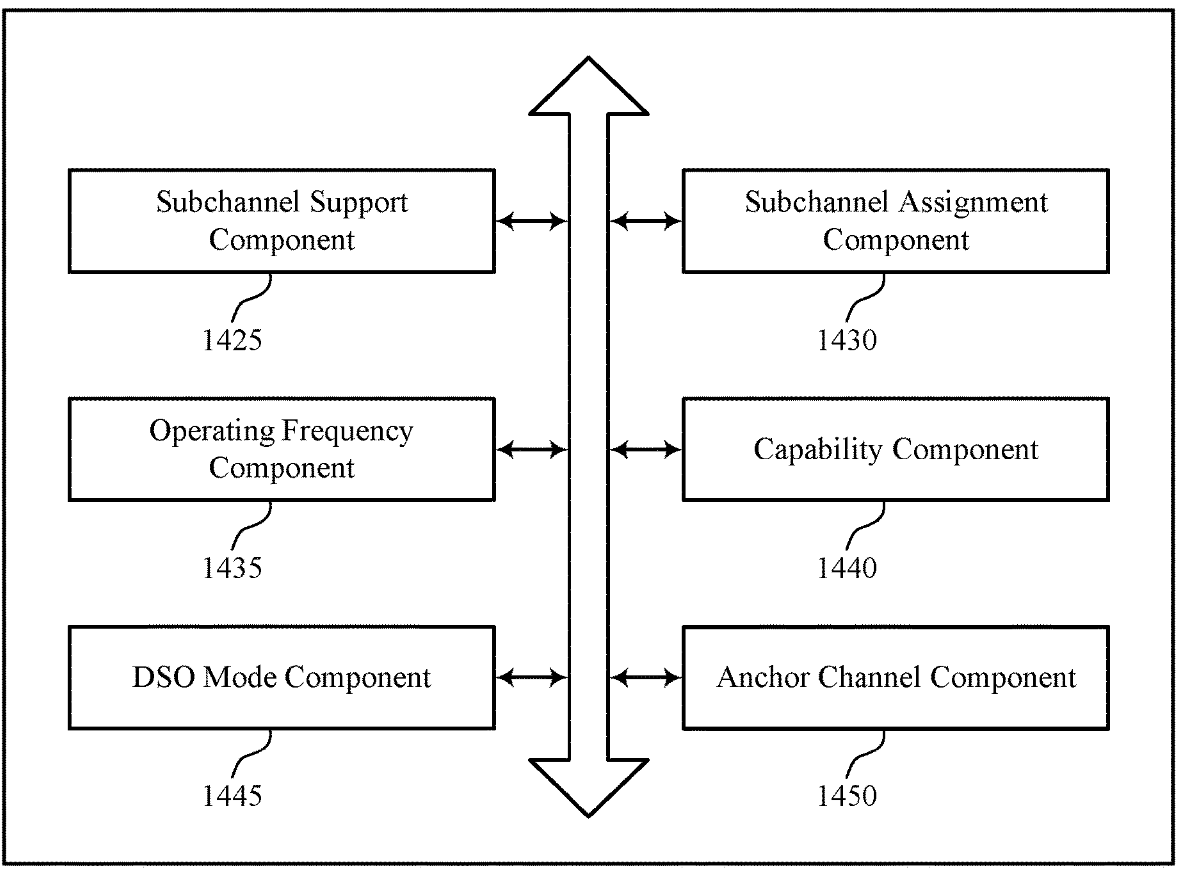
FIGS. 14 and 15 show block diagrams of example wireless communication devices that support signaling for DSO.

FIG. 14 shows a block diagram of an example wireless communication device 1400 that supports signaling for DSO. In some implementations, the wireless communication device 1400 is configured to perform the processes 1600 and 1800 described with reference to FIGS. 16 and 18, respectively. The wireless communication device 1400 may include one or more chips, systems-on-a-chip (SoCs), chipsets, packages, components, or devices that individually or collectively constitute or include a processing system. The processing system may interface with other components of the wireless communication device 1400 and may generally process information (such as inputs or signals) received from such other components and output information (such as outputs or signals) to such other components. In some aspects, an example chip may include a processing system, a first interface to output or transmit information, and a second interface to receive or obtain information. For example, the first interface may refer to an interface between the processing system of the chip and a transmission component, such that the wireless communication device 1400 may transmit the information output from the chip. In such an example, the second interface may refer to an interface between the processing system of the chip and a reception component, such that the wireless communication device 1400 may receive information that is passed to the processing system. In some such examples, the first interface also may obtain information, such as from the transmission component, and the second interface also may output information, such as to the reception component.

The processing system of the wireless communication device 1400 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASICs), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements, or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some implementations, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system may include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains, or transceivers.

In some implementations, the wireless communication device 1400 can be configurable or configured for use in a STA (for example, a non-AP STA), such as the STA 104 described with reference to FIG. 1. In some other examples, the wireless communication device 1400 can be a STA (for example, a non-AP STA) that includes such a processing system and other components including multiple antennas. The wireless communication device 1400 is capable of transmitting and receiving wireless communications in the form of, for example, wireless packets. For example, the wireless communication device 1400 can be configurable or configured to transmit and receive packets in the form of PHY PPDUs and MPDUs conforming to one or more of the IEEE 802.11 family of wireless communication protocol standards. In some other examples, the wireless communication device 1400 can be configurable or configured to transmit and receive signals and communications conforming to one or more 3GPP specifications including those for 5G NR or 6G. In some implementations, the wireless communication device 1400 also includes or can be coupled with one or more application processors which may be further coupled with one or more other memories. In some implementations, the wireless communication device 1400 further includes a user interface (UI) (such as a touchscreen or keypad) and a display, which may be integrated with the UI to form a touchscreen display that is coupled with the processing system. In some implementations, the wireless communication device 1400 may further include one or more sensors such as, for example, one or more inertial sensors, accelerometers, temperature sensors, pressure sensors, or altitude sensors, that are coupled with the processing system.

The wireless communication device 1400 includes a subchannel support component 1425, a subchannel assignment component 1430, an operating frequency component 1435, a capability component 1440, a DSO mode component 1445, and an anchor channel component 1450. Portions of one or more of the subchannel support component 1425, the subchannel assignment component 1430, the operating frequency component 1435, the capability component 1440, the DSO mode component 1445, and the anchor channel component 1450 may be implemented at least in part in hardware or firmware. For example, one or more of the subchannel support component 1425, the subchannel assignment component 1430, the operating frequency component 1435, the capability component 1440, the DSO mode component 1445, and the anchor channel component 1450 may be implemented at least in part by at least a processor or a modem. In some implementations, portions of one or more of the subchannel support component 1425, the subchannel assignment component 1430, the operating frequency component 1435, the capability component 1440, the DSO mode component 1445, and the anchor channel component 1450 may be implemented at least in part by a processor and software in the form of processor-executable code stored in memory.

The wireless communication device 1400 may support wireless communications in accordance with examples as disclosed herein. The wireless communication device 1400 may be an example of a non-AP STA. The subchannel support component 1425 is configurable or configured to transmit a first frame indicating support for a set of secondary subchannels for DSO. The subchannel assignment component 1430 is configurable or configured to receive a control frame assigning, to the non-AP STA for the DSO, one or more frequency resources included in at least one secondary subchannel of the set of secondary subchannels. The operating frequency component 1435 is configurable or configured to communicate via the at least one secondary subchannel based on an enabled DSO mode at the non-AP STA.

In some implementations, the subchannel support component 1425 is configurable or configured to transmit an indication of a threshold quantity of secondary subchannels of the set of secondary subchannels via which the non-AP STA supports concurrent communications.

In some implementations, the operating frequency component 1435 is configurable or configured to switch an operating frequency from a primary subchannel to the at least one secondary subchannel based on the control frame, where communicating via the at least one secondary subchannel is based on the switching.

In some implementations, to support switching the operating frequency, the operating frequency component 1435 is configurable or configured to switch the operating frequency from the primary subchannel to the at least one secondary subchannel at a time occasion indicated by the control frame.

In some implementations, the non-AP STA remains operating via the at least one secondary subchannel for a duration indicated by the control frame.

In some implementations, the subchannel assignment component 1430 is configurable or configured to receive a second control frame assigning, to the non-AP STA for the dynamic subchannel operation, one or more second frequency resources included in at least one second secondary subchannel of the set of secondary subchannels. In some implementations, the operating frequency component 1435 is configurable or configured to switch the operating frequency from the at least one secondary subchannel to the at least one second secondary subchannel based on the second control frame. In some implementations, the control frame and the second control frame are received within a same TxOP.

In some implementations, the capability component 1440 is configurable or configured to transmit a second frame indicating a capability to operate in the DSO mode for a link, where transmitting the first frame is based on the capability to operate in the DSO mode for the link. In some implementations, the first frame and the second frame are a same frame.

In some implementations, the capability component 1440 is configurable or configured to establish a multi-link setup, where the DSO mode is supported for one or more first links of the multi-link setup. In some implementations, the DSO mode is unsupported for one or more second links of the multi-link setup.

In some implementations, the capability to operate in the DSO mode for the link is based on a bandwidth for the link, a frequency band for the link, or both.

In some implementations, the capability component 1440 is configurable or configured to transmit a third frame updating the capability to operate in the DSO mode for the link.

In some implementations, the second frame further indicates a second capability to operate via the set of secondary subchannels for the link, a third capability indicating a first transition time for switching to the at least one secondary subchannel for the link, a fourth capability indicating a second transition time for switching from the at least one secondary subchannel to a primary subchannel for the link, or any combination thereof.

In some implementations, the capability component 1440 is configurable or configured to receive a second frame indicating a capability of an AP STA to support the DSO mode for a link, where transmitting the first frame is based on the capability of the AP STA to support the DSO mode for the link.

In some implementations, the capability component 1440 is configurable or configured to receive a second frame indicating a threshold quantity of secondary subchannels supported by an AP STA, where the set of secondary subchannels for the DSO is based on the threshold quantity.

In some implementations, the first frame may include a control value, a granularity value for the set of secondary subchannels, one or more location values for the set of secondary subchannels, or any combination thereof.

In some implementations, the first frame may include a bitmap indicating the one or more location values. In some implementations, a bit of the bitmap may indicate whether the non-AP STA supports switching to a respective subchannel with a bandwidth indicated by the granularity value.

In some implementations, a size of the bitmap may be based on the granularity value, an operating bandwidth for an AP STA corresponding to the dynamic subchannel operation mode, or both.

In some implementations, a first bit of the bitmap may indicate a preference of the non-AP STA for operating via a primary subchannel. In some implementations, each bit of the bitmap may indicate a respective preference of the non-AP STA for operating via a corresponding subchannel. In some implementations, the control value may indicate an interpretation of the bitmap.

In some implementations, the control value, the granularity value, the one or more location values, or any combination thereof may correspond to a first link. In some implementations, the first frame may further include a second control value, a second granularity value for a second set of secondary subchannels corresponding to a second link, one or more second location values for the second set of secondary subchannels corresponding to the second link, or any combination thereof.

In some implementations, the DSO mode component 1445 is configurable or configured to enable the DSO mode, where receiving the control frame is based on the enabling.

In some implementations, the DSO mode component 1445 is configurable or configured to transmit a request frame to enable the DSO mode. In some implementations, the DSO mode component 1445 is configurable or configured to receive a first acknowledgment frame in response to the request frame. In some implementations, the DSO mode component 1445 is configurable or configured to receive a response frame to enable the DSO mode, where the enabling is based on the response frame. In some implementations, the DSO mode component 1445 is configurable or configured to transmit a second acknowledgment frame in response to the response frame.

In some implementations, the request frame may include the first frame, an indication to enable the DSO mode, an indication of a first transition time for switching to the at least one secondary subchannel, an indication of a second transition time for switching from the at least one secondary subchannel to a primary subchannel, or any combination thereof.

In some implementations, the DSO mode component 1445 is configurable or configured to transmit a second request frame to disable the DSO mode. In some implementations, the DSO mode component 1445 is configurable or configured to receive a third acknowledgment frame in response to the second request frame. In some implementations, the DSO mode component 1445 is configurable or configured to receive a second response frame to disable the DSO mode. In some implementations, the DSO mode component 1445 is configurable or configured to transmit a fourth acknowledgment frame in response to the second response frame. In some implementations, the DSO mode component 1445 is configurable or configured to disable the DSO mode based on the second response frame.

In some implementations, the DSO mode component 1445 is configurable or configured to transmit a request frame to enable the DSO mode. In some implementations, the DSO mode component 1445 is configurable or configured to receive a first acknowledgment frame in response to the request frame, where the enabling is based on the first acknowledgment frame and a timeout value.

In some implementations, the DSO mode component 1445 is configurable or configured to transmit a management or data frame including an A-Control subfield indicating to enable the DSO mode. In some implementations, the DSO mode component 1445 is configurable or configured to receive a first acknowledgment frame in response to the management or data frame, where the enabling is based on the first acknowledgment frame.

In some implementations, the DSO mode component 1445 is configurable or configured to receive a second management or data frame including the A-Control subfield indicating to enable the DSO mode based on the management or data frame. In some implementations, the DSO mode component 1445 is configurable or configured to transmit a second acknowledgment frame in response to the second management or data frame, where the enabling is based on the second acknowledgment frame.

In some implementations, the DSO mode component 1445 is configurable or configured to receive a request frame to enable the DSO mode, where the enabling is based on the request frame.

In some implementations, the subchannel support component 1425 is configurable or configured to receive, in response to the first frame, a second frame indicating a modified set of secondary subchannels for the DSO, where the at least one secondary subchannel is from the modified set of secondary subchannels.

In some implementations, the first frame may include an acknowledgment frame transmitted in response to one or more preceding frames.

In some implementations, the wireless communication device 1400 may support wireless communications in accordance with examples as disclosed herein. The wireless communication device 1400 may be an example of a non-AP STA. The anchor channel component 1450 is configurable or configured to receive a management frame indicating one or more anchor channels within an operating bandwidth of an AP STA for DSO. The subchannel assignment component 1430 is configurable or configured to receive a control frame assigning, to the non-AP STA for the DSO, one or more frequency resources included in one or more secondary subchannels associated with an anchor channel of the one or more anchor channels. The operating frequency component 1435 is configurable or configured to communicate via the one or more secondary subchannels associated with the anchor channel based on an enabled DSO mode at the non-AP STA.

In some implementations, the anchor channel component 1450 is configurable or configured to transmit, based on the management frame, a frame indicating a subset of the one or more anchor channels, where the anchor channel is included in the subset of the one or more anchor channels.

In some implementations, the management frame may further indicate a threshold quantity of anchor channels for selection. In some implementations, the subset of the one or more anchor channels may be based on the threshold quantity of anchor channels for selection.

In some implementations, the DSO mode component 1445 is configurable or configured to operate according to the enabled DSO mode. In some implementations, the anchor channel component 1450 is configurable or configured to transmit, based on the operating according to the enabled DSO mode, a second frame indicating an updated subset of the one or more anchor channels different from the subset of the one or more anchor channels.

In some implementations, the frame may be an example of an association request frame, a reassociation request frame, an action frame, a management or data frame including an A-Control subfield, or any combination thereof.

In some implementations, the anchor channel component 1450 is configurable or configured to transmit, based on the management frame, a frame indicating support for all anchor channels of the one or more anchor channels.

In some implementations, the operating frequency component 1435 is configurable or configured to operate according to a same bandwidth capability for a primary channel and for the anchor channel based on the enabled DSO mode.

In some implementations, to support operating according to the same bandwidth capability, the operating frequency component 1435 is configurable or configured to operate according to a reduced bandwidth narrower than the same bandwidth capability based on an operating mode of the non-AP STA.

In some implementations, the anchor channel component 1450 is configurable or configured to determine the one or more secondary subchannels associated with the anchor channel based on one or more rules for channel numbering.

In some implementations, the anchor channel component 1450 is configurable or configured to perform a CCA ED via the anchor channel based on the enabled DSO mode.

In some implementations, the anchor channel component 1450 is configurable or configured to perform a received signal strength measurement for the anchor channel based on the enabled DSO mode. In some implementations, the operating frequency component 1435 is configurable or configured to compute a transmit power for the communicating based on the received signal strength measurement for the anchor channel.

In some implementations, the control frame may indicate the one or more frequency resources relative to a primary channel of the non-AP STA. In some implementations, the primary channel is different from the anchor channel.

In some implementations, the control frame may be an example of a DSO announcement frame. In some implementations, the DSO announcement frame may be an example of a trigger frame variant including an uplink length subfield set to zero. In some implementations, the trigger frame variant be an MU-RTS trigger frame or a BSRP trigger frame.

In some implementations, the DSO mode component 1445 is configurable or configured to refrain from transmitting a frame in response to the DSO announcement frame based on the uplink length subfield being set to zero.

In some implementations, the trigger frame variant may further include a user information field addressed to the non-AP STA and allocating the one or more frequency resources to the non-AP STA. In some implementations, the one or more frequency resources are outside a current operating bandwidth of the non-AP STA. In some implementations, a MAC header of the trigger frame variant may include an RA field set to a MAC address of the non-AP STA based on the trigger frame variant including a single user information field addressed to the non-AP STA.

In some implementations, the trigger frame variant may further include a set of multiple user information fields addressed to a set of multiple respective non-AP STAs. In some implementations, a MAC header of the trigger frame variant may include an RA field set to a broadcast address based on the trigger frame variant including the set of multiple user information fields.

In some implementations, the management frame may be an example of a beacon frame, a probe response frame, an association response frame, a reassociation response frame, or any combination thereof. In some implementations, the anchor channel may span a 20 MHz bandwidth. In some implementations, the one or more anchor channels may include one or more opportunistic primary channels for multi-primary channel access.

Figure 15:
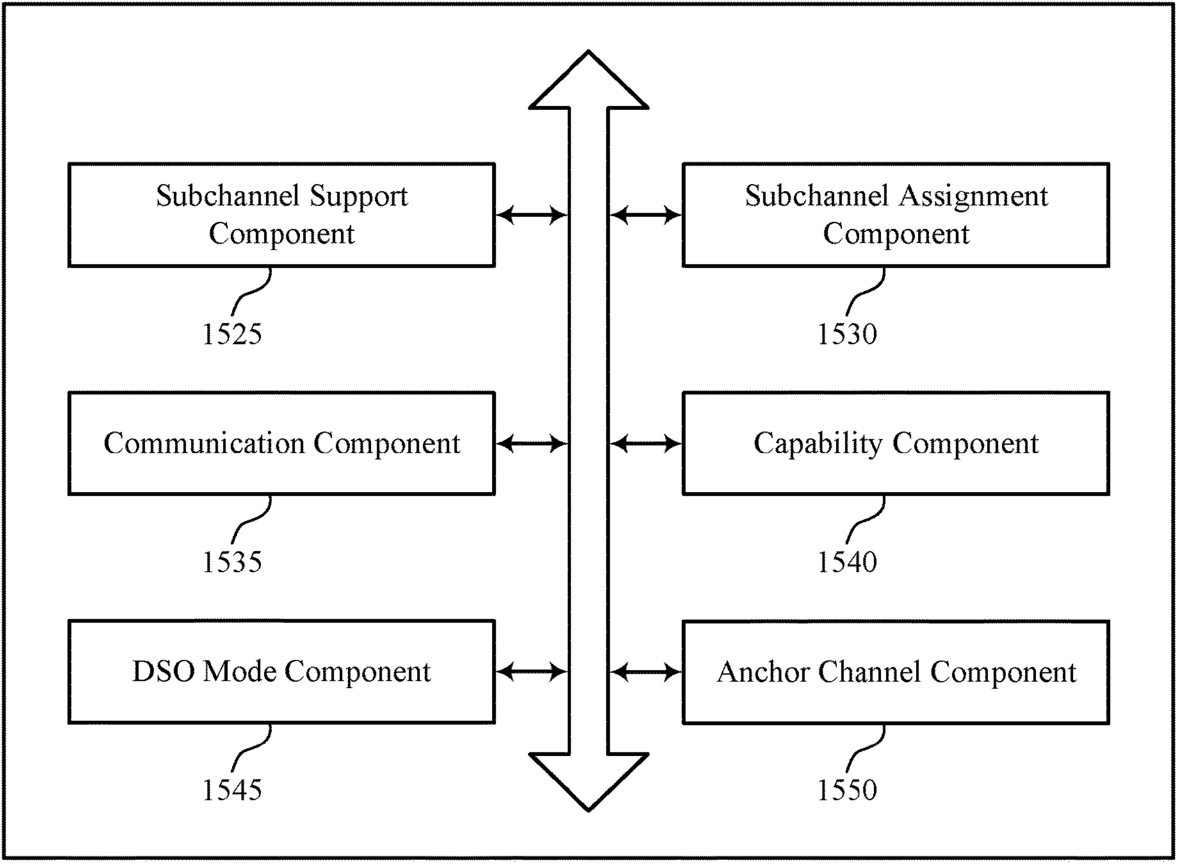

FIG. 15 shows a block diagram of an example wireless communication device 1500 that supports signaling for DSO. In some implementations, the wireless communication device 1500 is configured to perform the processes 1700 and 1900 described with reference to FIGS. 17 and 19, respectively. The wireless communication device 1500 may include one or more chips, SoCs, chipsets, packages, components, or devices that individually or collectively constitute or include a processing system. The processing system may interface with other components of the wireless communication device 1500 and may generally process information (such as inputs or signals) received from such other components and output information (such as outputs or signals) to such other components. In some aspects, an example chip may include a processing system, a first interface to output or transmit information, and a second interface to receive or obtain information. For example, the first interface may refer to an interface between the processing system of the chip and a transmission component, such that the wireless communication device 1500 may transmit the information output from the chip. In such an example, the second interface may refer to an interface between the processing system of the chip and a reception component, such that the wireless communication device 1500 may receive information that is passed to the processing system. In some such examples, the first interface also may obtain information, such as from the transmission component, and the second interface also may output information, such as to the reception component.

The processing system of the wireless communication device 1500 includes processor (or "processing") circuitry in the form of one or multiple processors, microprocessors, processing units (such as CPUs, GPUs, or DSPs), processing blocks, ASICs, PLDs (such as FPGAs), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements, or other discrete gate or transistor logic or circuitry, each of which may include tangible storage media such as RAM or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some implementations, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system may include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains, or transceivers.

In some implementations, the wireless communication device 1500 can be configurable or configured for use in an AP (for example, an AP STA), such as the AP 102 described with reference to FIG. 1. In some other examples, the wireless communication device 1500 can be an AP (for example, an AP STA) that includes such a processing system and other components including multiple antennas. The wireless communication device 1500 is capable of transmitting and receiving wireless communications in the form of, for example, wireless packets. For example, the wireless communication device 1500 can be configurable or configured to transmit and receive packets in the form of PHY PPDUs and MPDUs conforming to one or more of the IEEE 802.11 family of wireless communication protocol standards. In some other examples, the wireless communication device 1500 can be configurable or configured to transmit and receive signals and communications conforming to one or more 3GPP specifications including those for 5G NR or 6G. In some implementations, the wireless communication device 1500 also includes or can be coupled with one or more application processors which may be further coupled with one or more other memories. In some implementations, the wireless communication device 1500 further includes at least one external network interface coupled with the processing system that enables communication with a core network or backhaul network that enables the wireless communication device 1500 to gain access to external networks including the Internet.

The wireless communication device 1500 includes a subchannel support component 1525, a subchannel assignment component 1530, a communication component 1535, a capability component 1540, a DSO mode component 1545, and an anchor channel component 1550. Portions of one or more of the subchannel support component 1525, the subchannel assignment component 1530, the communication component 1535, the capability component 1540, the DSO mode component 1545, and the anchor channel component 1550 may be implemented at least in part in hardware or firmware. For example, one or more of the subchannel support component 1525, the subchannel assignment component 1530, the communication component 1535, the capability component 1540, the DSO mode component 1545, and the anchor channel component 1550 may be implemented at least in part by at least a processor or a modem. In some implementations, portions of one or more of the subchannel support component 1525, the subchannel assignment component 1530, the communication component 1535, the capability component 1540, the DSO mode component 1545, and the anchor channel component 1550 may be implemented at least in part by a processor and software in the form of processor-executable code stored in memory.

The wireless communication device 1500 may support wireless communications in accordance with examples as disclosed herein. The wireless communication device 1500 may be an example of an AP STA. The subchannel support component 1525 is configurable or configured to receive a first frame indicating support for a set of secondary subchannels for DSO at a non-AP STA. The subchannel assignment component 1530 is configurable or configured to transmit a control frame assigning, to the non-AP STA for the DSO, one or more frequency resources included in at least one secondary subchannel of the set of secondary subchannels. The communication component 1535 is configurable or configured to communicate with the non-AP STA via the at least one secondary subchannel based on the control frame.

In some implementations, the subchannel support component 1525 is configurable or configured to receive an indication of a threshold quantity of secondary subchannels of the set of secondary subchannels via which the non-AP STA supports concurrent communications. In some implementations, the subchannel assignment component 1530 is configurable or configured to assign the one or more frequency resources to be included in a set of multiple secondary subchannels of the set of secondary subchannels based on the threshold quantity of secondary subchannels.

In some implementations, the control frame may include a trigger frame different from an MU-RTS trigger frame. In some implementations, the control frame and the second control frame may be transmitted within a same TxOP.

In some implementations, the control frame may be addressed to one or more first non-AP STAs instructed to switch to one or more of the set of secondary subchannels. In some implementations, the control frame may refrain from addressing one or more second non-AP STAs not instructed to switch subchannels.

In some implementations, the subchannel assignment component 1530 is configurable or configured to transmit a second control frame including an HE variant or EHT variant trigger frame different from an MU-RTS trigger frame, where communicating with the non-AP STA via the at least one secondary subchannel is further based on the second control frame.

In some implementations, the control frame may further indicate one or more time occasions at which the non-AP STA switches to the at least one secondary subchannel, a duration for which the non-AP STA remains operating via the at least one secondary subchannel, or both.

In some implementations, the subchannel support component 1525 is configurable or configured to receive a second frame indicating support for a second set of secondary subchannels for the DSO at a second non-AP STA, where the control frame further assigns, to the second non-AP STA for the DSO, one or more second frequency resources included in at least one second secondary subchannel of the second set of secondary subchannels. In some implementations, the communication component 1535 is configurable or configured to communicate with the second non-AP STA via the at least one second secondary subchannel based on the control frame.

In some implementations, to support communicating with the non-AP STA and communicating with the second non-AP STA, the communication component 1535 is configurable or configured to transmit a PPDU including a first MPDU for the non-AP STA via the at least one secondary subchannel and a second MPDU for the second non-AP STA via the at least one second secondary subchannel.

In some implementations, the subchannel assignment component 1530 is configurable or configured to transmit a second control frame assigning, to the non-AP STA for the DSO, one or more second frequency resources included in at least one second secondary subchannel of the set of secondary subchannels. In some implementations, the communication component 1535 is configurable or configured to communicate with the non-AP STA via the at least one second secondary subchannel based on the second control frame.

In some implementations, the capability component 1540 is configurable or configured to receive a second frame indicating a capability of the non-AP STA to operate in a DSO mode for a link, where receiving the first frame is based on the capability of the non-AP STA to operate in the DSO mode for the link.

In some implementations, the capability component 1540 is configurable or configured to transmit a second frame indicating a capability of the AP STA to support a DSO mode for a link, where receiving the first frame is based on the capability of the AP STA to support the DSO mode for the link.

In some implementations, the capability component 1540 is configurable or configured to transmit a second frame indicating a threshold quantity of secondary subchannels supported by the AP STA, where the at least one secondary subchannel is based on the threshold quantity.

In some implementations, the first frame may include a control value, a granularity value for the set of secondary subchannels, one or more location values for the set of secondary subchannels, or any combination thereof.

In some implementations, the first frame may include a bitmap indicating the one or more location values. In some implementations, a bit of the bitmap may indicate whether the non-AP STA supports switching to a respective subchannel with a bandwidth indicated by the granularity value.

In some implementations, the control value, the granularity value, the one or more location values, or any combination thereof may correspond to a first link. In some implementations, the first frame further may include a second control value, a second granularity value for a second set of secondary subchannels corresponding to a second link, one or more second location values for the second set of secondary subchannels corresponding to the second link, or any combination thereof.

In some implementations, the subchannel assignment component 1530 is configurable or configured to assign the one or more frequency resources based on the one or more location values for the set of secondary subchannels and the control value indicating a preference of the non-AP STA for the set of secondary subchannels.

In some implementations, the control frame further may include a padding that spans a duration equal to or greater than the first transition time.

In some implementations, the DSO mode component 1545 is configurable or configured to enable a DSO mode for the non-AP STA, where transmitting the control frame is based on the enabling.

In some implementations, the DSO mode component 1545 is configurable or configured to receive a request frame to enable the DSO mode for the non-AP STA, where the enabling is based on the request frame.

In some implementations, the request frame may include the first frame, an indication of a first transition time for switching to the at least one secondary subchannel, an indication of a second transition time for switching from the at least one secondary subchannel to a primary subchannel, or any combination thereof.

In some implementations, the DSO mode component 1545 is configurable or configured to transmit a request frame to enable the DSO mode for the non-AP STA, where the enabling is based on the request frame.

In some implementations, the DSO mode component 1545 is configurable or configured to receive a request frame to disable the DSO mode for the non-AP STA. In some implementations, the DSO mode component 1545 is configurable or configured to disable the DSO mode for the non-AP STA based on the request frame.

In some implementations, the DSO mode component 1545 is configurable or configured to transmit a request frame to disable the DSO mode for the non-AP STA. In some implementations, the DSO mode component 1545 is configurable or configured to disable the DSO mode for the non-AP STA based on the request frame.

In some implementations, the DSO mode component 1545 is configurable or configured to receive a management or data frame including an A-Control subfield indicating to enable the DSO mode for the non-AP STA, where the enabling is based on the management or data frame.

In some implementations, the DSO mode component 1545 is configurable or configured to transmit a management or data frame including an A-Control subfield indicating to enable the DSO mode for the non-AP STA, where the enabling is based on the management or data frame.

In some implementations, the subchannel support component 1525 is configurable or configured to transmit, in response to the first frame, a second frame indicating a modified set of secondary subchannels for the DSO, where the at least one secondary subchannel is from the modified set of secondary subchannels.

In some implementations, the first frame may include an acknowledgment frame transmitted in response to one or more preceding frames.

In some implementations, the wireless communication device 1500 may support wireless communications in accordance with examples as disclosed herein. The wireless communication device 1500 may be an example of an AP STA. The anchor channel component 1550 is configurable or configured to transmit a management frame indicating one or more anchor channels within an operating bandwidth of the AP STA for DSO. The subchannel assignment component 1530 is configurable or configured to transmit a control frame assigning, to a non-AP STA for the DSO, one or more frequency resources included in one or more secondary subchannels associated with an anchor channel of the one or more anchor channels. The communication component 1535 is configurable or configured to communicate with the non-AP STA via the one or more secondary subchannels associated with the anchor channel based on the control frame.

In some implementations, the anchor channel component 1550 is configurable or configured to receive, based on the management frame, a frame indicating a subset of the one or more anchor channels for the non-AP STA, where the anchor channel is included in the subset of the one or more anchor channels.

In some implementations, the management frame may further indicate a threshold quantity of anchor channels for selection. In some implementations, the subset of the one or more anchor channels may be based on the threshold quantity of anchor channels for selection.

In some implementations, the frame may be an example of an association request frame, a reassociation request frame, an action frame, a management or data frame including an A-Control subfield, or any combination thereof.

In some implementations, the anchor channel component 1550 is configurable or configured to receive, based on the management frame, a frame indicating support for all anchor channels of the one or more anchor channels for the non-AP STA.

In some implementations, the DSO mode component 1545 is configurable or configured to refrain from puncturing frequency resources associated with the anchor channel for the non-AP STA based on the assigned one or more frequency resources included in the one or more secondary subchannels being associated with the anchor channel.

In some implementations, the control frame may indicate the one or more frequency resources relative to a primary channel of the non-AP STA. In some implementations, the primary channel is different from the anchor channel.

In some implementations, the control frame may be an example of a DSO announcement frame. In some implementations, the DSO announcement frame may be an example of a trigger frame variant including an uplink length subfield set to zero. In some implementations, the trigger frame variant may be an MU-RTS trigger frame or a BSRP trigger frame.

In some implementations, the trigger frame variant may further include a user information field addressed to the non-AP STA and allocating the one or more frequency resources to the non-AP STA. In some implementations, the one or more frequency resources are outside a current operating bandwidth of the non-AP STA. In some implementations, a MAC header of the trigger frame variant may include an RA field set to a MAC address of the non-AP STA based on the trigger frame variant including a single user information field addressed to the non-AP STA.

In some implementations, the trigger frame variant may further include a set of multiple user information fields addressed to a set of multiple respective non-AP STAs. In some implementations, a MAC header of the trigger frame variant may include an RA field set to a broadcast address based on the trigger frame variant including the set of multiple user information fields.

In some implementations, the management frame may be an example of a beacon frame, a probe response frame, an association response frame, a reassociation response frame, or any combination thereof.

Figure 16:
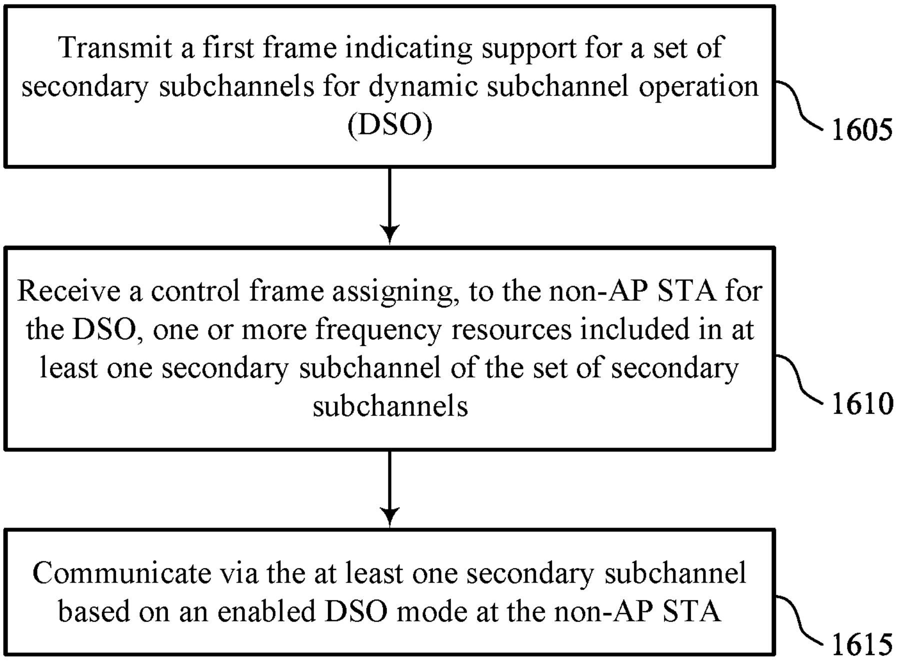
FIG. 16 shows a flowchart illustrating an example process performable by or at a non-AP STA that supports signaling for DSO.

FIG. 16 shows a flowchart illustrating an example process 1600 performable by or at a non-AP STA that supports signaling for DSO. The operations of the process 1600 may be implemented by a non-AP STA or its components as described herein. For example, the process 1600 may be performed by a wireless communication device, such as the wireless communication device 1400 described with reference to FIG. 14, operating as or within a wireless STA. In some implementations, the process 1600 may be performed by a wireless STA, such as one of the STAs 104 described with reference to FIG. 1.

In some implementations, in block 1605, the non-AP STA may transmit a first frame indicating support for a set of secondary subchannels for DSO. The operations of block 1605 may be performed in accordance with examples as disclosed herein. In some implementations, aspects of the operations of block 1605 may be performed by a subchannel support component 1425 as described with reference to FIG. 14.

In some implementations, in block 1610, the non-AP STA may receive a control frame assigning, to the non-AP STA for the DSO, one or more frequency resources included in at least one secondary subchannel of the set of secondary subchannels. The operations of block 1610 may be performed in accordance with examples as disclosed herein. In some implementations, aspects of the operations of block 1610 may be performed by a subchannel assignment component 1430 as described with reference to FIG. 14.

In some implementations, in block 1615, the non-AP STA may communicate via the at least one secondary subchannel based on an enabled DSO mode at the non-AP STA. The operations of block 1615 may be performed in accordance with examples as disclosed herein. In some implementations, aspects of the operations of block 1615 may be performed by an operating frequency component 1435 as described with reference to FIG. 14.

Figure 17:
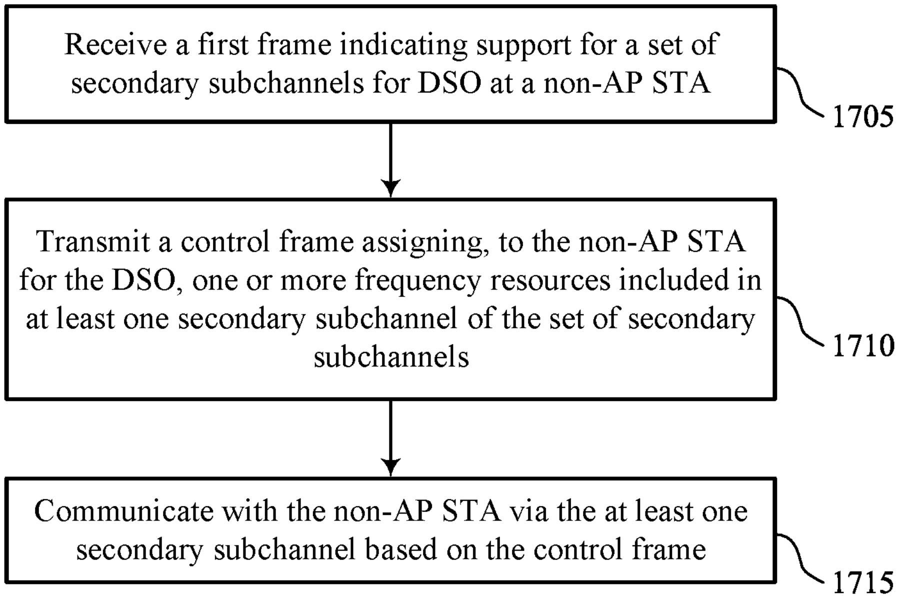
FIG. 17 shows a flowchart illustrating an example process performable by or at an AP STA that supports signaling for DSO.

FIG. 17 shows a flowchart illustrating an example process 1700 performable by or at an AP STA that supports signaling for DSO. The operations of the process 1700 may be implemented by an AP STA or its components as described herein. For example, the process 1700 may be performed by a wireless communication device, such as the wireless communication device 1500 described with reference to FIG. 15, operating as or within a wireless AP. In some implementations, the process 1700 may be performed by a wireless AP, such as the AP 102 described with reference to FIG. 1.

In some implementations, in block 1705, the AP STA may receive a first frame indicating support for a set of secondary subchannels for DSO at a non-AP STA. The operations of block 1705 may be performed in accordance with examples as disclosed herein. In some implementations, aspects of the operations of block 1705 may be performed by a subchannel support component 1525 as described with reference to FIG. 15.

In some implementations, in block 1710, the AP STA may transmit a control frame assigning, to the non-AP STA for the DSO, one or more frequency resources included in at least one secondary subchannel of the set of secondary subchannels. The operations of block 1710 may be performed in accordance with examples as disclosed herein. In some implementations, aspects of the operations of block 1710 may be performed by a subchannel assignment component 1530 as described with reference to FIG. 15.

In some implementations, in block 1715, the AP STA may communicate with the non-AP STA via the at least one secondary subchannel based on the control frame. The operations of block 1715 may be performed in accordance with examples as disclosed herein. In some implementations, aspects of the operations of block 1715 may be performed by a communication component 1535 as described with reference to FIG. 15.

Figure 18:
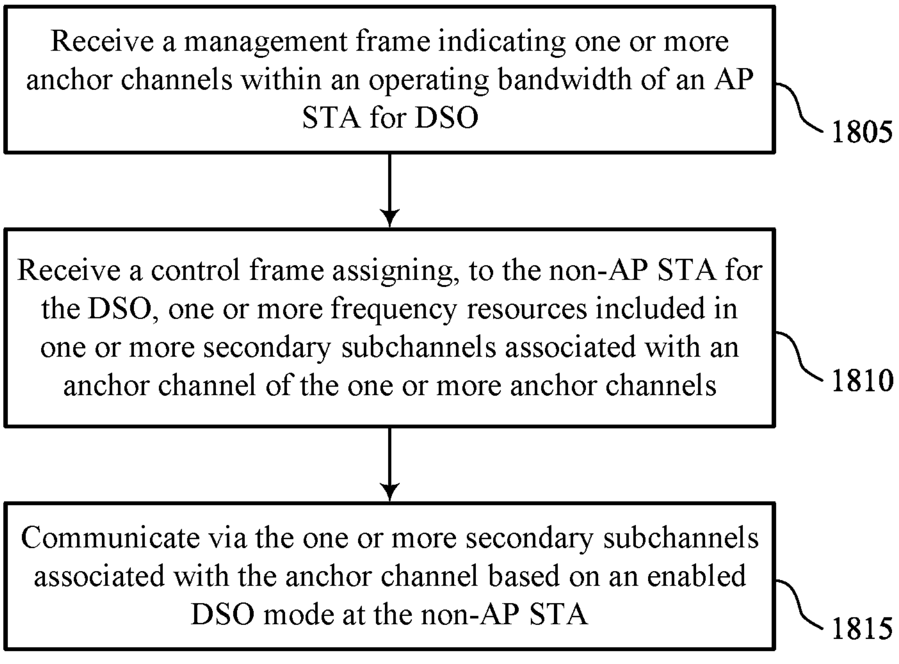
FIG. 18 shows a flowchart illustrating an example process performable by or at a non-AP STA that supports signaling for DSO.

FIG. 18 shows a flowchart illustrating an example process 1800 performable by or at a non-AP STA that supports signaling for DSO. The operations of the process 1800 may be implemented by a non-AP STA or its components as described herein. For example, the process 1800 may be performed by a wireless communication device, such as the wireless communication device 1400 described with reference to FIG. 14, operating as or within a wireless STA. In some implementations, the process 1800 may be performed by a wireless STA, such as one of the STAs 104 described with reference to FIG. 1.

In some implementations, in block 1805, the non-AP STA may receive a management frame indicating one or more anchor channels within an operating bandwidth of an AP STA for DSO. The operations of block 1805 may be performed in accordance with examples as disclosed herein. In some implementations, aspects of the operations of block 1805 may be performed by an anchor channel component 1450 as described with reference to FIG. 14.

In some implementations, in block 1810, the non-AP STA may receive a control frame assigning, to the non-AP STA for the DSO, one or more frequency resources included in one or more secondary subchannels associated with an anchor channel of the one or more anchor channels. The operations of block 1810 may be performed in accordance with examples as disclosed herein. In some implementations, aspects of the operations of block 1810 may be performed by a subchannel assignment component 1430 as described with reference to FIG. 14.

In some implementations, in block 1815, the non-AP STA may communicate via the one or more secondary subchannels associated with the anchor channel based on an enabled DSO mode at the non-AP STA. The operations of block 1815 may be performed in accordance with examples as disclosed herein. In some implementations, aspects of the operations of block 1815 may be performed by an operating frequency component 1435 as described with reference to FIG. 14.

Figure 19:
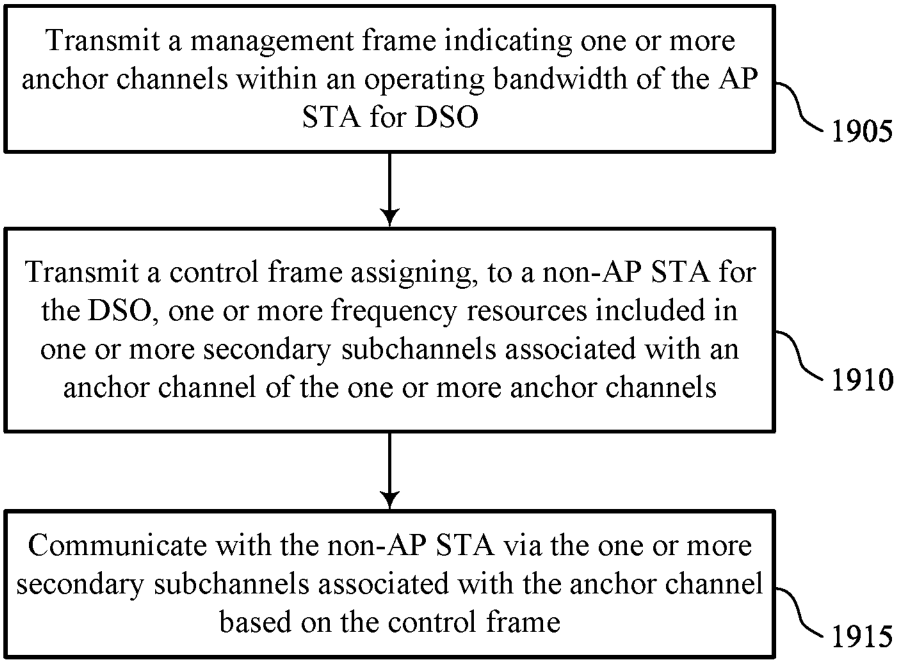
FIG. 19 shows a flowchart illustrating an example process performable by or at an AP STA that supports signaling for DSO.

FIG. 19 shows a flowchart illustrating an example process 1900 performable by or at an AP STA that supports signaling for DSO. The operations of the process 1900 may be implemented by an AP STA or its components as described herein. For example, the process 1900 may be performed by a wireless communication device, such as the wireless communication device 1500 described with reference to FIG. 15, operating as or within a wireless AP. In some implementations, the process 1900 may be performed by a wireless AP, such as the AP 102 described with reference to FIG. 1.

In some implementations, in block 1905, the AP STA may transmit a management frame indicating one or more anchor channels within an operating bandwidth of the AP STA for DSO. The operations of block 1905 may be performed in accordance with examples as disclosed herein. In some implementations, aspects of the operations of block 1905 may be performed by an anchor channel component 1550 as described with reference to FIG. 15.

In some implementations, in block 1910, the AP STA may transmit a control frame assigning, to a non-AP STA for the DSO, one or more frequency resources included in one or more secondary subchannels associated with an anchor channel of the one or more anchor channels. The operations of block 1910 may be performed in accordance with examples as disclosed herein. In some implementations, aspects of the operations of block 1910 may be performed by a subchannel assignment component 1530 as described with reference to FIG. 15.

In some implementations, in block 1915, the AP STA may communicate with the non-AP STA via the one or more secondary subchannels associated with the anchor channel based on the control frame. The operations of block 1915 may be performed in accordance with examples as disclosed herein. In some implementations, aspects of the operations of block 1915 may be performed by a communication component 1535 as described with reference to FIG. 15.

Implementation examples are described in the following numbered clauses:

Aspect 1: A method for wireless communications at a non-AP STA, including: transmitting a first frame indicating support for a set of secondary subchannels for DSO; receiving a control frame assigning, to the non-AP STA for the DSO, one or more frequency resources included in at least one secondary subchannel of the set of secondary subchannels; and communicating via the at least one secondary subchannel based at least in part on an enabled DSO mode at the non-AP STA.

Aspect 2: The method of aspect 1, further including: transmitting an indication of a threshold quantity of secondary subchannels of the set of secondary subchannels via which the non-AP STA supports concurrent communications.

Aspect 3: The method of any of aspects 1 or 2, further including: switching an operating frequency from a primary subchannel to the at least one secondary subchannel based at least in part on the control frame, where communicating via the at least one secondary subchannel is based at least in part on the switching.

Aspect 4: The method of aspect 3, where switching the operating frequency includes: switching the operating frequency from the primary subchannel to the at least one secondary subchannel at a time occasion indicated by the control frame.

Aspect 5: The method of any of aspects 3 or 4, where the non-AP STA remains operating via the at least one secondary subchannel for a duration indicated by the control frame.

Aspect 6: The method of any of aspects 3-5, further including: receiving a second control frame assigning, to the non-AP STA for the DSO, one or more second frequency resources included in at least one second secondary subchannel of the set of secondary subchannels; and switching the operating frequency from the at least one secondary subchannel to the at least one second secondary subchannel based at least in part on the second control frame.

Aspect 7: The method of any of aspects 3-6, where the control frame and the second control frame are received within a same transmission opportunity.

Aspect 8: The method of any of aspects 1-7, further including: transmitting a second frame indicating a capability to operate in the DSO mode for a link, where transmitting the first frame is based at least in part on the capability to operate in the DSO mode for the link.

Aspect 9: The method of aspect 8, where the first frame and the second frame are a same frame.

Aspect 10: The method of any of aspects 8-9, further including: establishing a multi-link setup, where the DSO mode is supported for one or more first links of the multi-link setup.

Aspect 11: The method of aspect 10, where the DSO mode is unsupported for one or more second links of the multi-link setup.

Aspect 12: The method of any of aspects 8-11, where the capability to operate in the DSO mode for the link is based at least in part on a bandwidth for the link, a frequency band for the link, or both.

Aspect 13: The method of any of aspects 8-12, further including: transmitting a third frame updating the capability to operate in the DSO mode for the link.

Aspect 14: The method of any of aspects 8-13, where the second frame further indicates a second capability to operate via the set of secondary subchannels for the link, a third capability indicating a first transition time for switching to the at least one secondary subchannel for the link, a fourth capability indicating a second transition time for switching from the at least one secondary subchannel to a primary subchannel for the link, or any combination thereof.

Aspect 15: The method of any of aspects 1-14, further including: receiving a second frame indicating a capability of an AP STA to support the DSO mode for a link, where transmitting the first frame is based at least in part on the capability of the AP STA to support the DSO mode for the link.

Aspect 16: The method of any of aspects 1-15, further including: receiving a second frame indicating a threshold quantity of secondary subchannels supported by an AP STA, where the set of secondary subchannels for the DSO is based at least in part on the threshold quantity.

Aspect 17: The method of any of aspects 1-16, where the first frame includes a control value, a granularity value for the set of secondary subchannels, one or more location values for the set of secondary subchannels, or any combination thereof.

Aspect 18: The method of aspect 17, where the first frame includes a bitmap indicating the one or more location values, a bit of the bitmap indicates whether the non-AP STA supports switching to a respective subchannel with a bandwidth indicated by the granularity value.

Aspect 19: The method of aspect 18, where a size of the bitmap is based at least in part on the granularity value, an operating bandwidth for an AP STA corresponding to the DSO mode, or both.

Aspect 20: The method of any of aspects 18 or 19, where a first bit of the bitmap indicates a preference of the non-AP STA for operating via a primary subchannel.

Aspect 21: The method of any of aspects 18-20, where each bit of the bitmap indicates a respective preference of the non-AP STA for operating via a corresponding subchannel.

Aspect 22: The method of any of aspects 18-21, where the control value indicates an interpretation of the bitmap.

Aspect 23: The method of any of aspects 17-22, where the control value, the granularity value, the one or more location values, or any combination thereof correspond to a first link; and the first frame further includes a second control value, a second granularity value for a second set of secondary subchannels corresponding to a second link, one or more second location values for the second set of secondary subchannels corresponding to the second link, or any combination thereof.

Aspect 24: The method of any of aspects 1-23, further including: enabling the DSO mode, where receiving the control frame is based at least in part on the enabling.

Aspect 25: The method of aspect 24, further including: transmitting a request frame to enable the DSO mode; receiving a first acknowledgment frame in response to the request frame; receiving a response frame to enable the DSO mode, where the enabling is based at least in part on the response frame; and transmitting a second acknowledgment frame in response to the response frame.

Aspect 26: The method of aspect 25, where the request frame includes the first frame, an indication to enable the DSO mode, an indication of a first transition time for switching to the at least one secondary subchannel, an indication of a second transition time for switching from the at least one secondary subchannel to a primary subchannel, or any combination thereof.

Aspect 27: The method of any of aspects 25 or 26, further including: transmitting a second request frame to disable the DSO mode; receiving a third acknowledgment frame in response to the second request frame; receiving a second response frame to disable the DSO mode; transmitting a fourth acknowledgment frame in response to the second response frame; and disabling the DSO mode based at least in part on the second response frame.

Aspect 28: The method of aspect 24, further including: transmitting a request frame to enable the DSO mode; and receiving a first acknowledgment frame in response to the request frame, where the enabling is based at least in part on the first acknowledgment frame and a timeout value.

Aspect 29: The method of aspect 24, further including: transmitting a management or data frame including an A-Control subfield indicating to enable the DSO mode; and receiving a first acknowledgment frame in response to the management or data frame, where the enabling is based at least in part on the first acknowledgment frame.

Aspect 30: The method of aspect 29, further including: receiving a second management or data frame including the A-Control subfield indicating to enable the DSO mode based at least in part on the management or data frame; and transmitting a second acknowledgment frame in response to the second management or data frame, where the enabling is based at least in part on the second acknowledgment frame.

Aspect 31: The method of aspect 24, further including: receiving a request frame to enable the DSO mode, where the enabling is based at least in part on the request frame.

Aspect 32: The method of any of aspects 1-31, further including: receiving, in response to the first frame, a second frame indicating a modified set of secondary subchannels for the DSO, where the at least one secondary subchannel is from the modified set of secondary subchannels.

Aspect 33: The method of any of aspects 1-32, where the first frame includes an acknowledgment frame transmitted in response to one or more preceding frames.

Aspect 34: A method for wireless communications at an AP STA, including: receiving a first frame indicating support for a set of secondary subchannels for DSO at a non-AP STA; transmitting a control frame assigning, to the non-AP STA for the DSO, one or more frequency resources included in at least one secondary subchannel of the set of secondary subchannels; and communicating with the non-AP STA via the at least one secondary subchannel based at least in part on the control frame.

Aspect 35: The method of aspect 34, further including: receiving an indication of a threshold quantity of secondary subchannels of the set of secondary subchannels via which the non-AP STA supports concurrent communications; and assigning the one or more frequency resources to be included in a plurality of secondary subchannels of the set of secondary subchannels based at least in part on the threshold quantity of secondary subchannels.

Aspect 36: The method of any of aspects 34 or 35, where the control frame includes a trigger frame different from a multi-user request to send trigger frame.

Aspect 37: The method of aspect 36, where the control frame and the second control frame are transmitted within a same transmission opportunity.

Aspect 38: The method of any of aspects 34-37, where the control frame is addressed to one or more first non-AP STAs instructed to switch to one or more of the set of secondary subchannels; and the control frame refrains from addressing one or more second non-AP STAs not instructed to switch subchannels.

Aspect 39: The method of any of aspects 34-38, further including: transmitting a second control frame including a high efficiency variant or extremely high throughput variant trigger frame different from a multi-user request to send trigger frame, where communicating with the non-AP STA via the at least one secondary subchannel is further based at least in part on the second control frame.

Aspect 40: The method of any of aspects 34-39, where the control frame further indicates one or more time occasions at which the non-AP STA switches to the at least one secondary subchannel, a duration for which the non-AP STA remains operating via the at least one secondary subchannel, or both.

Aspect 41: The method of any of aspects 34-40, further including: receiving a second frame indicating support for a second set of secondary subchannels for the DSO at a second non-AP STA, where the control frame further assigns, to the second non-AP STA for the DSO, one or more second frequency resources included in at least one second secondary subchannel of the second set of secondary subchannels; and communicating with the second non-AP STA via the at least one second secondary subchannel based at least in part on the control frame.

Aspect 42: The method of aspect 41, where communicating with the non-AP STA and communicating with the second non-AP STA includes: transmitting a physical layer protocol data unit including a first medium access control layer protocol data unit for the non-AP STA via the at least one secondary subchannel and a second medium access control layer protocol data unit for the second non-AP STA via the at least one second secondary subchannel.

Aspect 43: The method of any of aspects 34-42, further including: transmitting a second control frame assigning, to the non-AP STA for the DSO, one or more second frequency resources included in at least one second secondary subchannel of the set of secondary subchannels; and communicating with the non-AP STA via the at least one second secondary subchannel based at least in part on the second control frame.

Aspect 44: The method of any of aspects 34-43, further including: receiving a second frame indicating a capability of the non-AP STA to operate in a DSO mode for a link, where receiving the first frame is based at least in part on the capability of the non-AP STA to operate in the DSO mode for the link.

Aspect 45: The method of any of aspects 34-44, further including: transmitting a second frame indicating a capability of the AP STA to support a DSO mode for a link, where receiving the first frame is based at least in part on the capability of the AP STA to support the DSO mode for the link.

Aspect 46: The method of any of aspects 34-45, further including: transmitting a second frame indicating a threshold quantity of secondary subchannels supported by the AP STA, where the at least one secondary subchannel is based at least in part on the threshold quantity.

Aspect 47: The method of any of aspects 34-46, where the first frame includes a control value, a granularity value for the set of secondary subchannels, one or more location values for the set of secondary subchannels, or any combination thereof.

Aspect 48: The method of aspect 47, where the first frame includes a bitmap indicating the one or more location values, a bit of the bitmap indicates whether the non-AP STA supports switching to a respective subchannel with a bandwidth indicated by the granularity value.

Aspect 49: The method of any of aspects 47 or 48, where the control value, the granularity value, the one or more location values, or any combination thereof correspond to a first link; and the first frame further includes a second control value, a second granularity value for a second set of secondary subchannels corresponding to a second link, one or more second location values for the second set of secondary subchannels corresponding to the second link, or any combination thereof.

Aspect 50: The method of any of aspects 47-49, further including: assigning the one or more frequency resources based at least in part on the one or more location values for the set of secondary subchannels and the control value indicating a preference of the non-AP STA for the set of secondary subchannels.

Aspect 51: The method of any of aspects 47-50, where the control frame further includes a padding that spans a duration equal to or greater than the first transition time.

Aspect 52: The method of any of aspects 34-51, further including: enabling a DSO mode for the non-AP STA, where transmitting the control frame is based at least in part on the enabling.

Aspect 53: The method of aspect 52, further including: receiving a request frame to enable the DSO mode for the non-AP STA, where the enabling is based at least in part on the request frame.

Aspect 54: The method of aspect 53, where the request frame includes the first frame, an indication of a first transition time for switching to the at least one secondary subchannel, an indication of a second transition time for switching from the at least one secondary subchannel to a primary subchannel, or any combination thereof.

Aspect 55: The method of aspect 52, further including: transmitting a request frame to enable the DSO mode for the non-AP STA, where the enabling is based at least in part on the request frame.

Aspect 56: The method of any of aspects 52-55, further including: receiving a request frame to disable the DSO mode for the non-AP STA; and disabling the DSO mode for the non-AP STA based at least in part on the request frame.

Aspect 57: The method of any of aspects 52-55, further including: transmitting a request frame to disable the DSO mode for the non-AP STA; and disabling the DSO mode for the non-AP STA based at least in part on the request frame.

Aspect 58: The method of aspect 52, further including: receiving a management or data frame including an A-Control subfield indicating to enable the DSO mode for the non-AP STA, where the enabling is based at least in part on the management or data frame.

Aspect 59: The method of aspect 52, further including: transmitting a management or data frame including an A-Control subfield indicating to enable the DSO mode for the non-AP STA, where the enabling is based at least in part on the management or data frame.

Aspect 60: The method of any of aspects 34-59, further including: transmitting, in response to the first frame, a second frame indicating a modified set of secondary subchannels for the DSO, where the at least one secondary subchannel is from the modified set of secondary subchannels.

Aspect 61: The method of any of aspects 34-60, where the first frame includes an acknowledgment frame transmitted in response to one or more preceding frames.

Aspect 62: A non-AP STA, including a processing system that includes processor circuitry and memory circuitry that stores code, the processing system configured to cause the non-AP STA to perform a method of any of aspects 1-33.

Aspect 63: A non-AP STA for wireless communications, including at least one means for performing a method of any of aspects 1-33.

Aspect 64: A non-transitory computer-readable medium storing code for wireless communications, the code including instructions executable by a processor to perform a method of any of aspects 1-33.

Aspect 65: An AP STA, including a processing system that includes processor circuitry and memory circuitry that stores code, the processing system configured to cause the AP STA to perform a method of any of aspects 34-61.

Aspect 66: An AP STA for wireless communications, including at least one means for performing a method of any of aspects 34-61.

Aspect 67: A non-transitory computer-readable medium storing code for wireless communications, the code including instructions executable by a processor to perform a method of any of aspects 34-61.

Aspect 68: A method for wireless communications at a non-AP STA, comprising: receiving a management frame indicating one or more anchor channels within an operating bandwidth of an AP STA for DSO; receiving a control frame assigning, to the non-AP STA for the DSO, one or more frequency resources included in one or more secondary subchannels associated with an anchor channel of the one or more anchor channels; and communicating via the one or more secondary subchannels associated with the anchor channel based at least in part on an enabled DSO mode at the non-AP STA.

Aspect 69: The method of aspect 68, further comprising: transmitting, based at least in part on the management frame, a frame indicating a subset of the one or more anchor channels, wherein the anchor channel is included in the subset of the one or more anchor channels.

Aspect 70: The method of aspect 69, wherein the management frame further indicates a threshold quantity of anchor channels for selection; and the subset of the one or more anchor channels is based at least in part on the threshold quantity of anchor channels for selection.

Aspect 71: The method of any of aspects 69 or 70, further comprising: operating according to the enabled DSO mode; and transmitting, based at least in part on the operating according to the enabled DSO mode, a second frame indicating an updated subset of the one or more anchor channels different from the subset of the one or more anchor channels.

Aspect 72: The method of any of aspects 69-71, wherein the frame comprises an association request frame, a reassociation request frame, an action frame, a management or data frame comprising an A-Control subfield, or any combination thereof.

Aspect 73: The method of aspect 68, further comprising: transmitting, based at least in part on the management frame, a frame indicating support for all anchor channels of the one or more anchor channels.

Aspect 74: The method of any of aspects 68-73, further comprising: operating according to a same bandwidth capability for a primary channel and for the anchor channel based at least in part on the enabled DSO mode.

Aspect 75: The method of aspect 74, wherein operating according to the same bandwidth capability further comprises: operating according to a reduced bandwidth narrower than the same bandwidth capability based at least in part on an operating mode of the non-AP STA.

Aspect 76: The method of any of aspects 68-75, further comprising: determining the one or more secondary subchannels associated with the anchor channel based at least in part on one or more rules for channel numbering.

Aspect 77: The method of any of aspects 68-76, further comprising: performing a CCA ED via the anchor channel based at least in part on the enabled DSO mode.

Aspect 78: The method of any of aspects 68-77, further comprising: performing a received signal strength measurement for the anchor channel based at least in part on the enabled DSO mode; and computing a transmit power for the communicating based at least in part on the received signal strength measurement for the anchor channel.

Aspect 79: The method of any of aspects 68-78, wherein the control frame indicates the one or more frequency resources relative to a primary channel of the non-AP STA, and wherein the primary channel is different from the anchor channel.

Aspect 80: The method of any of aspects 68-79, wherein the control frame comprises a DSO announcement frame.

Aspect 81: The method of aspect 80, wherein the DSO announcement frame comprises a trigger frame variant comprising an uplink length subfield set to zero.

Aspect 82: The method of aspect 81, wherein the trigger frame variant is an MU-RTS trigger frame or a BSRP trigger frame.

Aspect 83: The method of any of aspects 81 or 82, further comprising: refraining from transmitting a frame in response to the DSO announcement frame based at least in part on the uplink length subfield being set to zero.

Aspect 84: The method of any of aspects 81-83, wherein the trigger frame variant further comprises a user information field addressed to the non-AP STA and allocating the one or more frequency resources to the non-AP STA.

Aspect 85: The method of aspect 84, wherein the one or more frequency resources are outside a current operating bandwidth of the non-AP STA.

Aspect 86: The method of any of aspects 84 or 85, wherein a MAC header of the trigger frame variant comprises an RA field set to a MAC address of the non-AP STA based at least in part on the trigger frame variant comprising a single user information field addressed to the non-AP STA.

Aspect 87: The method of any of aspects 81-83, wherein the trigger frame variant further comprises a plurality of user information fields addressed to a plurality of respective non-AP STAs; and a MAC header of the trigger frame variant comprises an RA field set to a broadcast address based at least in part on the trigger frame variant comprising the plurality of user information fields.

Aspect 88: The method of any of aspects 68-87, wherein the management frame comprises a beacon frame, a probe response frame, an association response frame, a reassociation response frame, or any combination thereof.

Aspect 89: The method of any of aspects 68-88, wherein the anchor channel spans a 20 MHz bandwidth.

Aspect 90: The method of any of aspects 68-89, wherein the one or more anchor channels comprise one or more opportunistic primary channels for multi-primary channel access.

Aspect 91: A method for wireless communications at an AP STA, comprising: transmitting a management frame indicating one or more anchor channels within an operating bandwidth of the AP STA for DSO; transmitting a control frame assigning, to a non-AP STA for the DSO, one or more frequency resources included in one or more secondary subchannels associated with an anchor channel of the one or more anchor channels; and communicating with the non-AP STA via the one or more secondary subchannels associated with the anchor channel based at least in part on the control frame.

Aspect 92: The method of aspect 91, further comprising: receiving, based at least in part on the management frame, a frame indicating a subset of the one or more anchor channels for the non-AP STA, wherein the anchor channel is included in the subset of the one or more anchor channels.

Aspect 93: The method of aspect 92, wherein the management frame further indicates a threshold quantity of anchor channels for selection; and the subset of the one or more anchor channels is based at least in part on the threshold quantity of anchor channels for selection.

Aspect 94: The method of any of aspects 92 or 93, wherein the frame comprises an association request frame, a reassociation request frame, an action frame, a management or data frame comprising an A-Control subfield, or any combination thereof.

Aspect 95: The method of aspect 91, further comprising: receiving, based at least in part on the management frame, a frame indicating support for all anchor channels of the one or more anchor channels for the non-AP STA.

Aspect 96: The method of any of aspects 91-95, further comprising: refraining from puncturing frequency resources associated with the anchor channel for the non-AP STA based at least in part on the assigned one or more frequency resources included in the one or more secondary subchannels being associated with the anchor channel.

Aspect 97: The method of any of aspects 91-96, wherein the control frame indicates the one or more frequency resources relative to a primary channel of the non-AP STA, and wherein the primary channel is different from the anchor channel.

Aspect 98: The method of any of aspects 91-97, wherein the control frame comprises a DSO announcement frame.

Aspect 99: The method of aspect 98, wherein the DSO announcement frame comprises a trigger frame variant comprising an uplink length subfield set to zero.

Aspect 100: The method of aspect 99, wherein the trigger frame variant is an MU-RTS trigger frame or a BSRP trigger frame.

Aspect 101: The method of any of aspects 99 or 100, wherein the trigger frame variant further comprises a user information field addressed to the non-AP STA and allocating the one or more frequency resources to the non-AP STA.

Aspect 102: The method of aspect 101, wherein the one or more frequency resources are outside a current operating bandwidth of the non-AP STA.

Aspect 103: The method of any of aspects 101 or 102, wherein a MAC header of the trigger frame variant comprises an RA field set to a MAC address of the non-AP STA based at least in part on the trigger frame variant comprising a single user information field addressed to the non-AP STA.

Aspect 104: The method of any of aspects 99 or 100, wherein the trigger frame variant further comprises a plurality of user information fields addressed to a plurality of respective non-AP STAs; and a MAC header of the trigger frame variant comprises an RA field set to a broadcast address based at least in part on the trigger frame variant comprising the plurality of user information fields.

Aspect 105: The method of any of aspects 91-104, wherein the management frame comprises a beacon frame, a probe response frame, an association response frame, a reassociation response frame, or any combination thereof.

Aspect 106: A non-AP STA, including a processing system that includes processor circuitry and memory circuitry that stores code, the processing system configured to cause the non-AP STA to perform a method of any of aspects 68-90.

Aspect 107: A non-AP STA for wireless communications, comprising at least one means for performing a method of any of aspects 68-90.

Aspect 108: A non-transitory computer-readable medium storing code for wireless communications, the code comprising instructions executable by a processor to perform a method of any of aspects 68-90.

Aspect 109: An AP STA, including a processing system that includes processor circuitry and memory circuitry that stores code, the processing system configured to cause the AP STA to perform a method of any of aspects 91-105.

Aspect 110: An AP STA for wireless communications, comprising at least one means for performing a method of any of aspects 91-105.

Aspect 111: A non-transitory computer-readable medium storing code for wireless communications, the code comprising instructions executable by a processor to perform a method of any of aspects 91-105.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A non-access point (AP) station (STA), comprising:

a processing system that includes processor circuitry and memory circuitry that stores code, the processing system configured to cause the non-AP STA to:

receive a management frame indicating one or more anchor channels within an operating bandwidth of an AP STA for dynamic subchannel operation;

transmit, based at least in part on the management frame, a first frame indicating a subset of the one or more anchor channels;

receive a control frame assigning, to the non-AP STA for the dynamic subchannel operation, one or more frequency resources included in one or more secondary subchannels associated with an anchor channel of the one or more anchor channels, wherein the anchor channel is included in the subset of the one or more anchor channels; and communicate via the one or more secondary subchannels associated with the anchor channel based at least in part on an enabled dynamic subchannel operation mode at the non-AP STA.

2. The non-AP STA of claim 1, wherein the first frame comprises an association request frame, a reassociation request frame, an action frame, a management or data frame comprising an aggregated-control subfield, or any combination thereof.

3. The non-AP STA of claim 1, wherein the processing system is further configured to cause the non-AP STA to:

operate according to a same bandwidth capability for a primary channel and for the anchor channel based at least in part on the enabled dynamic subchannel operation mode.

4. The non-AP STA of claim 3, wherein, to operate according to the same bandwidth capability, the processing system is further configured to cause the non-AP STA to:

operate according to a reduced bandwidth narrower than the same bandwidth capability based at least in part on an operating mode of the non-AP STA.

5. The non-AP STA of claim 1, wherein the processing system is further configured to cause the non-AP STA to:

transmit a frame indicating a capability to operate in a dynamic subchannel operation mode for a link, wherein the management frame indicating the one or more anchor channels within the operating bandwidth of the AP STA for the dynamic subchannel operation is received based at least in part on the capability to operate in the dynamic subchannel operation mode for the link.

6. The non-AP STA of claim 1, wherein the processing system is further configured to cause the non-AP STA to:

transmit a request frame to enable a dynamic subchannel operation mode;

receive an acknowledgment frame in response to the request frame; and enable the dynamic subchannel operation mode based at least in part on the acknowledgment frame, wherein via the one or more secondary subchannels associated with the anchor channel is communicated based at least in part on the enabling the dynamic subchannel operation mode.

7. The non-AP STA of claim 6, wherein the processing system is further configured to cause the non-AP STA to:

transmit a second request frame to disable the dynamic subchannel operation mode;

receive a second acknowledgment frame in response to the second request frame; and disable the dynamic subchannel operation mode based at least in part on the second acknowledgment frame.

8. The non-AP STA of claim 1, wherein the processing system is further configured to cause the non-AP STA to:

perform a clear channel assessment energy detection via the anchor channel based at least in part on the enabled dynamic subchannel operation mode.

9. The non-AP STA of claim 1, wherein the processing system is further configured to cause the non-AP STA to:

perform a received signal strength measurement for the anchor channel based at least in part on the enabled dynamic subchannel operation mode; and compute a transmit power for the communicating based at least in part on the received signal strength measurement for the anchor channel.

10. The non-AP STA of claim 1, wherein the control frame indicates the one or more frequency resources relative to a primary channel of the non-AP STA, and wherein the primary channel is different from the anchor channel.

11. The non-AP STA of claim 1, wherein the control frame comprises a dynamic subchannel operation announcement frame.

12. The non-AP STA of claim 11, wherein the dynamic subchannel operation announcement frame comprises a trigger frame variant comprising an uplink length subfield set to zero.

13. The non-AP STA of claim 12, wherein the trigger frame variant is a multi-user request to send trigger frame or a buffer status report poll trigger frame.

14. The non-AP STA of claim 1, wherein the management frame comprises a beacon frame, a probe response frame, an association response frame, a reassociation response frame, or any combination thereof.

15. The non-AP STA of claim 1, wherein the anchor channel spans a 20 Megahertz bandwidth.

16. An access point (AP) station (STA), comprising:

a processing system that includes processor circuitry and memory circuitry that stores code, the processing system configured to cause the AP STA to:

transmit a management frame indicating one or more anchor channels within an operating bandwidth of the AP STA for dynamic subchannel operation;

receive, based at least in part on the management frame, a first frame indicating a subset of the one or more anchor channels for a non-AP STA;

transmit a control frame assigning, to the non-AP STA for the dynamic subchannel operation, one or more frequency resources included in one or more secondary subchannels associated with an anchor channel of the one or more anchor channels, wherein the anchor channel is included in the subset of the one or more anchor channels; and communicate with the non-AP STA via the one or more secondary subchannels associated with the anchor channel based at least in part on the control frame.

17. The AP STA of claim 16, wherein the first frame comprises an association request frame, a reassociation request frame, an action frame, a management or data frame comprising an aggregated-control subfield, or any combination thereof.

18. The AP STA of claim 16, wherein the processing system is further configured to cause the AP STA to:

receive a frame indicating a capability of the non-AP STA to operate in a dynamic subchannel operation mode for a link, wherein the management frame indicating the one or more anchor channels within the operating bandwidth of the AP STA for the dynamic subchannel operation is transmitted based at least in part on the capability of the non-AP STA to operate in the dynamic subchannel operation mode for the link.

19. The AP STA of claim 16, wherein the processing system is further configured to cause the AP STA to:

receive a request frame to enable a dynamic subchannel operation mode for the non-AP STA;

transmit an acknowledgment frame in response to the request frame; and enable the dynamic subchannel operation mode for the non-AP STA based at least in part on the acknowledgment frame, wherein with the non-AP STA via the one or more secondary subchannels associated with the anchor channel is communicated based at least in part on enablement of the dynamic subchannel operation mode for the non-AP STA.

20. The AP STA of claim 19, wherein the processing system is further configured to cause the AP STA to:

receive a second request frame to disable the dynamic subchannel operation mode for the non-AP STA;

transmit a second acknowledgment frame in response to the second request frame; and disable the dynamic subchannel operation mode for the non-AP STA based at least in part on the second acknowledgment frame.

21. The AP STA of claim 16, wherein the processing system is further configured to cause the AP STA to:

refrain from puncturing frequency resources associated with the anchor channel for the non-AP STA based at least in part on the assigned one or more frequency resources included in the one or more secondary subchannels being associated with the anchor channel.

22. The AP STA of claim 16, wherein the control frame indicates the one or more frequency resources relative to a primary channel of the non-AP STA, and wherein the primary channel is different from the anchor channel.

23. The AP STA of claim 16, wherein the control frame comprises a dynamic subchannel operation announcement frame.

24. The AP STA of claim 23, wherein the dynamic subchannel operation announcement frame comprises a trigger frame variant comprising an uplink length subfield set to zero.

25. The AP STA of claim 24, wherein the trigger frame variant is a multi-user request to send trigger frame or a buffer status report poll trigger frame.

26. The AP STA of claim 16, wherein the management frame comprises a beacon frame, a probe response frame, an association response frame, a reassociation response frame, or any combination thereof.

27. A method for wireless communications at a non-access point (AP) station (STA), comprising:

receiving a management frame indicating one or more anchor channels within an operating bandwidth of an AP STA for dynamic subchannel operation;

transmitting, based at least in part on the management frame, a first frame indicating a subset of the one or more anchor channels;

receiving a control frame assigning, to the non-AP STA for the dynamic subchannel operation, one or more frequency resources included in one or more secondary subchannels associated with an anchor channel of the one or more anchor channels, wherein the anchor channel is included in the subset of the one or more anchor channels; and communicating via the one or more secondary subchannels associated with the anchor channel based at least in part on an enabled dynamic subchannel operation mode at the non-AP STA.

28. A method for wireless communications at an access point (AP) station (STA), comprising:

transmitting a management frame indicating one or more anchor channels within an operating bandwidth of the AP STA for dynamic subchannel operation;

receiving, based at least in part on the management frame, a first frame indicating a subset of the one or more anchor channels for a non-AP STA;

transmitting a control frame assigning, to the non-AP STA for the dynamic subchannel operation, one or more frequency resources included in one or more secondary subchannels associated with an anchor channel of the one or more anchor channels, wherein the anchor channel is included in the subset of the one or more anchor channels; and communicating with the non-AP STA via the one or more secondary subchannels associated with the anchor channel based at least in part on the control frame.

* * * * *